(12) United States Patent
Haddock et al.

(10) Patent No.: US 8,979,259 B2
(45) Date of Patent: Mar. 17, 2015

(54) ELECTRO-ACTIVE SPECTACLE FRAMES

(75) Inventors: Joshua N. Haddock, Roanoke, VA (US);
Ronald D. Blum, Roanoke, VA (US);
Claudio Dalla Longa,
Valdobbiadene-TV (IT); Mark Graham,
Leesburg, VA (US); Yongping Wang,
Philadelphia, PA (US)

(73) Assignee: Mitsui Chemicals, Inc., Tokyo (JP)

( * ) Notice: Subject to any disclaimer, the term of this patent is extended or adjusted under 35 U.S.C. 154(b) by 398 days.

(21) Appl. No.: 13/179,219

(22) Filed: Jul. 8, 2011

(65) Prior Publication Data
US 2013/0010256 A1 Jan. 10, 2013

Related U.S. Application Data

(63) Continuation-in-part of application No. 13/175,633, filed on Jul. 1, 2011, now Pat. No. 8,783,861, and a continuation-in-part of application No. 13/175,634, filed on Jul. 1, 2011, now abandoned.

(60) Provisional application No. 61/361,110, filed on Jul. 2, 2010, provisional application No. 61/376,719, filed on Aug. 25, 2010, provisional application No. 61/415,391, filed on Nov. 19, 2010, provisional application No. 61/481,353, filed on May 2, 2011, provisional application No. 61/362,877, filed on Jul. 9, 2010.

(51) Int. Cl.
*G02C 1/00* (2006.01)
*G02C 11/00* (2006.01)
*G02C 5/22* (2006.01)

(52) U.S. Cl.
CPC .............. *G02C 11/10* (2013.01); *G02C 5/2272* (2013.01)

USPC .......................................................... 351/158

(58) Field of Classification Search
USPC .............................. 351/158, 111, 113, 41, 49
See application file for complete search history.

(56) References Cited

U.S. PATENT DOCUMENTS

| | | | |
|---|---|---|---|
| 2,930,857 A | 3/1960 | Hollingsworth | |
| 4,152,846 A | 5/1979 | Witt | |
| 4,283,127 A | 8/1981 | Rosenwinket et al. | |
| 4,418,990 A | 12/1983 | Gerber | |

(Continued)

FOREIGN PATENT DOCUMENTS

| | | |
|---|---|---|
| DE | 2304134 | 8/1973 |
| EP | 0061002 | 9/1982 |

(Continued)

OTHER PUBLICATIONS

The International Search Report corresponding to the PCT/US2011/043591 application.

(Continued)

*Primary Examiner* — Hung Dang
(74) *Attorney, Agent, or Firm* — Sterne, Kessler, Goldstein & Fox P.L.L.C.

(57) ABSTRACT

A first device is provided. The first device includes a lens comprising at least a first electrical contact and a lens housing holding the lens. The lens housing includes at least a second electrical contact. The first device further comprises a compliant conductive element disposed between the first and the second electrical contact. The compliant conductive element electrically connects the first and second electrical contacts.

37 Claims, 25 Drawing Sheets

(56) References Cited

U.S. PATENT DOCUMENTS

| | | | |
|---|---|---|---|
| 4,756,605 | A | 7/1988 | Okada et al. |
| 4,875,030 | A | 10/1989 | Chiu |
| 4,907,860 | A | 3/1990 | Noble |
| 4,967,268 | A | 10/1990 | Lipton et al. |
| 4,991,258 | A | 2/1991 | Drlik |
| 4,991,951 | A | 2/1991 | Mizuno |
| 5,182,585 | A | 1/1993 | Stoner |
| 5,463,428 | A | 10/1995 | Lipton et al. |
| 5,657,107 | A | 8/1997 | Wagner et al. |
| 5,742,379 | A | 4/1998 | Reifer |
| 5,760,869 | A | 6/1998 | Mitamura |
| 5,764,338 | A | 6/1998 | Mack |
| 5,835,185 | A * | 11/1998 | Kallman et al. ............ 351/113 |
| 6,097,450 | A | 8/2000 | Humphrey |
| 6,115,177 | A | 9/2000 | Vossler |
| 6,336,250 | B1 | 1/2002 | Takeda et al. |
| 6,582,075 | B1 | 6/2003 | Swab et al. |
| 6,595,634 | B1 | 7/2003 | Pilat, Jr. |
| 6,626,532 | B1 | 9/2003 | Nishioka et al. |
| 6,719,425 | B2 | 4/2004 | Conner |
| 6,866,386 | B1 | 3/2005 | Chen |
| 7,009,757 | B2 | 3/2006 | Nishioka et al. |
| 7,063,420 | B2 | 6/2006 | Lerner et al. |
| 7,104,645 | B2 | 9/2006 | Pilat, Jr. |
| 7,140,727 | B2 | 11/2006 | Pilat, Jr. et al. |
| 7,425,066 | B2 | 9/2008 | Blum et al. |
| 7,784,935 | B2 | 8/2010 | Jackson et al. |
| 7,813,048 | B2 | 10/2010 | Lynch et al. |
| 2001/0007493 | A1 | 7/2001 | Masunaga et al. |
| 2001/0043266 | A1 | 11/2001 | Robinson et al. |
| 2002/0140899 | A1 | 10/2002 | Blum et al. |
| 2004/0000733 | A1 | 1/2004 | Swab et al. |
| 2005/0078274 | A1 | 4/2005 | Howell et al. |
| 2005/0225723 | A1 | 10/2005 | Pilu |
| 2005/0237485 | A1 | 10/2005 | Blum et al. |
| 2005/0242771 | A1 | 11/2005 | Blum et al. |
| 2005/0264752 | A1 | 12/2005 | Howell et al. |
| 2005/0270479 | A1 | 12/2005 | Canavan et al. |
| 2005/0270481 | A1 | 12/2005 | Blum et al. |
| 2006/0023158 | A1 | 2/2006 | Howell et al. |
| 2006/0092340 | A1 | 5/2006 | Blum et al. |
| 2006/0203186 | A1 | 9/2006 | Ifergan |
| 2007/0121061 | A1 | 5/2007 | Kim |
| 2007/0258039 | A1 | 11/2007 | Duston et al. |
| 2007/0296918 | A1 | 12/2007 | Blum et al. |
| 2008/0106695 | A1 | 5/2008 | Kokonaski et al. |
| 2008/0273166 | A1 | 11/2008 | Kokonaski |
| 2008/0316420 | A1 | 12/2008 | Agazarova |
| 2010/0177277 | A1 | 7/2010 | Kokonaski et al. |
| 2010/0201938 | A1 | 8/2010 | Jackson et al. |
| 2010/0309426 | A1 | 12/2010 | Howell et al. |
| 2011/0058141 | A1 | 3/2011 | Cozzani |

FOREIGN PATENT DOCUMENTS

| | | |
|---|---|---|
| EP | 1647854 | 4/2006 |
| EP | 1727393 | 11/2006 |
| EP | 1916561 | 4/2008 |
| EP | 2233964 | 9/2010 |
| GB | 1563929 | 4/1980 |
| GB | 2170613 | 8/1986 |
| JP | 2008/083299 | 4/2008 |
| JP | 09294654 | 12/2009 |
| WO | WO 99/21400 | 4/1999 |
| WO | WO 01/02895 | 1/2001 |
| WO | WO 01/35159 | 5/2001 |
| WO | WO 2004/028203 | 4/2004 |
| WO | WO 2007/142520 | 12/2007 |
| WO | WO 2008/002388 | 1/2008 |
| WO | WO 2008/046858 | 4/2008 |
| WO | WO 2009/081542 | 7/2009 |
| WO | WO 2009/098719 | 8/2009 |
| WO | WO 2009/126946 | 10/2009 |
| WO | WO 2009/136667 | 11/2009 |
| WO | WO 2010/062504 | 6/2010 |
| WO | WO 2010/080999 | 7/2010 |

OTHER PUBLICATIONS

The International Search Report corresponding to the PCT/US2011/061505 application.
The International Search Report corresponding to the PCT/US2011/061495 application.
U.S. Appl. No. 61/441,817, filed Feb. 11, 2011.
International Search Report and Written Opinion in corresponding PCTIUS2008/058056 application.
Partial International Search Report in corresponding PCT/US2010/020498 application.
European Search Report in related EP07852880.9 application.
"Hearing Mojo: Varibel Hearing-Aid Glasses Integrate Eight Directional Microphones," Feb. 27, 2009, pp. 1-4 URL-http://hearingmojo.com/b/og-mt/blog-mt/2006/04/varibel_hearingaid_glasses_dou.html.
International Search Report corresponding to the PCT/US2011/061505 application.
International Search Report corresponding to the PCT/US2011/061495 application.
The International Search Report corresponding to the PCT/US2011/042882 application.
U.S. Appl. No. 61/361,110, filed Jul. 2, 2010.
U.S. Appl. No. 61/376,719, filed Aug. 25, 2010.
U.S. Appl. No. 61/415,391, filed Nov. 19, 2010.
U.S. Appl. No. 12/684,490, filed Jan. 8, 2010.
U.S. Appl. No. 13/175,633, filed Jul. 1, 2011.
U.S. Appl. No. 13/175,634, filed Jul. 1, 2011.
U.S. Appl. No. 61/362,877, filed Jul. 9, 2010.
U.S. Appl. No. 13/179,219, filed Jul. 8, 2011.
U.S. Appl. No. 61/481,353, filed May 2, 2011.
International Search Report corresponding to the PCT/US2011/043591 application.
International Search Report corresponding to the PCT/US2011/042883 application.
International Search Report corresponding to the PCT/US2012/051202 application.
The International Search Report corresponding to the PCT/US2011/042883 application.
The International Preliminary Report on Patentability corresponding to the PCT/US2011/042882 application.

* cited by examiner

ELECTRO-ACTIVE SPECTACLE FRAMES

CROSS-REFERENCES TO RELATED APPLICATIONS

This application claims priority to (1) is a continuation-in-part of U.S. application Ser. No. 13/175,633 filed on Jul. 1, 2011, now U.S. Pat. No. 8,783,861 which claims the benefit under 35 U.S.C. §119(e) of U.S. provisional patent application No. 61/361,110 filed on Jul. 2, 2010, U.S. provisional patent application No. 61/376,719 filed on Aug. 25, 2010, and U.S. provisional patent application No. 61/415,391, filed on Nov. 19, 2010; (2) is a continuation-in-part of U.S. application Ser. No. 13/175,634 filed on Jul. 1, 2011, now abandoned which claims the benefit under 35 U.S.C. §119(e) of U.S. provisional patent application No. 61/361,110 filed on Jul. 2, 2010, U.S. provisional patent application No. 61/376,719 filed on Aug. 25, 2010, and U.S. provisional patent application No. 61/415,391, filed on Nov. 19, 2010; (3) claims benefit under 35 U.S.C. §119(e) of U.S. provisional patent application No. 61/362,877 filed Jul. 9, 2010; and (4) claims benefit under 35 U.S.C. §119(e) of U.S. provisional patent application no. 61/481,353 filed on May 2, 2011. The entire disclosure of each of the above mentioned applications is incorporated herein by reference for all purposes.

BACKGROUND OF THE INVENTION

In today's world, spectacle eyeglass frames are very fashionable. While the trend for the eyeglass lenses is to make them thinner, lighter, and less visible, at the same time, it is the eyeglass frame that makes the fashion statement for the eyeglass wearer.

Concurrent with these trends is another concerning including electronics into spectacle eyewear. The trend of utilizing electronics in eyewear appears to be accelerating and the applications being developed by others are expanding. As theses trends continue, it is becoming important to find ways to incorporate electronics into eyewear without harming the aesthetics and functionality of the eyewear. Some of the challenges may be to not limit the fashion design of the eyeglass frame or limit the materials which the eyeglass frame can be made of, maintain as few completed eyeglass frames or eyeglass frame components (frame fronts, bridges, temples) stock keeping units (SKUs) as possible, allow for robust placement of the electronics, and in a way that can be manufactured so that it remains affordable, and aesthetically desirable.

BRIEF SUMMARY OF THE INVENTION

Embodiments provided herein may provide an electro-active frame that comprises a spring mechanism and a conductive path from a temple of the frame to the lens housing of the frame.

A first device is provided that comprises a frame. The frame further comprises a lens housing adapted to support a first lens and a second lens, a first temple movably coupled to the lens housing, and a second temple movably coupled to the lens housing. The first device further comprises a first spring mechanism coupled to the first temple and the lens housing. A first conductive path is provided from the first temple to the lens housing for at least one position of the first temple relative to the frame.

In some embodiments, the first device as described above further comprises an electronic component coupled to the frame. In some embodiments, the conductive path is electrically connected to the electronic component for at least one position of the first temple relative to the frame.

In some embodiments, in the first device as described above, the first conductive path is provided by the first spring mechanism. In some embodiments, the first spring mechanism comprises a spring that provides the first conductive path.

In some embodiments, in the first device as described above, the first spring mechanism comprises a spring and a first conductor. The first conductive path may be provided by the first conductor. In some embodiments, the spring is disposed substantially around the first conductor. In some embodiments, the spring is coupled to the first conductor. In some embodiments, the spring is disposed along a side of the first conductor.

In some embodiments, in the first device as described above, the first conductive path further comprises pogo pins. The pogo pins may be disposed within the first temple. In some embodiments, the first device further comprises a second spring mechanism. The second spring mechanism may press the pogo pins against electrical contacts on the lens housing for a plurality of positions of the first temple.

In some embodiments, in the first device as described above, the first spring mechanism may include a spring hinge. In some embodiments, in the first device as described above, an electronics module is further provided. The electronics module may be coupled to the first temple and the first conductive path may be electrically connected to the electronics module.

In some embodiments, in the first device as described above, the first device comprises full rimmed, semi-rimless, or rimless spectacle frames.

In some embodiments, in the first device as described above, the first conductive path conducts electricity from the first temple to the lens housing when the first temple is in a first position. The first conductive path does not conduct electricity from the first temple to the lens housing when the first temple is in a second position. In some embodiments, the lens housing comprises a first electrical contact, and the first spring mechanism forms an electrical connection with the first electrical contact in the first position. In some embodiments, the first spring mechanism does not form an electrical connection with the first electrical contact in the second position. In some embodiments, the first spring mechanism is coupled to the first lens, the lens includes a first electrical contact, and the first spring mechanism forms an electrical connection with the first electrical contact when the frame is in the first position. In some embodiments, the first spring mechanism does not form an electrical connection with the first electrical contact when the frame is in the second position. In some embodiments, the first device comprises rimless spectacle frames.

In some embodiments, in the first device as described above, the first spring mechanism is housed within the first temple member. In some embodiments, in the first device as described above, the first spring mechanism is in electrical contact with the electronics module. In some embodiments, the first spring mechanism is in direct electrical contact with the electronics module. In some embodiments, where the first conductive path conducts electricity from the first temple to the lens housing when the first temple is in a first position and the first conductive path does not conduct electricity from the first temple to the lens housing when the first temple is in a second position, the first spring mechanism maintains electrical contact with the electronics module in both the first position and the second position.

In some embodiments, in the first device as describe above, the first spring mechanism is in a first condition when the first temple is in the first position and a second condition when the first temple is in the second position. In some embodiments, in the first device as described above, the first spring mechanism has a first length when the first temple is in a first position and a second length when the first temple is in a second position. The first length and the second length may be different.

In some embodiments, in the first device as described above where the first conductive path conducts electricity from the first temple to the lens housing when the first temple is in a first position, and the first conductive path does not conduct electricity from the first temple to the lens housing when the first temple is in a second position, the first position is an open position. The first position may comprise the first temple and the lens housing being positioned such that there is an angle between them of between 60 degrees and 100 degrees. In some embodiments, the angle between the temple and the lens housing in the first position is between 80 degrees and 90 degrees.

In some embodiments, in the first device as described above where the first conductive path conducts electricity from the first temple to the lens housing when the first temple is in a first position, and the first conductive path does not conduct electricity from the first temple to the lens housing when the first temple is in a second position, the second position is a closed position. In some embodiments, the second position comprises the first temple and the lens housing being positioned such that there is an angle between them of between 0 degrees and 60 degrees. In some embodiments, the second position comprises the first temple at an angle between 0 degrees and 45 degrees with the lens housing.

Embodiments provided herein may provide an electroactive frame that comprises a first and second conductive path provided by frame elements from a frame temple to the lens housing A first device is provided. The first device comprises a frame, where the frame further comprises: a lens housing adapted to support a first lens and a second lens, a first temple coupled to the lens housing, and a second temple coupled to the lens housing. The first device further comprises a first conductive path provided by one or more frame elements from the first temple to the lens housing and a second conductive path provided by one or more frame elements from the first temple to the lens housing. The first conductive path is electrically isolated from the second conductive path.

In some embodiments, the first device as described above further comprises at least one electrical insulator disposed between at least a portion of the first conductive path and the second conductive path. In some embodiments, the first device further comprises a first hinge coupled to the first temple and the lens housing, and the electrical insulator is located at least within the first hinge. In some embodiments, the electrical insulator is located at least within the first temple. In some embodiments, the electrical insulator is located at least within the lens housing.

In some embodiments, the first device as described above further comprises an electronics module that is coupled to the first temple of the frame and the first and second conductive paths are electrically connected to the electronics module.

In some embodiments, the first device as described above further comprises a first lens having a first electrical contact and a second lens having a second electrical contact. The first conductive path electrically connects to the first electrical contact of the first lens and the second conductive path electrically connects to the second electrical contact of the second lens. In some embodiments, the first lens further includes a second electrical contact and the second lens further includes a first electrical contact. The first conductive path may electrically connect to the first electrical contact of the second lens and the second conductive path may electrically connect to the second electrical contact of the first lens. In some embodiments, the lens housing comprises a non-conductive material and the frame element providing the first conductive path comprises a conductive material embedded in the lens housing. In some embodiments, the frame element providing the second conductive path comprises a conductive material embedded in the lens housing. In some embodiments, the lens housing comprises acetate. In some embodiments, the second temple or the second lens does not comprise an electronics module coupled thereto.

In some embodiments, in the first device as described above where the first device comprises a first and second lens having first and second electrical contacts, where the first conductive path electrically connects to the first contact of the first and second lens, and where the second conductive path electrically connects to the second contact of the first and the second lens, the lens housing comprises a conductive material and a first portion of the lens housing provides at least a part of the first conductive path. In some embodiments, at least a part of the second conductive path is provided by a second portion of the lens housing. The first portion of the lens housing may be electrically isolated from the second portion of the lens housing by at least one piece of electrically insulating material. In some embodiments, the first device may comprise semi-rimless eyeglass frames. In some embodiments, the first conductive path and the second conductive path are each disposed within the lens housing of the semi-rimless spectacles. In some embodiments, the electrically insulating material that electrically isolates the first portion of the lens housing from the second portion of the lens housing comprises an injection moldable or similarly formed plastic material. In some embodiments, the electrically insulating material comprises nylon.

In some embodiments, in the first device as described above where the first device comprises a first and second lens having first and second electrical contacts, where the first conductive path electrically connects to the first contact of the first and second lens, where the second conductive path electrically connects to the second contact of the first and the second lens, where the lens housing comprises a conductive material, where a first portion of the lens housing provides at least a part of the first conductive path, and where at least a part of the second conductive path is provided by a second portion of the lens housing, the first portion of the lens housing and the second portion of the lens housing are separated by an air gap. In some embodiments, the lens housing further comprises a bridge disposed between the first lens and the second lens. The bridge may include the first portion and the second portion of the lens housing and the air gap may be disposed between the first portion and the second portion of the lens housing at the bridge. In some embodiments, the air gap has a maximum distance of approximately 10 mm.

In some embodiments, in the first device as described above where the first device comprises a first and second lens having first and second electrical contacts, where the first conductive path electrically connects to the first contact of the first and second lens, where the second conductive path electrically connects to the second contact of the first and the second lens, where the lens housing comprises a conductive material, where a first portion of the lens housing provides at least a part of the first conductive path, and where at least a part of the second conductive path is provided by a second portion of the lens housing, the first portion of the lens housing and the second portion of the lens housing comprise metal.

In some embodiments, in the first device as described above, where the first device further comprises at least one electrical insulator disposed between at least a portion of the first conductive path and the second conductive path, the electrical insulator includes a first component and a second component. The first component of the electrical insulator disposed between the first conductive path and the second conductive path comprises the first lens and the second lens. In some embodiments, the second component of the electrical insulator disposed between the first conductive path and the second conductive path includes at least one of: an air gap and an electrically insulating material. In some embodiments, the second component of the electrical insulator is disposed between the first lens and the second lens.

In some embodiments, in the first device as described, the lens housing comprises full rimmed spectacle frames.

A first device is further provided that comprises a frame. The frame further comprises a lens housing adapted to support a first lens and a second lens, a first temple coupled to the lens housing, and a second temple coupled to the lens housing. The first device further includes a first conductive path provided by one or more frame elements from the first temple to the lens housing, a second conductive path provided by one or more frame elements from the first temple to the lens housing, a third conductive path provided by one or more frame elements from the second temple to the lens housing, and a fourth conductive path provided by one or more frame elements from the second temple to the lens housing. In the first device, each of the first, second, third, and fourth conductive paths are electrically isolated from each other.

In some embodiments, in the first device as described above, at least a portion of the first conductive path is electrically isolated from at least a portion of the second conductive path by an electric insulator, and at least a portion of the third conductive path is electrically isolated from at least a portion of the fourth conductive path by an electric insulator. In some embodiments, the first device further includes a first electronics module disposed on the first temple and a second electronics module disposed on the second temple. In some embodiments, the first device further includes a first lens having a first electrical contact and a second electrical contact and a second lens having a first electrical contact and a second electrical contact. In some embodiments, the first conductive path may electrically connect to the first electrical contact of the first lens, the second conductive path may electrically connect to the second electrical contact of the first lens, the third conductive path may electrically connect to the first electrical contact of the second lens, and the fourth conductive path may electrically connect to the second electrical contact of the second lens. In some embodiments, the first and second conductive paths electrically connect to the first electronics module and the third and fourth conductive paths electrically connect to the second electronics module.

Embodiments provided herein may comprise a conductive material that is physically compliant and/or compressible, and that is electrically conductive.

A first device is provided. The first device includes a lens comprising at least a first electrical contact and a lens housing holding the lens. The lens housing includes at least a second electrical contact. The first device further comprises a compliant conductive element disposed between the first and the second electrical contact. The compliant conductive element electrically connects the first and second electrical contacts.

In some embodiments, in the first device as described above, the compliant conductive element comprises conductive rubber. In some embodiments, in the first device as described above, the compliant conductive element is disposed between the lens housing and the lens. In some embodiments, in the first device as described above, the compliant conductive element has a shape that comprises any one of, or some combination of: a triangle, a square, a "figure 8," an oval, a circle, or a rectangle.

In some embodiments, in the first device as described above, the compliant conductive element includes a first end having a first thickness, a second end having a second thickness, and a center portion having a third thickness that is disposed between, and coupled to, the first end and the second end. The first thickness of the first end and the second thickness of the second end are each greater than the third thickness of the center portion.

In some embodiments, in the first device as described above, the compliant conductive element is an extrusion.

In some embodiments, in the first device as described above, the lens comprises a first surface and the lens housing comprises a first surface. The compliant conductive element substantially conforms to at least a portion of the first surface of the lens and at least a portion of the first surface of the lens housing.

In some embodiments, the first device as described above further comprises a first temple coupled to the lens housing and an electronics module coupled to the first temple. The compliant conductive element is electrically connected to the electronics module. In some embodiments, the first device further includes a conductor that is substantially embedded within the temple and/or the lens housing. The conductor may electrically connect the electronics module to the compliant conductive element. In some embodiments, a first portion of the conductor is exposed and electrically connects the electronics module to the compliant conductive element. In some embodiments, the lens housing comprises acetate. In some embodiments, the lens housing comprises a conductive material and electrically connects the electronic module to the compliant conductive element.

In some embodiments, the first device as described above comprises semi-rimless spectacle frames.

In some embodiments, in the first device as described above, the lens includes a first groove, the lens housing includes a first cavity, and the compliant conductive element comprises a first and a second portion. The first portion of the compliant conductive element may be disposed substantially within the first groove of the lens. The second portion of the compliant conductive element may be disposed substantially within the first cavity of the lens housing. In some embodiments, the first portion and the second portion of the compliant conductive element are connected by a bridge.

In some embodiments, in the first device as described above where the first portion of the compliant conductive element is disposed substantially within the first groove of the lens, and the second portion of the compliant conductive element is disposed substantially within the first cavity of the lens housing, the first portion of the compliant conductive element has a first shape that comprises any one of: a triangle, a square, a circle, and a rectangle. In some embodiments, the second portion of the compliant conductive element has a second shape that comprises any one of: a triangle, a square, a circle, and a rectangle. In some embodiments, the lens has a first surface that is located within the first groove and at least a part of the first portion of the compliant conductive element substantially conforms to the first surface of the first groove. In some embodiments, the first surface of the lens is coated with a conductive paint.

In some embodiments, in the first device as described above where the first portion of the compliant conductive element is disposed substantially within the first groove of the lens, and the second portion of the compliant conductive element is disposed substantially within the first cavity of the lens housing, the first groove of the lens has width approximately within the range of 0.4 mm and 1.0 mm and a depth approximately within the range of 0.4 mm and 1.0 mm. In some embodiments, the groove of the first lens has width of approximately 0.7 mm and a depth of approximately 0.6 mm.

In some embodiments, in the first device as described above where the first portion of the compliant conductive element is disposed substantially within the first groove of the lens, and the second portion of the compliant conductive element is disposed substantially within the first cavity of the lens housing, the lens housing has a first surface that is located within the first cavity. A part of the second portion of the compliant conductive element may substantially conform to the first surface of the first cavity.

In some embodiments, in the first device as described above where the first portion of the compliant conductive element is disposed substantially within the first groove of the lens, and the second portion of the compliant conductive element is disposed substantially within the first cavity of the lens housing, the compliant conductive element has an uncompressed height of at least the distance between the first surface of the first groove of the lens and the first surface of the first cavity of the lens housing. In some embodiments, the uncompressed height of the compliant conductive element is at least 0.75 mm. In some embodiments, the first surface of the lens housing and the first surface of the lens compress at least a portion of the compliant conductive element when the lens housing and the lens are coupled.

In some embodiments, the first device as described above comprises full rimmed spectacle frames.

In some embodiments, in the first device as described above, the lens comprises a first surface, the lens housing comprises a first cavity, and the compliant conductive element comprises a first surface. The compliant conductive element is disposed substantially within the first cavity of the lens housing, and the first surface of the compliant conductive element substantially conforms to the first surface of the lens. In some embodiments, the first surface of the lens comprises a first and second beveled edge. In some embodiments, the first cavity has a first width and the compliant conductive element has an uncompressed width that is greater than the first width of the cavity.

In some embodiments, in the first device as described above, where the compliant conductive element is disposed substantially within a first cavity of the lens housing, and where a first surface of the compliant conductive element substantially conforms to a first surface of the lens, the cavity of the lens housing has a top surface. A portion of the lens extends into the first cavity of the lens housing. The compliant conductive element has an uncompressed height that is approximately equal to, or greater than, a distance from the top surface of the cavity of the lens housing to the portion of the lens that extends into the first cavity.

In some embodiments, in the first device as described above, the compliant conductive element comprises metal loaded silicon elastomers. In some embodiments, the metal comprises silver and aluminum (AG-Al). In some embodiments, in the first device as described above, the compliant conductive element has a volume resistivity that is less than 10 $\Omega$-cm. In some embodiments, in the first device as described above, the compliant conductive element has a volume resistivity that less than 1 $\Omega$-cm. In some embodiments, in the first device as described above, the compliant conductive element has a volume resistivity that less than 0.1 $\Omega$-cm. In some embodiments, in the first device as described above, the compliant conductive element has a volume resistivity that less than 0.01 $\Omega$-cm. In some embodiments, in the first device as described above, the compliant conductive element has a volume resistivity that less than 0.001 $\Omega$-cm.

In some embodiments, in the first device as described above, the compliant conductive element has a hardness on the shore durometer A scale that is greater than 50. In some embodiments, the compliant conductive element has a hardness on the shore durometer A scale that is greater than 65. In some embodiments, the compliant conductive element has a hardness on the shore durometer A scale that approximate equal to 70 and a volume resistivity of approximately 0.0008 $\Omega$-cm.

It should be understood that, after reading the disclosure provided herein, a person of ordinary skill in the art may understand that various combination of the devices described above may be made such that some or all of the features described with regards to one device may be combined with some or all of the features of another device.

DETAILED DESCRIPTION OF THE INVENTION

Figure 1:
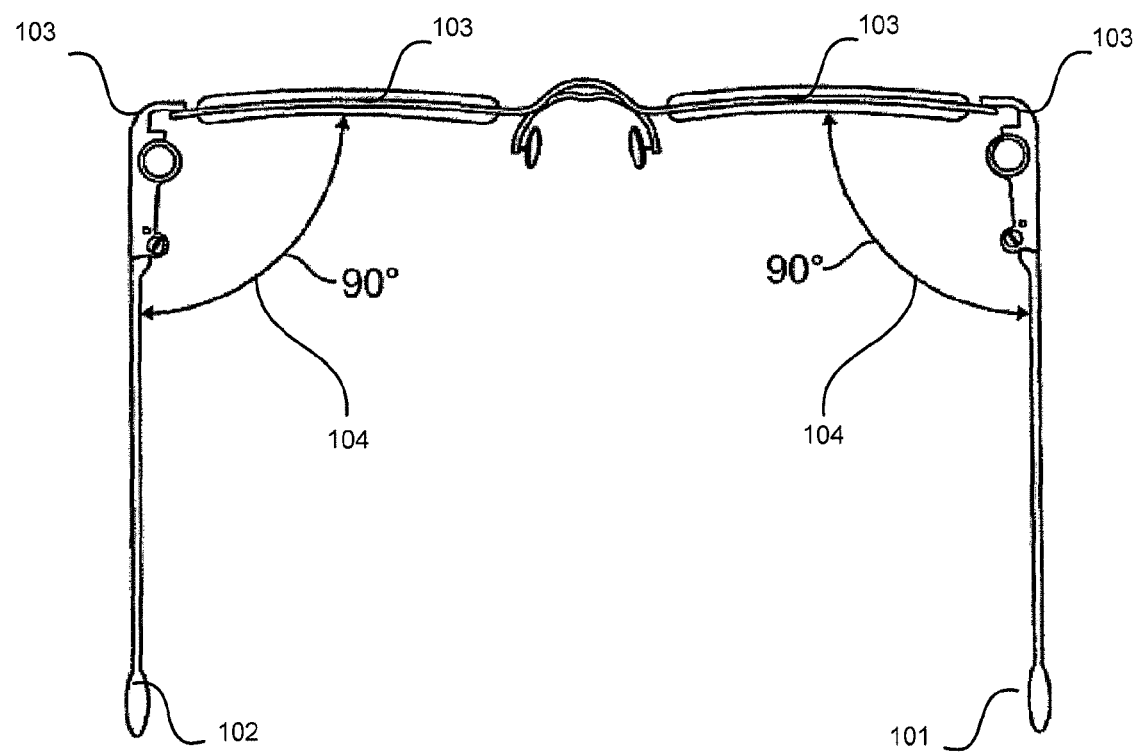
FIG. 1 is an illustration of spectacle frames.

The following disclosure provides exemplary devices comprising electro-active spectacles. Before discussing specific embodiments, some descriptions of some specific terms are provided below.

As used herein, a "frame" may refer to a complete wearable housing that secures both spectacle lenses and aligns them in the proper place relative to the wearer's eyes when being worn. The frame may comprise elements such as a first and second temple, as well as the lens housing that is configured to support the spectacle lenses.

As used herein, a "hinged temple" may refer to a side piece of a frame that connects to the lens housing (or directly to the lens) by way of a hinge attachment mechanism, and further provides stability by resting on the wearer's ears when worn.

As used herein, a "hinge-less temple" may refer to a side piece of a frame that connects to the lens housing (or directly to the lens) without a hinge attachment mechanism, and further provides stability by resting on the wearer's ears when worn.

As used herein, a "temple end piece" may refer to a part of the temple that is found farthest away from the lens housing. The temple end piece usually begins behind the ear of the wearer and ends at the end of the temple that is located farthest away from the lens housing, but this is not required.

As used herein, a "lens housing end piece" may refer to a part of the lens housing farthest away from the bridge and spatial to the bridge. Each frame typically has two lens housing end pieces: one on the spatial side of the right lens and one on the spatial side of the left lens.

As used herein, a "bridge" may refer to a part of the frame that fits over/superior to the wearer's nose. The bridge is usually found between the portion of the lens housing that supports the right lens and the portion of the lens housing that supports the left lens, or is between the right and left lenses themselves. In some embodiments, the bridge may comprise a portion of the lens housing.

As used herein, a "hinge" may refer to the part of the frame that allows for connecting the lens housing and the temples in such away that the lens housing and the temple can open and close against the lens housing on its posterior side when not being worn. In some embodiments, the hinge may connect directly to the lens.

As used herein, "eye-wire" may refer to the rim that surrounds the lens of a spectacle frame. Eye-wire may comprise a portion of the lens housing that holds one lens (a right or a left) in a full rimmed or semi-rimless frame. There may be two eye-wires to each lens housing. However in a completely rimless frame there are no eye wires.

As used herein, a "lens housing" may refer to a part of the frame that is configured or adapted to support or hold the first and the second lenses in place (preferably firmly in place). The lens housing may also comprise the part of the frame to which the temples attach. The lens housing may comprise any component or material adapted to support the lenses, including, for example, screws, nylon monofilament, eye-wire, etc. or any combination thereof. The lens housing may comprise any material, including metal or plastic. A lens housing may be included in any type of frame design, including fully rimmed, semi-rimless, and rimless. In some embodiments, the lens housing may also include the bridge, such as when the lens housing comprising a single component or two components that support both the first and the second lens.

As used herein, an "electronics module" may refer to a housing or container that comprises a plurality of electrical components. For instance, an electronics module may comprise a power source (such as a battery), a sensing mechanism (such as a capacitance switch, which may activate or deactivate the electronics) and/or a controller (such as a microprocessor).

As used herein, an "electronic component" may refer to any electronic device, including a power source, a controller (such as a microprocessor), a sensing mechanism (such as a touch switch), etc. that may be coupled to an electro-active frame.

As used herein, a "rimless frame" may refer to a frame that is designed having a lens housing that does not comprise eye-wires. That is, for instance, the lens housing does not comprise eye wires but may comprise, for instance, nylon monofilament wire, screws, or other material to hold the lenses in place.

As used herein, a "semi-rimless frame" may refer to a frame that has a lens housing that comprises partial rim (i.e. eye-wire that does not completely encapsulate or encircle the lens) and/or may have a nylon monofilament wire or similar feature that secures the lenses to the frame.

As used herein, a "full rimmed frame" or "fully rimmed" may refer to a frame that comprises a lens housing having a complete rim that encapsulates or encircles the first and second lens (i.e. the lens housing comprises full eye-wires).

As used herein, a "Zyle frame" may refer to a frame that comprises mostly plastic As used herein, a "metal frame" may refer to a frame that comprises mostly metal As used herein, a "right spatial void" may refer to the space created where the right portion of the lens housing that is within the plane of the front of the wearers face turns back to meet the right temple. The angle formed between the right portion of the lens housing and the right temple is approximately (but not always) 90 degrees. This space is further defined as that which is bounded on three sides: On a first side by an imaginary line that is provided on the inside back surface of the right lens or inside right portion of the lens housing, on a second side by that of an imaginary line that is located in the middle of the right temple not including any electronics affixed thereto, and on a third side which is bounded by the right side of the face and/or head of the wearer.

As used herein, a "left spatial void" may refer to the space created where the left portion of the lens housing frame front that is within the plane of the front of the wearers face turns back to meet the left temple. The angle formed between the left portion of the lens housing and the left temple is approximately 90 degrees. This space is further defined as that which is bounded on three sides: On a first side by an imaginary line that is provided on the inside back surface of the left lens or inside left portion of the lens housing, on a second side by that of an imaginary line that is located in the middle of the left temple not including any electronics affixed thereto, and on a third side which is bounded by the left side of the face and/or head of the wearer.

As used herein, "coupled" may refer to any manner of connecting two components together in any suitable manner, such as by way of example only: attaching (e.g. attached to a surface), disposing on, disposing within, disposing substantially within, embedding within, embedded substantially within, etc. "Coupled" may further comprise fixedly attaching two components (such as by using a screw or embedding a first component into a second component during a manufacturing process), but does not so require. That is, two components may be coupled temporarily simply by being in physical contact with one another. Two components are "electrically coupled" or "electrically connected" if current can flow from one component to another. That is, the two components do not have to be in direct contact such that current flows from the one component directly to the other component. There may be any number of other conductive materials and components disposed electrically between two components "electrically coupled" so long as current can flow there between.

As used herein, a "conductive path" refers to a continuous path for which electrons (i.e. current) may flow from one point to another. The conductive path may comprise one component, or more than one component. For instance, a conductive path may comprise portions of a lens housing, a temple, a hinge, a lens, and/or conductive material disposed between some or all of the components.

As used herein, "electro-active spectacles," "electro-active spectacle frames," "electro-active eyeglasses," "electro-active eyeglass frames," "electro-active frames," "electro-active lenses" or any permutation of "electro-active" may broadly refer to any eyeglass frame or lens that comprises an electronic component or components. The electrical components can be coupled to any part of the electro-active frames or lenses. This may comprise, for instance, any and all uses where by the eyeglass frames houses some, most, or all of the electronics and the lens comprises a component or components that may be activated and/or deactivated by an electrical current, such as by way of example only, electronic focusing eyeglasses, electro-chromic eyeglasses, electronic tinted eyeglasses, eyeglasses comprising a micro-display allowing for viewing a digital image in space, eyeglasses comprising an electronic heads up display, eyeglasses that comprise an anti-static element to keep the eyeglass lenses clean, electronic shutter eyeglasses for viewing 3D, electronic eyeglasses that comprise an occlusion control for vision training; electronic eyeglasses for myopia control, eyeglasses that comprise a component of a telescope or the complete telescope, eyeglasses that comprise a microscope, eyeglasses that comprise a camera, eyeglasses that comprise a directional microphone, eyeglasses that comprise a rangefinder, eyeglasses that comprise an image intensifier, eyeglasses that comprise a night vision enhancement feature, occupation eyeglasses, gaming eyeglasses. Additional functionality and electrical components that may comprise portions of electro-active spectacles are discussed in more detail below.

As used herein, reference to a "first" or a "second" does not limit the referenced component to a particular location unless expressly stated. For instance, reference to a "first temple" may comprise the temple located on either the left side or the right side of a wearer's head.

Electro-Active Frames Comprising a Spring Mechanism

Some embodiments of electro-active spectacle frames provided herein may include a spring mechanism. The spring mechanism may, for instance, be disposed on the frame of the spectacles (such as on the temple, embedded within the temple, coupled to the temple and the lens housing, etc.) and may provide a force that causes the temple member to apply pressure in a direction substantially perpendicular to, and in the direction of, a wearer's head. In this manner, the spectacle frames may fit tightly on a person's head, regardless of the size or shape. This may provide for a more comfortable fit and reduce the risk that the eyeglasses could become dislodged or accidentally fall off of the wearer's head. Moreover, the use of a spring mechanism for an electro-active frame may provide the additional benefit of conserving power when the frames are not in use by severing an electrical connection between electronics located on the lens housing (or in the lens) and a power source located on the temple. That is, for instance, the spring mechanism may, by moving the temple of the frame away from the lens housing, separate two conductors such that current cannot flow from the temple to the lens housing (or any other separation).

The use of springs (e.g. spring hinges) for non-electro-active lenses is well known in the art. Examples of such spring hinges are provided in the following references, which are hereby incorporated by reference in their entireties:

U.S. Pat. No. 6,336,250 to Takeda entitled "Spring hinge for Eyeglasses."
U.S. Pat. No. 5,760,869 to Mitamura entitled "Eyeglasses Frame with Spring Hinges."
U.S. Pat. No. 5,657,107 to Wagner et al. entitled "Spring Hinge for Eyewear"
U.S. Pat. No. 4,991,258 to Drlik entitled "Eyeglass Spring Hinges."

To date, there has not been a similar approach used for electro-active eyeglasses. In addition to some of the benefits provided by a spring mechanism (including those noted above, such as a tighter fit and the ability to conserve power by disconnecting components), there are additional considerations that the inventors have identified related to the use of such devices in electro-active frames. For instance, electro-active eyeglass frames may require that an electrical path be provided from a temple to the lens housing, which is not utilized on traditional (i.e. non-electro-active frames) frames. However, the use of spring devices (such as spring hinges) in electro-active eyeglass frames may cause the temple and lens housing to form an angle that is less than 90 degrees, even when the frames are in use. This could cause a disruption in electrical connectivity between electronics or a power source located on a temple with any electronics located on the lens housing (or in the lens itself). FIG. 1 illustrates this situation.

As shown in FIG. 1, a typical position of the temple relative to the lens housing (e.g. when the frames are being worn) is for the first 101 and/or the second temple 102 to form approximately a ninety degree angle with the lens housing 103. In practice, this angle may be slightly smaller or greater (depending on factors such as the wearer's head size and shape, the size of the frame, etc.). In this position, a conductive path may connect components on the first 101 or second temple 102 to components disposed on the lens housing 103. However, the use of a spring mechanism that applies force in the direction of a wearer's head may cause this angle 104 to be substantially less than ninety degrees (for instance, it may be 85 degrees or less), which could cause a separation in the conductive path between the first 101 or second 102 temple and the lens housing 103. For example, if a portion of the conductive path from the first temple 101 to the lens housing 103 comprises electrical contacts located at the respective ends of each of these components (such that, for example, when the first temple 101 and lens housing 103 are worn, there is a direct connection between the electrical contacts), then this connection may be broken as the angle 104 between the components is reduced. As noted above, the use of springs or similar devices in eyeglass frames to provide continuous pressure is likely to create such angles, and therefore such springs and similar devices have not been used with electro-active frames.

Provided herein is an electro-active frame that comprises a spring mechanism. As used herein, a "spring mechanism" may refer to an elastic object that may be used to store mechanical energy. It may comprise a spring and/or other components such as conductors located within the spring or disposed alongside the spring (or within the coils of a coil spring). When compressed or stretched, the first spring mechanism may exert a force on one or more of the components of a device, such as the temple or the lens housing of an electro-active frame. The first spring mechanism may provide a continuous force (either variable or constant) in a direction substantially perpendicular to the head of a wearer when the first device (e.g. an electro-active frame) is worn. The first spring mechanism may, in some embodiments, also conduct electricity and thereby form a part of a conductive path using a spring (or components thereof) or a conductor coupled to or disposed therein. In some embodiments, the conductor may be embedded within the spring mechanism, be coupled to the spring mechanism, and/or encircled by the spring mechanism. As used herein, a spring mechanism may also comprise additional components, such as a hinge that may be coupled to the temple and/or the lens. The spring mechanism may comprise any suitable material, including metal, plastic, or some combination thereof. FIGS. 2 (a) and (b) show two examples of electro-active frames comprising spring mechanisms.

A first device is provided that comprises a frame that includes a lens housing adapted to support a first lens and a second lens. The first device also comprises a first temple movably coupled to the lens housing, and a second temple movably coupled to the lens housing. That is, the first and second temples may be coupled to the lens housing such that each may be moved relative to the lens housing so that the angle between them (e.g. angle 104 in FIG. 1) may change. In this regard, the lens housing and the temples may be coupled in any suitable manner that allows for this movement, including, by way of example, through the use of a hinge or a screw.

Figure 2A:
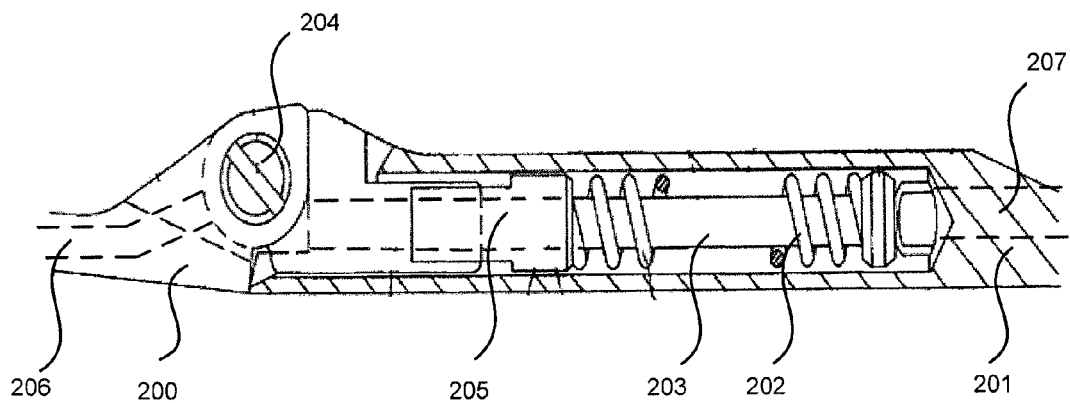
FIGS. 2(a) and (b) are cross sectional diagrams of devices in accordance with some embodiments.

The first device further comprises a first spring mechanism coupled to the first temple and the lens housing. As defined above, this does not require that the spring mechanism be permanently attached to both components. For example, the spring mechanism may be fixed to the first temple and apply force to the lens housing when the first temple and lens housing (or components thereof, such as the end pieces) are within a certain distance of one another (i.e. the angle 104 between the components is close to ninety degrees (e.g. within five degrees), or some other suitable value). When the first temple and the lens housing are moved sufficiently apart the spring mechanism may no longer be in physical contact with the lens housing. An example of this situation is provided in FIG. 2(b) and described in detail below. Although defined above, it is worth noting that the spring mechanism need not be in the form of a coil spring, but may take any suitable shape and may be located in any suitable location on the frame. Such locations, as will be described below, may include disposed on, or embedded within, the lens housing and/or on the first temple. An example of a spring mechanism embedded within the first temple is shown in FIG. 2(a), which will be described below.

The first device also comprises a first conductive path from the first temple to the lens housing for at least one position of the first temple relative to the frame. That is, as defined above, electrons (in the form of current) may be distributed (i.e. conducted), or be capable being distributed (i.e. conducted), from the first temple to the lens housing. In so doing, the first device may, for example, comprise an electro-active frame that has some electronic components (such as a power source, controller, sensing mechanism, etc.) located on the first temple, and other electronic components (such as those described below) disposed on the lens housing and/or on (or within) the lenses themselves.

As defined above, the first conductive path may be provided by any suitable component or components. For instance, the conductive path could comprise the first temple, the spring mechanism, and the lens housing themselves (i.e. each could comprise conductive material) or some or all of these components could comprise conductive components disposed on (or embedded within) them that form a part of the conductive path. As indicated above, the conductive path need not always be present, but may be provided for at least one position of the first temple relative to the lens housing. With reference again to FIG. 1, the first temple 101 may be moved to a plurality of positions relative to the lens housing 103, each of which may have a different angle 104. Preferably, the first conductive path is provided when the first temple and the lens housing are in a position corresponding to when the first device is being worn by a wearer. In some embodiments, this position may have an angle corresponding to approximately ninety degrees. However, embodiments are not so limited and the angle may depend on many factors, as described above. It should also be understood that the conductive path may be provided for a plurality of positions.

In some embodiments, in the first device as described above, the first conductive path is provided by the first spring mechanism. That is, for example, the first spring mechanism may provide some (or all) of the first conductive path between the first temple and the lens housing. This may be due, in part, to the fact that the spring mechanism may be located between (or substantially between) both the first temple and the lens housing. In some embodiments, the first spring mechanism comprises a spring that provides the first conductive path. The spring of the spring mechanism need not comprise a traditional coil spring, but may comprise any elastic material that stores mechanical energy, such as when the spring is displaced. An example of a non-coil spring is provided with reference to FIG. 2 (a). As noted above, the spring may comprise any conductive material when providing at least a portion of the first conductive path. Preferable, the spring mechanism comprises metal.

By utilizing the spring mechanism to faun a part of the conductive path, some embodiments may provide the advantage of reducing the number of components that are required to be coupled to the frame. Moreover, in some embodiments, the use of the spring mechanism to serve as part of the conductive path may be one way in which the conductive path can be selectively provided (e.g. the conductive path may be available when the first device is being worn and unavailable when the first device is not being worn). For instance, the spring mechanism may be permanently coupled (i.e. fixedly, such as through the use of a screw, adhesive, etc.) to only the first temple, and be selectively coupled (i.e. temporally, such as coming into physical contact, but not being adhered to, screwed together, etc.) to the lens housing such that the spring mechanism is in physical contact with the lens housing in some but not all positions of the first temple relative to the lens housing. In embodiments where the first spring mechanism provides some or all of the conductive path, then in positions where the first spring mechanism is no longer contacting the lens housing, the conductive path may not be provided. This may be one way of providing a selectively available conductive path between the first temple and the lens housing.

In some embodiments, in the first device as described above, the first spring mechanism comprises a spring and a first conductor. The conductor may comprise any suitable material and may have any suitable shape. There need not be any physical contact between the spring and the conductor. For instance, in some embodiments, the spring is disposed substantially around the first conductor. By "substantially around," it is meant, for example, that the spring may encircle or surround some (but not necessarily all) of the conductor. This is illustrated in the exemplary embodiment shown in FIG. 2(a). For instance, if the spring comprises a coil spring, then the conductor may be located within the coils of the spring. In some embodiments, the conductor may be disposed within (e.g. embedded in) the spring, such that the spring may comprise both the conductor (or more than one conductors) and an insulating material. The insulating material may electrically insulate the conductors that are within the spring such that the a plurality of conductive paths are provided by the spring (i.e. through the embedded conductors). This may allow for multiple signals to be transmitted from the first temple to the lens housing, for a signal and power to be transmitted, etc. In some embodiments, the spring is coupled to the first conductor. That is, the spring may be attached or disposed on the conductor. Each of the spring and/or the conductor may comprise a part of the conductive path. In some embodiments, the spring is disposed along a side of the first conductor. By "along side," it is meant that the spring and the conductor may be substantially parallel and located no more than 3 cm apart at any given point. Preferable, the spring and the conductor are no more than 1 cm apart such that the spring mechanism may have a small profile (i.e. for aesthetic reasons). Again, embodiments are not so limited, and the conductor may be located in any suitable location. Thus, in some embodiments, the first conductive path or a portion thereof may be provided by the first conductor.

In some embodiments, in the first device as described above, the first conductive path further comprises pogo pins. A "pogo pin" may comprise a device that establishes a (usually temporary) connection between two components. An illustration of an embodiment the utilizes pogo pins is shown in FIGS. 3-10. The pogo pins may be disposed within the first temple, but embodiments are not so limited and the pogo pins may be located in other locations, such as disposed on the first temple, on the lens housing (or embedded therein) and/or coupled to the first spring mechanism. In some embodiments, the first device further comprises a second spring mechanism that may press the pogo pins against electrical contacts on the lens housing for a plurality of positions of the first temple. The use of the second spring mechanism may provide the ability to maintain the conductive path between the first temple and the lens housing for some or all of the positions of the first temple relative to the lens housing. That is, as the distance between the portion of the lens housing comprising the electrical contacts and the first temple increases (i.e. as the angle 104 in FIG. 1 decreases), the second spring mechanism may lengthen the conductive path (i.e. cause the pogo pins to extend) so as to maintain the electrical contact (and thereby the conductive path). When the angle 104 is then increased, the lens housing and/or first temple may apply force to the second spring mechanism such that it contracts (i.e. the pogo pins contract), but such that the electrical contact is still maintained. By providing a force on the pogo pins so as to press against the electrical contacts of the lens housing (or congruently, against the first temple) for some, but not all, of the position of the temple, embodiments may provide the ability to selectively provide a conductive path between the first temple and the lens housing.

In some embodiments, in the first device as described above, the first spring mechanism may include a spring hinge. That is, the spring mechanism may comprise a fixed portion that is coupled to both the lens housing and the first temple (i.e. the hinge) that allows for the relative movement between the two components so as to change the angle 104. The spring may be coupled to either or both of the lens housing and the first temple, and may provide a force that may move the first temple to one of a plurality positions and/or presses the first temple against a wearer's head. In some embodiments, in the first device as described above, an electronics module is further provided. The electronics module may, for example, comprise at least one of: a power source, a controller, and a sensing module. The use of an electronics module may, in some embodiments, provide the ability to more readily fabricate electro-active spectacles, as the electronics may be manufactured separately and inserted into a plurality of frame designs. The electronics module may be coupled to the first temple or in another suitable location (note that some embodiments may dispose the electronics module or components thereof, for instance, on the lens housing). For example, the electronics module could be embedded or substantially embedded in the first temple (as is described below with reference to the exemplary embodiments shown in FIGS. 3-10). In some embodiments, the first conductive path may be electrically connected to the electronics module. That is, a conductive path may be provided from the electronics module to the lens housing and may comprise a number of components, such as the first spring mechanism or components thereof.

In some embodiments, in the first device as described above, the first conductive path conducts electricity from the first temple to the lens housing when the first temple is in a first position. The first conductive path does not conduct electricity from the first temple to the lens housing when the first temple is in a second position. As was described above, the first and second positions may correspond to relative positions between the first temple and the lens housing. The first position, in which the conductive path conducts electricity, may correspond to a position of the first temple when the first device is in use (e.g. when the first device is worn) and the second position may correspond to a position of the first temple when the device is not in use (i.e. when the device is not worn). As noted above, the conductive path may be provided by any of the components of the first device, such as the first spring mechanism, lens housing, first temple, etc. Embodiments that selectively (i.e. in some instances but not all) provide the conductive path from the lens housing to the first temple may provide some or all of the advantages described above, which may include power conservation and efficiency related to some or all of the electronic components of the first device not operating when the first device is not in use (e.g. any electronics disposed on the lens housing will not be electrically connected to electronic components on the first temple).

In some embodiments, where the first conductive path conducts electricity from the first temple to the lens housing when the first temple is in a first position and the first conductive path does not conduct electricity from the first temple to the lens housing when the first temple is in a second position, the lens housing comprises a first electrical contact and the first spring mechanism forms an electrical connection with the first electrical contact in the first position. In some embodiments, the first spring mechanism does not form an electrical connection with the first electrical contact in the second position. That is, in embodiments wherein the first conductive path or a portion thereof includes the spring mechanism (or a component thereof), the spring mechanism may directly connect to (i.e. physically contact) the electrical contacts disposed on the lens housing. In this manner, the conductive path provided at least in part by the spring mechanism may be selectively provided by contacting and not contacting the electrical contacts on the lens housing.

In some embodiments, in the first device as described above, the first spring mechanism is coupled to the first lens. This may be the case, for instance, when the first device comprises rimless eyeglass frames. The spring mechanism may provide some or all of the same functionality as in full rimmed or semi-rimless embodiments, such as by applying a force such that the first temple applies pressure on the wearer's head. The spring mechanism may also be coupled to the lens housing, even in rimless embodiments (such as when a screw or hinge is coupled to the lens). In some embodiments, the lens includes a first electrical contact, and the first spring mechanism forms an electrical connection with the first electrical contact when the frame is in the first position. That is, the spring mechanism may form a portion of the conductive path that drives current to the lens (and may power and/or control any electronics therein) from the first temple. As noted above, in some embodiments, the spring mechanism may directly connect to the lens, and thereby may also form a direct electrical connection with the electrical contacts disposed thereon. The spring mechanism may itself comprise conductive components (including in some embodiments a conductive spring) that may form the connection. In such embodiments, the spring mechanism may be fixedly coupled to the lens, but the conductive components of the spring mechanism may selectively contact the electrical contacts of the lens.

In some embodiments, in the first device as described above, the first spring mechanism is housed within the first temple. As used herein, the term "housed within" may refer to when the first spring mechanism is coupled to the first temple in such a way that a portion of the first spring mechanism (such as a spring or a conductor) is within the structure of the first temple. However, the first spring mechanism may have some components exposed outside of the structure of the first temple, such as to make electrical connections with other components such as the lens housing. Embodiments that include the spring mechanism embedded within the temple may provide aesthetic value (that is, the electro-active frames may present a more favorable outward appearance), as it may provide a more finished look with components covered or contained within the overall structure of the device. In addition, embedding the first spring mechanism in the first temple (or any component, such as the lens housing) may also provide a more durable or reliable device, as the first temple may protect the spring mechanism from ambient conditions as well as physical damage that spectacle frames are typically subjected to on a regular basis.

In some embodiments, in the first device as described above, the first spring mechanism is in electrical contact with the electronics module. As defined above, electrical contact does not require direct physical contact. There may be any number of conductors located between two components that are in electrical contact. The spring mechanism may be disposed between the electronics module and the electronic components that it controls and/or provides power to, and therefore it may be efficient in some embodiments that the spring mechanism electrically connect to the electronics module. This connection may be made regardless of the position of the first temple, particularly in embodiments whereby the first spring mechanism is disposed on the first temple. In some embodiments, the first spring mechanism is in direct electrical contact with the electronics module. That is, there are no other conductors disposed between the electronics module and the electrical connector. Some exemplary embodiments are illustrated in FIGS. 3-10.

In some embodiments, where the first conductive path conducts electricity from the first temple to the lens housing when the first temple is in a first position and the first conductive path does not conduct electricity from the first temple to the lens housing when the first temple is in a second position, the first spring mechanism maintains electrical contact with the electronics module in both the first position and the second position. This may be the case, for instance, for embodiments on which the spring mechanism is disposed on the first temple. As the first temple is moved (e.g. by the spring mechanism) from the first position (where the spring mechanism may be electrically connected to the lens housing) to the second position, the electrical contact between the first spring mechanism and the lens housing may be severed (e.g. the spring mechanism and the lens housing may no longer be physically coupled). This may provide the selective conductive path discussed above. Embodiments may provide the advantage that only one electrical contact may be required to be connected/disconnected (i.e. only one electrical switch) so as to activate and deactivate the electronics on the lens housing.

In some embodiments, in the first device as describe above, the first spring mechanism is in a first condition when the first temple is in a first position and a second condition when the first temple is in a second position. By "condition," it is meant that any characteristic of the spring mechanism (including the position of the spring mechanism, its size, shape, or length, and/or the conductivity of the spring mechanism) may change. In some embodiments, this change in condition may provide the change in electrical connectivity. For instance, the shape of the first spring mechanism may change so as to provide (or not provide) physical contact between the spring mechanism (or components) thereof and the lens housing. In some embodiments, the spring mechanism may, for example, maintain electrical contact with the lens housing and the first temple by changing its length or shape (e.g. as the distance between the first temple and the lens housing increases, the spring mechanism may increase in length to maintain contact). In this regard, the first spring mechanism may have a first length when the first temple is in a first position and a second length when the first temple is in a second position. The first length and the second length are different. By "length" it is meant that the dimension of the electrical connector in a direction that is substantially parallel to the largest dimension of the temple (preferably when the first device is worn).

In some embodiments, in the first device as described above where the first conductive path conducts electricity from the first temple to the lens housing when the first temple is in a first position, and the first conductive path does not conduct electricity from the first temple to the lens housing when the first temple is in a second position, the first position is an open position. By "open position," it is meant that the first temple is in a position that is substantially perpendicular to the first and/or second lens such as when the frame is positioned on a wearer's head. However, it need not be exactly perpendicular, as in some cases there may be embodiments where the angle between the temple and the lens is less than ninety degree. The angle is shown in FIG. 1 by the angle 104. The angle 104 may vary based on both the shape and size of the wearer's head as well as the size and shape of the frames. For instance, in some embodiments, the first position may comprise the first temple and the lens housing being positioned such that the angle 104 between them is between 60 degrees and 110 degrees. Preferably, the angle 104 between the temple and the lens housing in the first position is between 80 degrees and 90 degrees. This typically corresponds to the angle 104 for when the first device is being worn, and thereby the electronics of the first device may be used.

In some embodiments, in the first device as described above where the first conductive path conducts electricity from the first temple to the lens housing when the first temple is in a first position, and the first conductive path does not conduct electricity from the first temple to the lens housing when the first temple is in a second position, the second position is a closed position. By "closed position," what is meant which is that the temple and the lens form an angle 104 that is significantly less than ninety degrees. This may correspond, for instance, to a situation in which the device is not in a position on a wearer's head and therefore any frame electronics may not need to be activated. In some embodiments, the second position comprises the first temple and the lens housing being positioned such that there is an angle 104 between them of between 0 degrees and 60 degrees. Preferable, the second position comprises the first temple at an angle 104 between 0 degrees and 45 degrees with the lens housing. Again, these angles may correspond to when the first device is not in use.

Figure 2B:
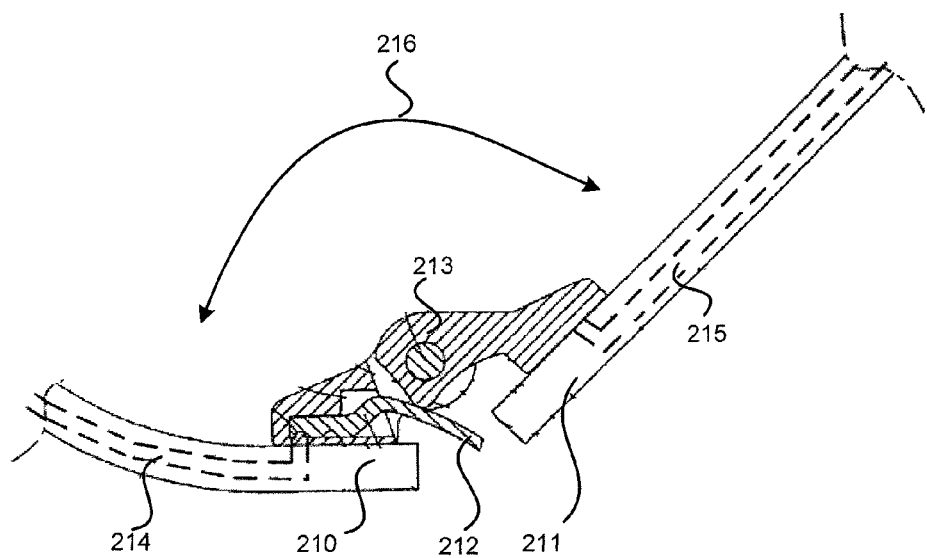

FIGS. 2(a) and 2(b) illustrate two exemplary embodiments of spring mechanisms that could be used in the first device. First, with reference to FIG. 2(a), a spring 202 is provided that is disposed between the lens housing 200 and the first temple 201. In this exemplary embodiment, a portion of the spring 202 is shown as being embedded in the first temple 201. The spring 202 is illustrated as a coil spring, and a conductor 203 is shown disposed within the spring 202 (i.e. the spring substantially encircles the conductor). In some embodiments, the conductor and spring may comprise the spring mechanism. A hinge 204 is shown coupled to both the lens housing 200 and the first temple 201. The hinge 204 permits the first temple to move relative to the lens housing 200. A conductive path is shown by the dotted lines 205 (within the spring mechanism), 206 (within the lens housing 200) and 207 (within the first temple). The conductive path could comprise an embedded conductor within these elements (e.g. a wire or embedded conductive material) or it could represent the components themselves (e.g. the lens housing 200, spring mechanism (i.e. spring 202 and/or conductor 203), and/or the first temple 201 could comprise conductive material). However, embodiments are not so limited, and the conductive path need not be provided by the spring mechanism or a component thereof. The spring 202 may apply a force to the first temple 201 such that the first temple 201 applies pressure on a wearer's head.

With reference to FIG. 2(b), another exemplary spring mechanism for use in an electro-active frame is provided. The spring 212 is not a coil spring, but may comprise elastic material such that when the first temple 211 is moved close to the lens housing 210, the spring 212 becomes depressed. Because of the nature of the material of the spring 212, as it becomes compressed (i.e. it is displaced toward the lens housing 210) it provides an opposing force. This force may separate the lens housing 210 and the first temple and/or, for example, apply force to maintain the first device tightly on a wearer's head. The hinge 213 (which is shown as comprising conductive material) couples the lens housing 210 and the first temple 211 such that they may move relative to one another. A conductive path is shown by the dotted lines 214 (within the lens housing) and 215 (within the first temple). The conductive paths 214 and 215 may be connected (and thereby form a single conductive path) when the first temple 211 is positioned close to the lens housing 210 (e.g. when the spring 212 is sufficiently compressed). Although as illustrated, the conductive path is provided through the conductive hinge 213, embodiments are not so limited. That is, a portion of the conductive path (e.g. between conductive paths 214 and 215) may be provided by any suitable component, such as through the spring 212.

For example, the lens housing 210 and the first temple 211 could comprise electrical contacts at the interface where each may contact the spring 212. When the spring is compressed, there may be formed electrical contacts between the lens housing 210, the spring 212 and the first temple 211. In some embodiments, the conductive path 214 may connect directly to the spring 212 (which, for example, may itself comprise conductive material) such that an electrical contact need only be formed (selectively) with the conductive path 215 in the first temple 211. For instance, when the first temple is moved to contact 212, but prior to fully compressing 212 to contact the lens housing 210, an electrical path from the first temple 211 to the lens housing 210 may be established. This exemplary embodiment may provide the ability to have the conductive path at angles 216 that are less than ninety degrees (which may be beneficial, for instance, to prevent connection problems when the electro-active frames are worn and the pressure applied by the spring causes an angle less than ninety degrees). It should be understood that the spring could, in some embodiments, be located on the first temple and the principles discussed herein would apply equally.

With reference to FIGS. 3-10, an exemplary embodiment of a first device is provided for illustration purposes only. The components that comprise the exemplary embodiment in FIGS. 3-10 include: a first temple 300; electrical connectors 301 to connect to the pogo pins; pogo pins comprising a spring 302 and conductive portion 303 (e.g. stainless steel cable); vertebrae 304; an end piece 305; a spring box cover 306; an electronics module 307; a cavity 308 in the first temple for housing the electronics module 307; and electrical connectors to the electronics module 310. It should be noted that this is for illustration purposes only, and is provided to demonstrate an exemplary embodiment in which pogo pins embedded or coupled to the first temple 300 may be used to maintain an electrical contact with the lens housing throughout a plurality of positions (i.e. angles) between the first temple 300 and the lens housing. Pogo pins may be used with or without a spring mechanism, but when combined with the use of a spring mechanism, embodiments may provide the benefit of maintaining the conductive path when the electro-active frames are worn despite the creation of an angle between the lens housing and the first temple that is less than ninety degrees.

Figure 3:
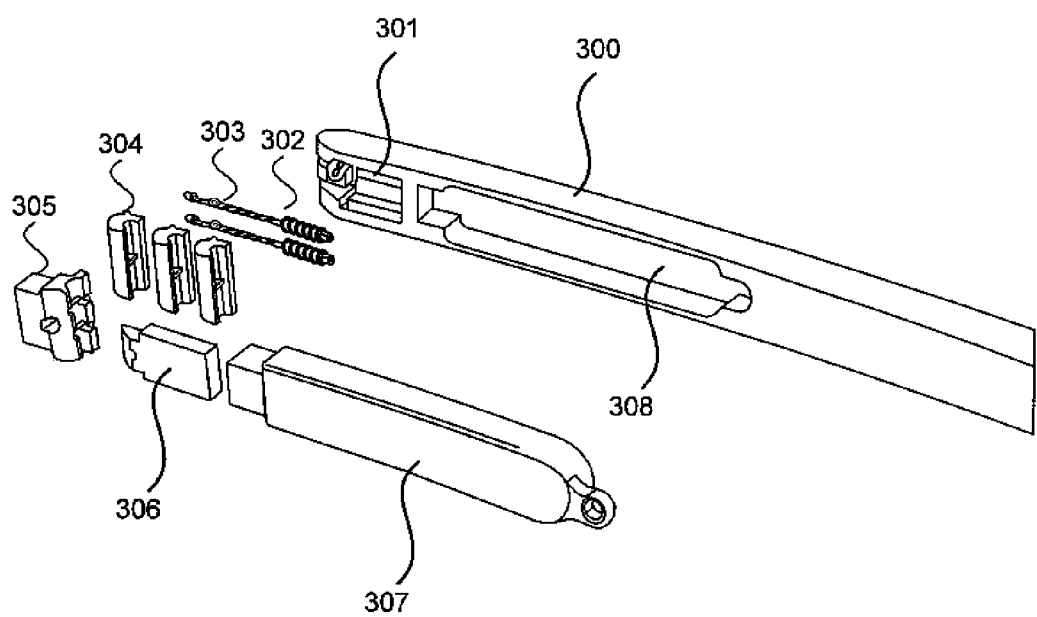
FIG. 3 shows an exploded view of components of a portion of an exemplary device in accordance with some embodiments.

FIG. 3 shows an exploded view of the components comprising a portion of an exemplary device in accordance with embodiments provided herein. The device comprises an electronics module 307 embedded in a cavity 308 of the first temple 300. The electronics module is electrically connected to pogo pins that comprise a spring 302 and a conductor 303. The pogo pins may be used to maintain a connection as the distance (and/or relative positions) between two electrical contacts increases or decreases, because the spring 302 applies force to maintain the electrical contact with the conductor 303. Thus, for instance, embodiments may provide that as the first temple 300 is moved relative to the lens housing, the pogo pins may maintain electrical contact with the lens housing and thereby provide a portion of a conductive path from the first temple 300 to the lens housing. The vertebrae 304 allow the first temple 300 to move relative to the lens housing, while covering the pogo pins. The end piece 305 may comprise a hinge such that the first temple 300 and the lens housing are coupled together, but may move relative to each other. The spring box 306 covers and protects the pogo pins and/or provides aesthetic value be given a finished look to the frames.

Figure 4:
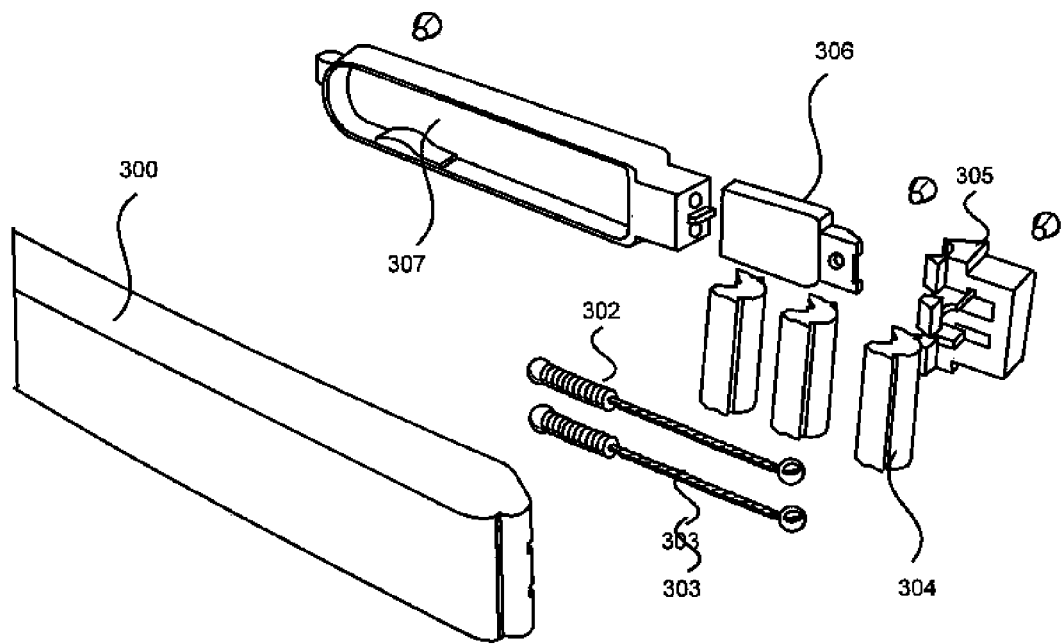
FIG. 4 shows an exploded view of components of a portion of an exemplary device in accordance with some embodiments.

FIG. 4 shows the same components described above with reference to FIG. 3 from an alternative angle. It should be noted that end piece 305, spring box cover 306, and electronics module 307 may be coupled to the first temple 300 using any suitable method (such as adhesive, two sided tape, a screw, etc.).

Figure 5:
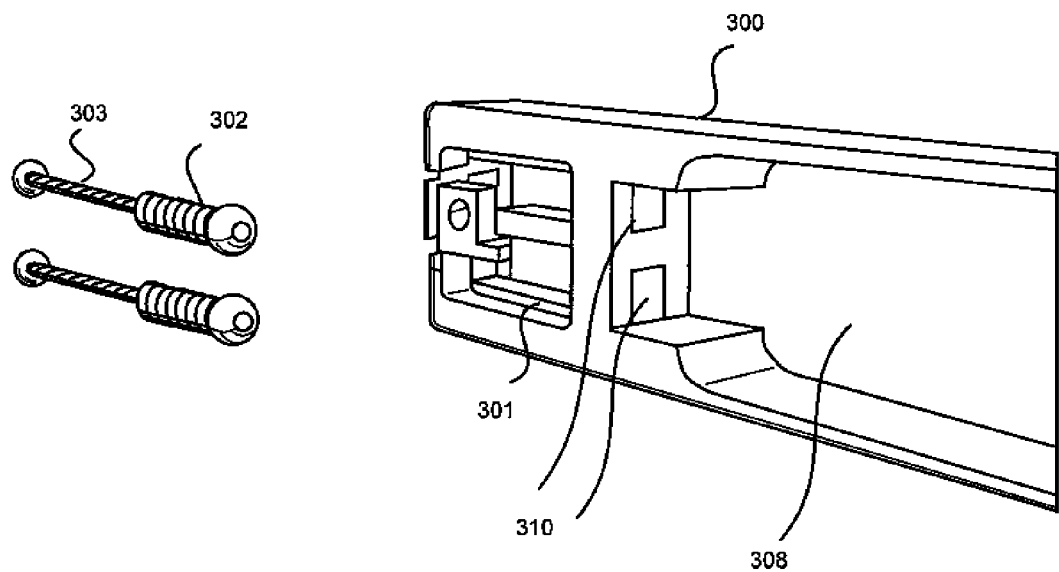
FIG. 5 shows an exploded view of components of a portion of an exemplary device in accordance with some embodiments.

FIG. 5 shows a close-up view of the first temple 300 of the exemplary device. As shown, the pogo pins (and in particular the end of the pogo pins comprising the spring 302) may form an electrical connection with electrical connectors 301. The electrical connectors 301 are embedded within a cavity in the first temple 300. Also shown are connectors 310 that may form an electrical connection with the connectors 301 and the electronics module 307. Thus, the electrical connectors 301 and 310 form a conductive path from the pogo pins to the electronics module (not shown) in the cavity 308. In some embodiments, the connectors 301 and 310 may comprise a single electrical conductor.

Figure 6:
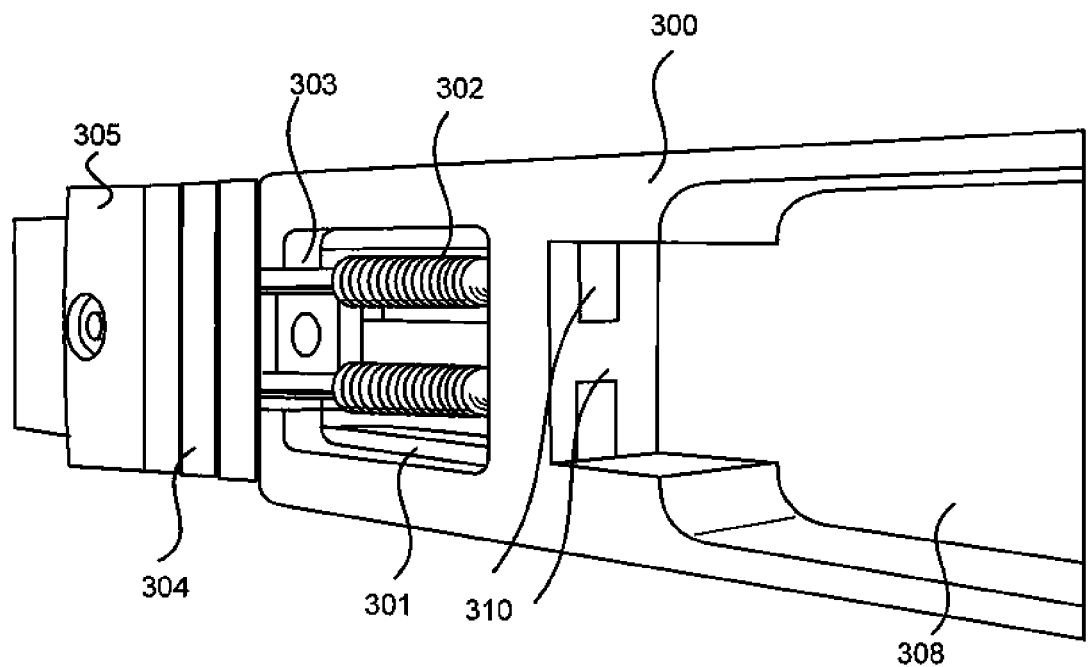
FIG. 6 shows a portion of an exemplary device in accordance with some embodiments.

FIG. 6 shows the components described above coupled together with (or disposed within) the first temple 300. As shown, the vertebrae 304 cover a portion of the conductor 303 of the pogo pins. The electrical connector 301 is shown in physical contact with the pogo pins, and the pogo pins are embedded substantially within the first temple 300.

Figure 7:
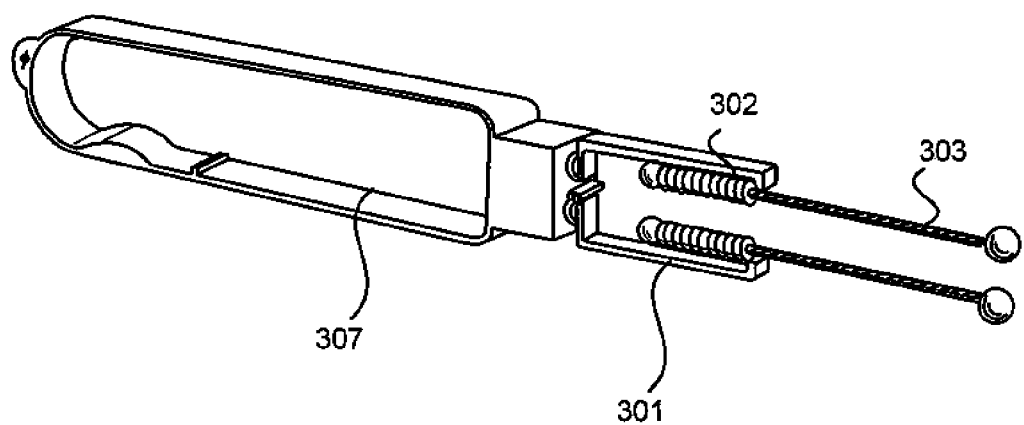
FIG. 7 shows components of an exemplary device in accordance with some embodiments.

FIG. 7 shows an isolated view of the connections formed between the electronics module 307 and the pogo pins. As shown, the electrical connectors 301 are coupled to the electronics module 307 and are in physical (and electrical) contact with a portion 302 of the pogo pins. In this manner, a conductive path is provided from the electronics module 307 to the pogo pins. The pogo pins (via conductor 303) may further form an electrical connection with a portion of the lens housing. In so doing, a conductive path may be provided from the first temple 300 (e.g. from the electronics module 307) to the lens housing. In this manner, the electronics module 307 may provide, for example, power and/or control signals to electronics housed on the lens housing and/or in the lens. Further, as described above, the use of the pogo pins may be beneficial, for example, with the use of a spring mechanism as they may continue to provide a portion of a conductive path between the electronics module 307 and the lens housing for a plurality of positions of the first temple 300 relative to the lens housing (e.g. a number of angles formed there between, as described above).

Figure 8:
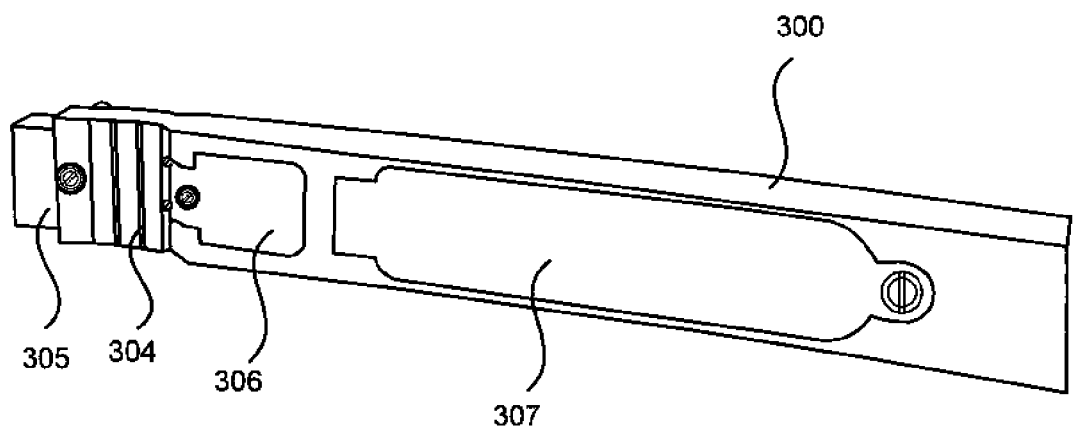
FIG. 8 shows an exemplary portion of an exemplary device with components coupled therein.
Figure 9:
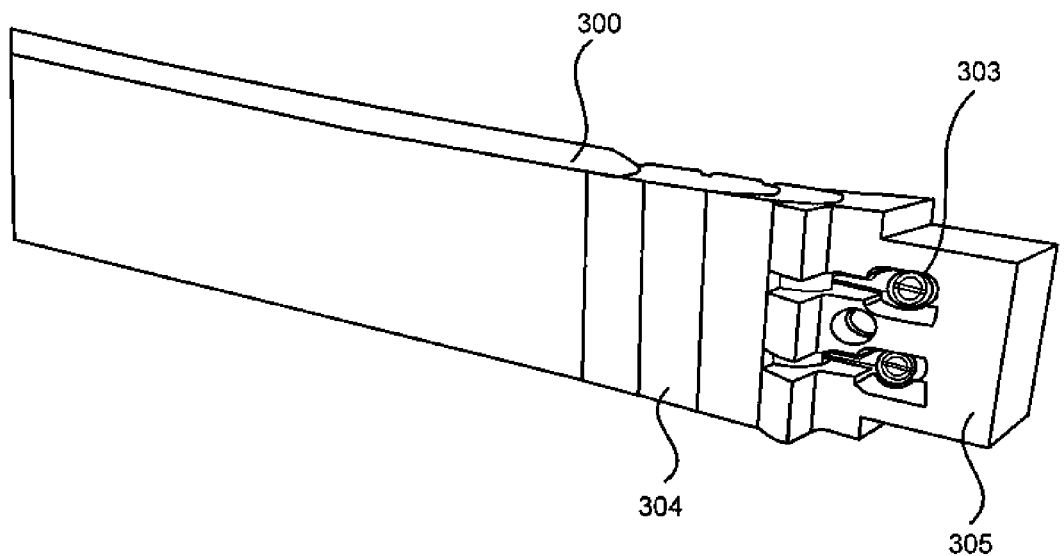
FIG. 9 shows an exemplary portion of an exemplary device with components coupled therein from a different angle.

FIGS. 8 and 9 show views of the first temple 300 with each of the identified components coupled together where appropriate. The exemplary embodiment may provide a finished look (which may be aesthetically pleasing), as each of the internal components (such as the pogo pins, the electrical connectors, and even the electronics module) are relatively concealed or masked with the first temple.

Figure 10:
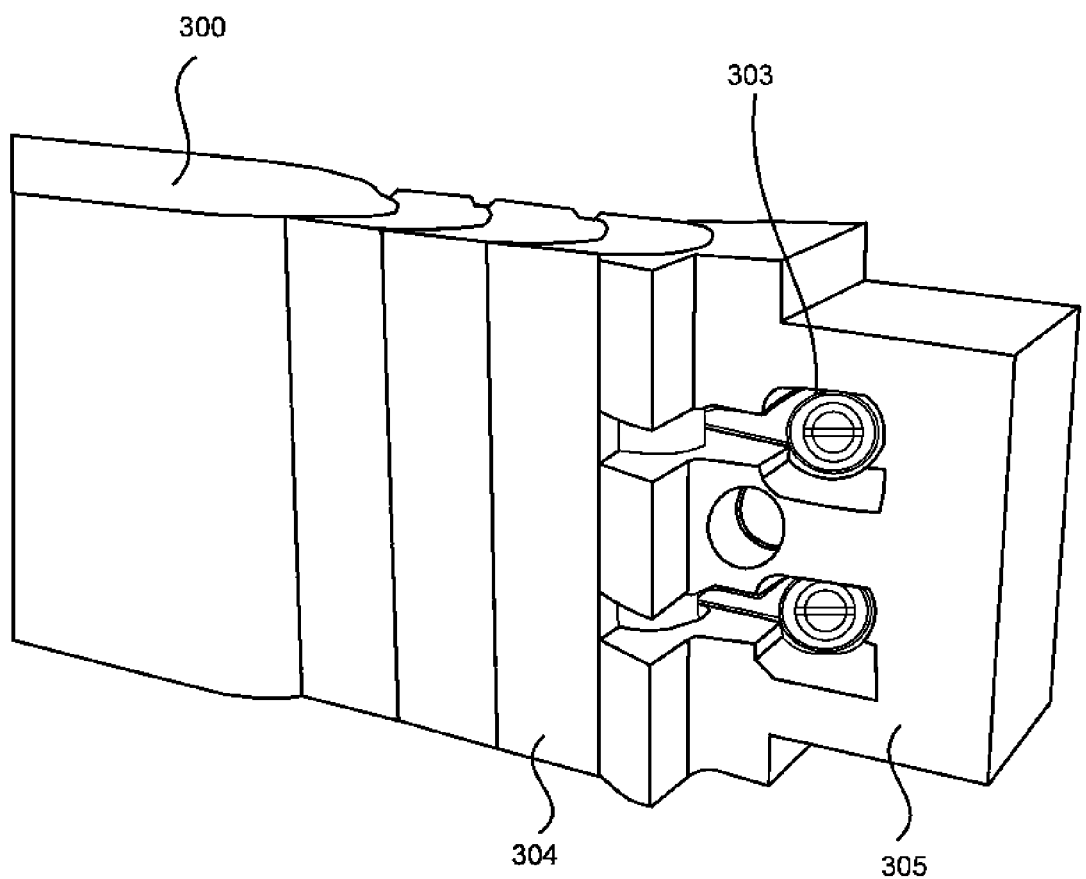
FIG. 10 shows a close-up view of an exemplary portion of an exemplary device with components coupled therein.

FIG. 10 shows a close up of the end piece 305 of the exemplary device. As shown the conductor 303 of the pogo pins are partially exposed so as to be capable of forming an electrical connection with the lens housing. The vertebra 304 cover a portion of the pogo pins, and also provide the ability for the first temple 300 to move relative to the lens housing, while remaining coupled thereto.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Embodiments provided herein may thereby convey some of the advantages of utilizing a spring mechanism on eyeglass frames to embodiments comprising electro-active frames. For example, the use of the spring mechanism may provide for a better and/or more comfortable fit for the wearer, while providing the first conductive path from the first temple to the lens housing may allow for embodiments to utilize electronic components located on either or both of the lens housing (and/or the lens) and the temple. In addition, some embodiments may also provide the advantage of conserving power (and/or the lifetime of the electronics) by providing a conductive path from the temple to the lens housing for some positions of the temple relative to the lens housing, while not providing the conductive path in one ore more other positions.

Exemplary Embodiments Comprising Separate Conductive Paths

Embodiments disclosed herein may provide for electro-active frames comprising multiple conductive paths that are electrically isolated from one another. As more sophisticated electronics are provided on electro-active frames, it may be necessary to provide for additional electrical connections between multiple components. To function properly, these electrical connections (and the conductive paths that provide the electrical signals and current) must be separated (i.e. electrically isolated) to properly control multiple components (or, if an electrical component must be supplied power and control signals, this may also require multiple electrically isolated paths as well). Often times, electrical components are located in the temple of the electro-active frames (typically because there may be more space to dispose such components therein in an aesthetically acceptable manner). Housing electronic components in the temple may require that electrical connections are made between these components in the temple and any electrical components coupled to the lens housing (which may include the lenses themselves).

Embodiments may provide that these conductive paths from the temple to the lens housing of an electro-active frame are provided by frame elements of electro-active frames. As used herein, a "frame element" is any structural component of a frame (including the frame itself) or a component embedded therein such as a wire, conductor (such as metal), or conductive rubber. Thus, for instance, a frame element may include a temple, a bridge, a lens housing (e.g. rim wire for full rimmed or semi-rimless frames, hinges that connect to the lens housing and the temple, and/or other lens housings such as screws, nylon monofilament, etc) or portions thereof. A frame element does not comprise exterior components attached to the frame, such as a wire that runs along an outer surface. In this manner, by providing the conductive paths in a frame element or elements, the electro-active frames may remain aesthetically pleasing by not having bulky cords or other connections running across the frames or in locations where they may be visible.

Electro-active frames, and in particular electro-active frames that have electrical components in one or both lenses, often comprise multiple electronic components such as driving and control components (e.g. one for each lens). This can result in expensive devices with duplicative components. The inventors have found that by, for instance, providing multiple isolated electrical paths using frame elements, is may be possible to reduce the number of duplicative electrical components and thereby significantly decrease the costs of such devices (e.g. by only a single electronics module that may control both of the lenses). That is, the electronic components (such as the power supply, the controller (such as a microprocessor), and the sensor mechanism (such as a switch that can activate the device) are often the components that are of the greatest expense (or are at least are relatively expensive in comparison to some of the other components of the frames). By reducing the number of components in each device, the inventors have provided the benefit of decreasing the costs associated with fabrication materials and decreasing the complexity and time of manufacture. Moreover, frame designs may be lighter and more structurally durable, as there are less components disposed thereon.

Described below are exemplary embodiments of devices comprising conductive paths provided by one or more frame elements (or components thereof) from the temple of a device to the lens housing. The embodiments described below are for illustration purposes only and are not thereby intended to be limiting. After reading this disclosure, it may be apparent to a person of ordinary skill that various components as described below may be combined or omitted in certain embodiments, while still practicing the principles described.

A first device is provided that comprises a frame. The frame further includes a lens housing adapted to support a first lens and a second lens, a first temple coupled to the lens housing, and a second temple coupled to the lens housing. The first device further comprises a first conductive path provided by one or more frame elements from the first temple to the lens housing and a second conductive path provided by one or more frame elements from the first temple to the lens housing. That is, the first device, through the use of two conductive paths, may provide, for instance, multiple electrical connections between two devices (e.g. one connection that provides power and the other that provides a control input), or between a plurality of devices (e.g. a control module or power supply that provides a signal or current to two different components, such as to two electro-active lenses). In this regard, the first conductive path is electrically isolated from the second conductive path. Embodiments may thereby provide the ability to send separate signals (for instance, power and a control signal) from electronics that are housed in the temple to those located on the lens housing. It should be noted that an electrical component need not be located on the lens housing (for instance, an electrical component may be located in a lens of the device). The device in some embodiments, need only provide a conductive path from the temple (i.e. any part of the temple or a component thereon) to the lens housing. The conductive path may further extend to the lenses or to another component disposed thereon (or it may even extend through the lens housing and to the other temple).

It is often desirable (and/or necessary) for electrical components to be located or disposed on the lens housing to serve their intended purposes. For instance, if an electronic component displays an image to the viewer, changes the refractive index of the lens, or otherwise provides functions related to the wearer's vision, then these components may need to be located on (or near) the lenses. However, as noted above, the lens housing (or the lenses themselves) often does not have adequate space for the additional electrical components that may be required to activate and/or utilize the electronic components located on the lens housing or lenses (such as a power source, controller, or sensing module). In addition, these components may be aesthetically unpleasing and noticeable if disposed on the lens housing (or the lenses themselves). It may therefore be desirable in some embodiments to locate some or all of these additional electrical components on (or within) the temples of the frame. The temples typically have space available on which the additional electronic components may be disposed on and/or hidden or masked so as to remain aesthetically appealing.

However, as noted above, it may be necessary to provide a conductive path between the components in the temple and those located on the lens housing (or on the lenses). By using the frame element (e.g. the components themselves or conductors embedded therein), the inventors have developed embodiments of a device that may provide the necessary conductive paths to the lens housing, while maintaining the aesthetics of the device. Moreover, by electrically isolating the components so as to provide separate conductive paths, the inventors have developed embodiments of a device that may provide multiple inputs and connections to electrical components that may be coupled to the lens housing.

In some embodiments, the first device as described above further comprises at least one electrical insulator disposed between at least a portion of the first conductive path and the second conductive path. By "at least a portion" it is meant that electrical insulator need not be disposed along the entire first or second conductive paths (or along an entire interface between the two paths). Embodiments may provide different ways of electrically isolating the two conductive paths that may, for instance, combine the use of the insulator with other components or features (such as by providing an air gap between the two conductive paths in a region) and/or may utilize multiple insulating materials.

Figure 11:
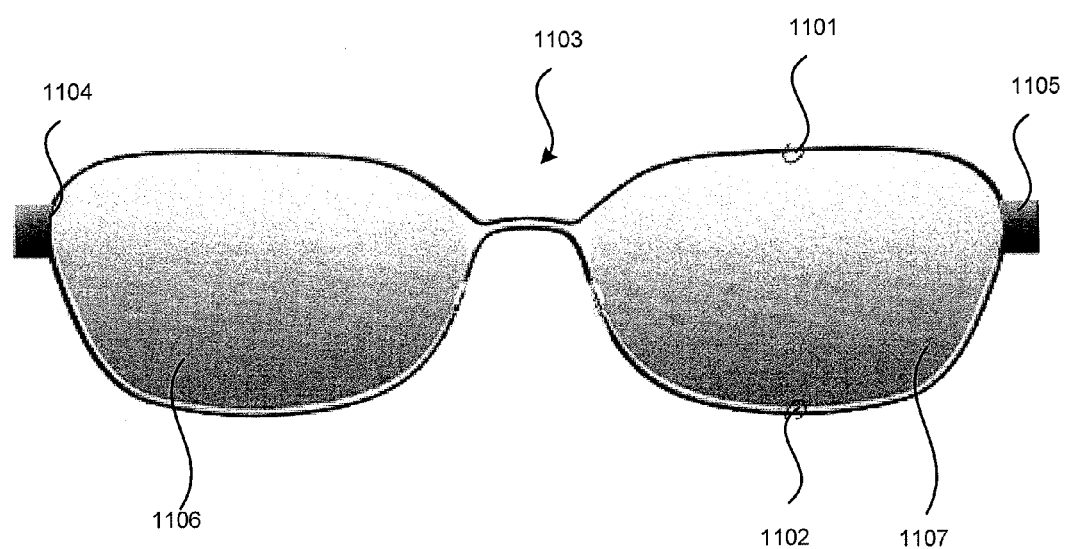
FIG. 11 shows an exemplary embodiment of a device in accordance with some embodiments.
Figure 12:
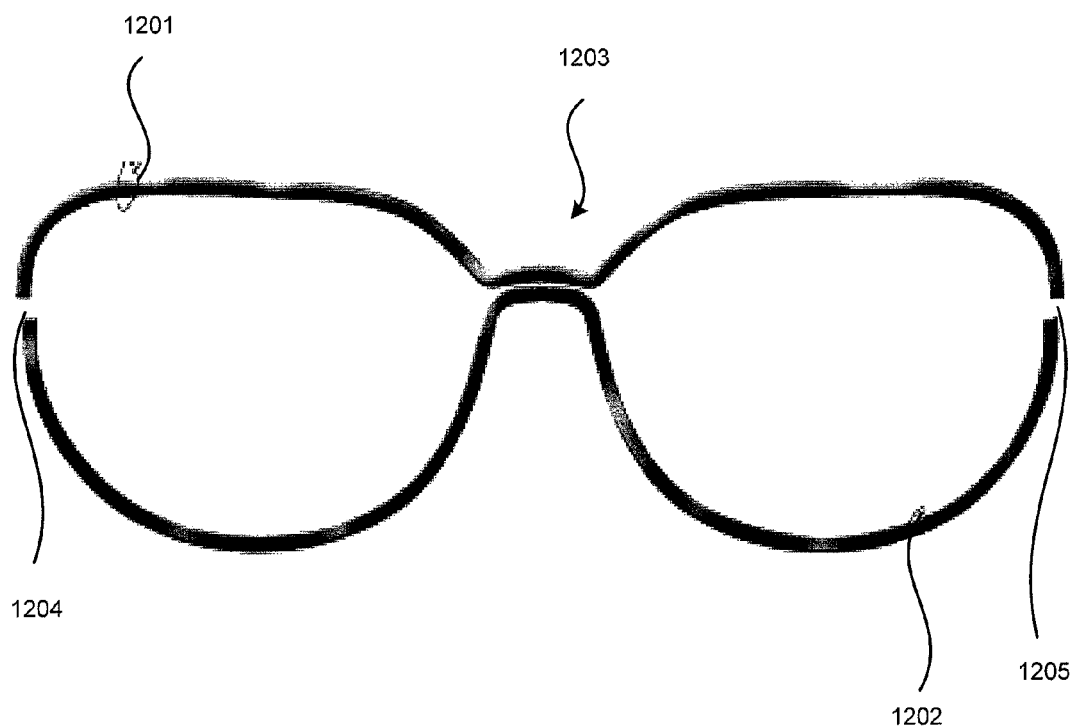
FIG. 12 shows an exemplary design mask in accordance with some embodiments.

The electrical insulator may be made of any suitable material, and may in some embodiments (such as embodiments where the conductors are embedded within a frame element) comprise a part of a frame element (such as when the frame element comprises a plastic material). For instance, in some embodiments, the electrically insulating material may comprise an injection moldable or similarly formed plastic material. In some embodiments, the electrically insulating material comprises nylon. The electrical insulator may be utilized in some embodiments in which the frame element comprises conductive material, and thereby two electrical paths may utilize the insulating materials to form the two conductive paths (although as described below, other methods may also be used when the frame elements comprise conductive material to isolate two conductive paths—such as by separating the paths using an air gap). Additional exemplary embodiments related to similar embodiments are shown in FIGS. 11-12. In addition, embodiments may comprise multiple electrical insulators (for instance multiple pieces of the same material or different material) and the insulating material may be located along different portions of the electrical paths (for instance, a portion of the insulating material may be located in the temple and another portion of the insulating material may be located in the lens housing).

In this regard, in some embodiments, the first device further comprises a first hinge coupled to the first temple and the lens housing. The first hinge may connect the temple to the housing, and allow the temple to move relative to the housing.

The electrical insulator may be located at least within the first hinge. For instance, in some embodiments, a portion of the electrical path or paths may comprise the hinge (that is, the hinge may comprise conductive material or conductive material may be embedded therein). The hinge may comprise a portion of the conductive paths in some embodiments because it is coupled to both the lens housing (or comprises a part of the lens housing) and the temple, and thereby may provide a conductive path between the two frame elements. An example of a hinge comprising a portion of a conductive path is shown in FIGS. 2(a) (e.g. path 205-206) and (b) (e.g. path 214-215). The hinge may, for example comprise conductive material, and an insulator may be disposed therein so as to define two electrically isolated conductive paths. However, as noted above, the electrical insulator may be located in any suitable location, or in multiple locations, as needed. For instance, in some embodiments, the electrical insulator is located at least within the first temple. In some embodiments, the electrical insulator is located at least within the lens housing. This may be preferred, for example, in embodiments of semi-rimless frames wherein a partial eye-wire (which may be used to mask or hide an embedded conductor or conductors) is present only over one portion of the lenses (e.g. the top or the bottom of the lenses). The two conductive paths may be located in the partial eye wire, and the electrical insulator may be used to separate the two paths.

In some embodiments, the first device as described above further comprises an electronics module that is coupled to the first temple of the frame. As noted above, the electronics module and other components may be preferably located on the temple in some embodiments for both practical and aesthetic reasons. The electronics module may comprise, for example, a controller, a power source, and/or a sensing mechanism. Some or all of these components may be used to operate electrical components located on the lens housing, which may thereby require an electrical contact between the electronics module and the component. In this regard, the first and second conductive paths may be electrically connected to the electronics module. In this manner, the electronics module (or the components therein) may be electrically connected to components coupled to the lens housing (such as those located in the lenses for the first device). In some embodiments, the use of frame elements to provide portions of the conductive paths, in addition to the electronics module being embedded in the first temple, results in a device that may appear to an observer to be an ordinary (non-electro-active) frame. Furthermore, in some embodiments, the electronic components (e.g. coupled to an embedded electronics module) and the conductive paths (comprising a fame element or elements) may be protected from the elements, and may, for example, reduce the likelihood that a short may occurs from an outside charge or force.

In some embodiments, the first device as described above further comprises a first lens having a first electrical contact and a second lens having a second electrical contact. That is, some embodiments of the first device may comprise electro-active lenses (such as lenses that perform different function when current is supplied to them or a component therein). To provide current to the electro-active lens or components therein, the lenses may comprise one or more electrical contacts. In some embodiments, the first conductive path electrically connects to the first electrical contact of the first lens and the second conductive path electrically connects to the second electrical contact of the second lens. That is, the first conductive path may electrically connect to the first lens and the second conductive path may electrically connect to the second lens. In this manner, for example, embodiments may provide that a single electrical component (or electronics module) that is coupled to both the first and the second conductive paths may provide signals and/or current to the first and second lens of the device separately. For instance, embodiments, may provide for the first and second lens to be controlled separately utilizing the electrically isolated conductive paths. Rather than a single electrical component (or electronics module), the first lens and the second lens may be individually controlled by separate electrical components (i.e. the first and second conductive path may, but need not, electrically connect to a single component).

In some embodiments, in the first device as described above that comprises a first lens having a first electrical contact that is electrically connected to the first conductive path, and a second lens having a second electrical contact that is electrically connected to the second conductive path, the first lens may further include a second electrical contact and the second lens may further include a first electrical contact. That is, the first and the second lenses may each comprise a first and a second electrical contact such that each may receive a plurality of signals or currents from one or more electrical components. In some embodiments, the first conductive path may electrically connect to the first electrical contact of the second lens and the second conductive path may electrically connect to the second electrical contact of the first lens. In this regard, the first lens and second lens may each be electrically connected to both the first and second conductive paths. Such embodiments may, but need not, provide for simultaneously controlling both the first and the second lens using a single electronics module or other components. Embodiments may thereby utilize, for example, a single electronics module that is electrically connected to both the first and second lenses.

As was described above, the use of a single electronics module and/or electrical components (such as those that may be coupled to the first temple of the device) to control a plurality of electrical components (such as those that are coupled to the lens housing and/or electro-active lenses of the first device) may provide several benefits. This includes, for example, removing redundant electrical components, and thereby reducing the manufacturing costs and complexity of the first device without sacrificing functionality. Such embodiments may also remove the need to synchronize the first and second lenses. That is, for example, if the first and second lenses are electro-active lenses and are controlled using two different electronics modules (or components therein), the operation of each may have to be matched with the other (otherwise, a wearer may become distorted or receive conflicting functionality from the lenses). Synchronizing the lenses could require additional electrical components and further add to the cost and the complexity of the first device.

Indeed, in some embodiments, the second temple or the second lens does not comprise an electronics module coupled thereto. In this manner, the electro-active frames may comprise less redundant features by utilizing a single electronics module (or the components therein) electrically connected to both the first and second lenses (or other components coupled to the lens housing). In some embodiments, the use of two electrical connections (i.e. via the first and second conductive paths) may be the minimal number of electrical contacts needed for electrical components located on the lens housing or the electro-active lenses (e.g. the first and second lenses) to function properly.

In some embodiments, in the first device as described above, the lens housing comprises a non-conductive material and the frame element providing the first conductive path (or a portion thereof) comprises a conductive material embedded in the lens housing. That is, the conductive path may comprise material embedded in the lens housing. This may provide the benefit that the lens housing material itself may electrically isolate the first conductive path from other components (such as the second conductive path). Also, utilizing a non-conductive material for the lens housing (rather than a conductive material) may prevent short faults with the electronic components, or false signals generated by outside sources (such as by static electricity). In some embodiments, the frame element providing the second conductive path (or a portion thereof) comprises a conductive material embedded in the lens housing. In such embodiments, the frame elements providing the portions of the first and second conductive paths may be embedded within the lens housing such that a sufficient amount of non-conductive material (e.g. the material that comprises the lens housing) is disposed between the two conductive paths such that they remain electrically isolated. In some embodiments, additional electrical insulation may be provided and embedded within the lens housing as well. In some embodiments, the lens housing comprises acetate. Acetate is one of the more common materials that eyeglass frames comprise. It is non-conductive and it may therefore be preferable to use this material for some of the embodiments described above utilizing non-conductive materials.

In some embodiments, in the first device as described above where the first device comprises a first and second lens having first and second electrical contacts, where the first conductive path electrically connects to the first contact of the first and second lens, and where the second conductive path electrically connects to the second contact of the first and the second lens, the lens housing may comprise a conductive material. A first portion of the lens housing may provide at least a part of the first conductive path. That is, a portion of the lens housing that comprises a conductive material may form an electrical connection between the first electrical contact of each of the first and second lenses. An exemplary embodiment of this is shown in FIGS. 11 and 12, and described in detail below. In some embodiments, at least a part of the second conductive path is provided by a second portion of the lens housing. That is, for example, the lens housing may be separated into a plurality of electrically isolated portions. This may be done in any manner, such as by having two separate conductive pieces that are shaped appropriately (e.g. shaped into the mold of the lens housing portions such that when coupled to the first device, the first and second portions may support the lenses) and coupling the two portions to the first device (such as by coupling the portions to hinges or the temples) so that the portions remain are physically separate (i.e. electrically isolated).

In this manner, some embodiments may offer some advantages over other designs for providing electrically isolated conductive paths such as, by way of example, providing a less complicated manufacturing process. That is, for embodiments where the lens housing itself comprises conductive material, there may be no need to provide conductive material embedded within the lens housing (which could be a complex and intricate process, particularly when attempting to define multiple electrically isolated conductive paths. By utilizing a more macro approach such as physically separating the large conducting components of the frame to form the conductive paths (e.g. a top portion 1101 and a bottom portion 1102 that are separated at the ends 1104 and 1105 where they may be coupled to the temples (or a hinge) of the first device and in the center 1103 by an air gap or insulation), embodiments may provide a readily achievable and commercially feasible design for providing the electrically isolated conductive paths.

Continuing with these exemplary embodiments, wherein the first device comprises a first and second lens having first and second electrical contacts, where the first conductive path electrically connects to the first contact of the first and second lens, where the second conductive path electrically connects to the second contact of the first and the second lens, where the lens housing comprises a conductive material, where a first portion of the lens housing provides at least a part of the first conductive path, and where at least a part of the second conductive path is provided by a second portion of the lens housing, the first portion of the lens housing and the second portion of the lens housing may be separated by at least one of an air gap or insulating material. This may again be illustrated with reference to the exemplary embodiments in FIGS. 11 and 12, where the electrical isolation between the first 1101 and the second 1102 conductive paths is an air gap at the bridge 1103. Other points of electrical isolation are provided at the edges of the lens housing 1104 and 1105 where the first portion 1101 and second portion 1102 of the lens housing are coupled to the temples at different locations. In some embodiments, rather than an air gap at the bridge 1103, electrical insulation may be used. This may provide an advantage over the air gap embodiments because the portions 1101 and 1102 above and below the air gap are likely to, at some point, be misshaped such that the electrical isolation may be compromised (particularly when considering the daily abuse that eyeglasses may be subject to). In contrast, if insulation is used at 1103, even if the portions 1101 and 1102 change shape, there may still be insulation disposed between the two portions, thereby potentially maintaining the electrical isolation. As noted above, in some embodiments, the bridge 1103 includes the first portion 1101 and the second portion 1102 of the lens housing (or portions thereof) and the air gap may be formed there. In some embodiments, the air gap has a maximum distance of at least approximately 10 mm. This distance for the air gap may provide enough separation between the first 1101 and second portion 1102 that the air gap is unlikely to be compromised during everyday use. In some embodiments, the first portion of the lens housing and the second portion of the lens housing comprise metal.

Continuing further with these exemplary embodiments, in some embodiments, where the first device further comprises at least one electrical insulator disposed between at least a portion of the first conductive path and the second conductive path, the electrical insulator may include a first component and a second component. The first component of the electrical insulator disposed between the first conductive path and the second conductive path comprises the first lens and the second lens. That is, again with reference to FIG. 11 for illustration purposes only, the first portion of the insulation may refer to the separation provide by the first 1106 and second 1107 lenses. That is, in some embodiments, the lenses are not made of a conductive material (or comprise embedded conductive materials) such that current could flow from the first portion 1101 to the second portion 1102 of the lens housing. In some embodiments, the second component of the electrical insulator disposed between the first conductive path and the second conductive path includes at least one of: an air gap and an electrically insulating material. That is, again with reference to FIG. 11, the second portion of the insulation may refer to the separation provided at the bridge 1103. In some embodiments, the second component of the electrical insulator is disposed between the first lens and the second lens. In this manner, the second portion of the insulator may prevent current from flowing between the two components and thereby compromising the electrical isolation of the first and second portions of the lens housing.

In some embodiments, and as noted above, the electrically insulating material that electrically isolates the first portion of the lens housing from the second portion of the lens housing may comprise an injection moldable or similarly formed plastic material. This material may be preferred because of its ability to mold its shape to the particular area it is confined to. Moreover, because it is injection moldable, it may be easier to apply this material to portions of the frame, such as embedding within the lens housing or the bridge area. In some embodiments, the electrically insulating material comprises nylon.

In some embodiments, the first device as described above may comprise semi-rimless eyeglass frames. As defined above, in some embodiments, semi-rimless eyeglass frames typically have partial eye-wires around some of the first and second lenses to provide support. It may be preferred that the first and second conductive paths are provided in this portion of the semi-rimless eyeglass frames because, for instance, the eye-wire is typically the thicker portion of the lens housing (i.e. this portion may be better able to hide the electrical components, and may also better protect the electrical connections from damage) in comparison to the nylon monofilament or other material that may be used on the remaining sections of the lenses to hold them in place. In this regard, in some embodiments, the first conductive path and the second conductive path are each disposed within the lens housing of the semi-rimless spectacles. For semi-rimless frame design embodiments, both of the electrical conductors that comprise the first and second conductive paths, respectively, may be disposed over the top of the lens (or the bottom, depending on the style of frames and/or where the portion of eye-wire (or the thicker portion of the lens housing) may be located). The first and second conductive paths may be separated by an electrically insulating material. That is, for instance, the lens housing in a semi-rimless design may comprise eye-wire (or any other suitable lens housing components) over the top portion of the first and second lens. This portion of the lens housing may comprise both the first and the second conductive paths, as well as an insulating material (such as nylon) disposed between the conductive paths such that the first and second conductive paths may be both electrically coupled to the first and second lens, and remain electrically isolated from the other.

In some embodiments, in the first device as described, the lens housing comprises full rimmed spectacle frames. Exemplary embodiments are shown again in FIGS. 11 and 12, but embodiments art not so limited. For example and as described above, full rimmed design embodiments may also comprise the first conductive path and the second conductive path provided by materials embedded within the lens housing. That is, embodiments are not limited to using only lens housing that comprise conductive materials. The full rim embodiments may include lens housings that comprise metal or plastic (or some combination thereof). In general, full rimmed designs may be preferred from a functional standpoint as the eye-wires that many such embodiments comprise may provide a ready means, as described in examples above, of providing a first and second conductive path from the temple to the lens housings, and/or from the lens housings to the lenses.

Although embodiments may provide one or more conductive paths from a temple to the lens housing which may, in some embodiments, provide one or more advantages related to reducing the number of components used for the electro-active frames, embodiments are not so limited. Indeed, the concepts discussed and described above may be equally applicable to embodiments that comprise multiple electronics modules and/or other components located on both the first and the second temple. In general, these embodiments may present advantages over single module embodiments such as, for instance, greater flexibility in controlling the individual components (such as electro-active lenses) by having individual controls located on each temple for each (or both) components. Provided below are additional exemplary embodiments:

A first device is further provided that comprises a frame. The frame further comprises a lens housing adapted to support a first lens and a second lens, a first temple coupled to the lens housing, and a second temple coupled to the lens housing. The first device further includes a first conductive path provided by one or more frame elements from the first temple to the lens housing, a second conductive path provided by one or more frame elements from the first temple to the lens housing, a third conductive path provided by one or more frame elements from the second temple to the lens housing, and a fourth conductive path provided by one or more frame elements from the second temple to the lens housing. As noted above, the use of frame elements provides many advantages over systems that may utilize exposed wires or other methods for establishing a conductive path between a temple of the frame and the lens housing. In the first device, each of the first, second, third, and fourth conductive paths are electrically isolated from each other. As noted above, it is generally beneficial to provide multiple electrically isolated conductive paths so as to control multiple electronic components and/or provide additional functionality, such as by providing power and signal paths to the components.

The first device as described above in some embodiments may provide the advantage that multiple electronics modules and/or electronic components may be disposed on either or both of the temples of the electro-active frame. This may, for instance, allow for more functionality than single module embodiments, based on, for instance providing for additional electronics to be included on the first device. Moreover, by providing electronics modules on both temples, embodiments may provide the advantage of not having to utilize a conductive path across the bridge of the frames to power/control electronic components on both sides of the lens housing. This may, in some embodiments, reduce the complexity of manufacturing that portion of the electro-active lens frame. In addition, in some embodiments, the conductive path across the bridge may be the location in which the electrical isolation between the various conductive paths is more likely to be compromised. Some embodiments may also provide for a more robust electro-active frame (and/or lens system), with potential backup systems and redundancy provided for the electronic components on each temple.

In some embodiments, in the first device as provided above, the first conductive path is electrically isolated from the second conductive path by an electric insulator and the third conductive path is electrically isolated from the fourth conductive path by an electric insulator. The insulator may comprise any suitable material and may be located in any suitable location, such as at least in the temple, hinge, or lens housing, as described above. In some embodiments, the first device further includes a first electronics module that may be disposed on the first temple and a second electronics module disposed on the second temple. Such embodiment, as noted above, may provide the advantages of controlling multiple elements (such as electro-active lenses) individually, or providing a redundancy system so that the electro-active lenses may function after a failure in one of the electronics modules.

In some embodiments, the first device further includes a first lens having a first electrical contact and a second electrical contact and a second lens having a first electrical contact and a second electrical contact. In some embodiments, the first conductive path may electrically connect to the first electrical contact of the first lens, the second conductive path may electrically connect to the second electrical contact of the first lens, the third conductive path may electrically connect to the first electrical contact of the second lens, and the fourth conductive path may electrically connect to the second electrical contact of the second lens. In some embodiments, the first and second conductive paths electrically connect to the first electronics module and the third and fourth conductive paths electrically connect to the second electronics module.

That is, it may be the case that in some embodiments, the conductive paths that are provided from the first temple to the lens housing are segregated in both position and function from the conductive paths that are provided from the second temple to the lens housing (however, embodiments are not so limited). For instance, in some embodiments comprising electro-active lenses, the first and second conductive paths may be electrically connected to the first lens and the third and fourth conductive paths may be electrically connected to the second lens. In some embodiments, neither the first nor second conductive path is coupled to the second lens. Similarly, in some embodiments, neither the third nor the fourth conductive path may be electrically coupled to the first lens. In this regard, the first and second electrical paths may be electrically isolated from the third and fourth conductive paths based largely on the fact that there is no overlap in function or coverage. That is, for instance, the first and second conductive paths may be on a first side having a first lens, and the third and fourth conductive paths may be on a second side of the lens housing having the second lens. This, as noted above, in some embodiments, there may be no need to have a conductive path across the bridge. However, embodiments are not so limited, and any or all of the conductive paths may cross the bridge of the electro-active frames.

Figure 13:
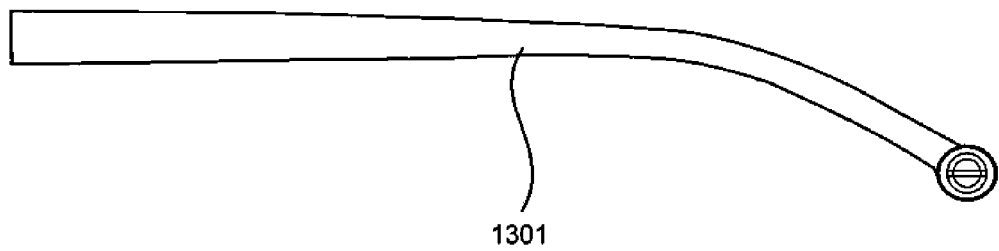
FIG. 13 shows an exemplary temple of an electro-active spectacle frame in accordance with some embodiments.

With reference to FIGS. 11-13, exemplary embodiments of the first device comprising a plurality of electrically isolated conductive paths disposed on an electro-active spectacles frame are provided. With reference to FIG. 11, an exemplary embodiment of a device comprising electro-active lenses housed within an electro-active frame is provided. As described above, one or more electronic modules that can activate and deactivate one or both of the electro-active lenses 1106 and 1107 can be positioned within either or both temples of the electro-active spectacle frame.

As shown in FIG. 11, a full rimmed electro-active spectacle frame is provided. Moreover, as shown, FIG. 11 is an example of an exemplary embodiment in which the lens housing may comprise conductive material. As was described above, embodiments are not so limited.

The exemplary device in FIG. 11 comprises an upper rim portion 1101 (i.e. a first portion of the lens housing) that may comprise a portion of a first conductive path. The upper rim portion 1101 can be made of metal in some embodiments, but is not so limited. The first conductive path can provide a first link (i.e. an electrical connection) between an electronics module and a first electronic contact or terminal (not shown) of one or both electro-active lenses or any other electronics components that may be located on the lens housing.

Continuing with the description of the exemplary embodiment shown in FIG. 11, the exemplary electro-active spectacle frame comprises a lower rim portion 1102 (i.e. a second portion of the lens housing) that may comprise a portion of a second conductive path. The lower rim portion 1102 may also be made of metal, but is not so limited and any conductive material may suffice. The second conductive path may provide a second link (i.e. electrical connection) between the electronics module and a second electronic contact or terminal (not shown) of one or both electro-active lenses or any other electronics components that may be located on the lens housing.

By providing the upper 1101 and lower 1102 rim portions, embodiments may provide separate conductive routes to both electro-active lenses 1106 and 1107. Thus, in some embodiments and as described above, the electro-active lenses (or any other components located on the lens housing) can be controlled/powered by a single electronics module positioned on either the right or left temple portion of the electro-active frame. However, embodiments are not so limited and may provide for multiple electronics modules located on either or both of the temples.

As shown in FIG. 11, the upper 1101 and lower 1102 rim portions, which may comprise a portion of the first and second conductive paths, respectively, may together form a bridge 1103 of the electro-active spectacle frames. The bridge 1103 of the electro-active spectacle frames can be formed without having the upper 1101 and lower 1102 rim portions touching (i.e. in physical or electrical contact), so as to ensure separate conductive paths (i.e. maintain the first and second conductive paths as electrically isolated from one another). In addition, the upper 1101 and lower 1102 rim portions are physically and electrically separated at the ends 1104 and 1105, so as to maintain electrical isolation from the other. The upper 1101 and lower 1102 rim portions may be coupled to a hinge, temple, or other frame component at the ends 1104 and 1105, but at different locations so as to remain electrically isolated from each other. The rim portions may also be electrically connected to the other portions of the first and second conductive paths at the ends 1104 and 1105.

With reference to FIG. 12, an exemplary illustration of an aesthetic component is provided (e.g. a design mask). The design mask comprises an upper snap-on element 1201 and a lower snap-on element 1202. The upper 1201 and lower 1202 snap-on elements can be positioned on top of the upper rim portion 1101 and the lower rim portion 1102, respectively. The upper 1201 and lower 1202 snap-on elements may comprise a non-conductive material, such as plastic, but are not so limited. The upper 1201 and lower 1202 snap-on elements can be used to alter the style or design of the electro-active spectacles.

With reference to FIG. 13, an exemplary temple 1301 is shown that may comprise a part of an electro-active spectacles frame. One or more electronic components, such as an electronics module, may be coupled to the temple 1301.

Embodiments Comprising a Compliant Conductive Element

Previously, the inventors developed novel electro-active spectacle lenses that may be manufactured as semi-finished lens blanks capable of being surfaced and edged using methods known to those skilled in the art into finished spectacle lenses that, for instance, correct a patient's vision (or provide other beneficial functionality, such as tinting, polarizing, filtering, etc.) and fit within a spectacle frame. The inventors have also developed novel electro-active spectacle frames of various designs capable of operating and/or functioning with electro-active spectacle lenses and/or other electronic components, including, for example, the exemplary embodiments disclosed above.

As described therein with reference to exemplary lens design and manufacture, in some embodiments, the finished lenses may be processed from semi-finished lens blank using methods and equipment that may be known to those skilled in the art. In this regard, a means for making electrical connections between the frames and the lenses that is consistent with some or all of those methods and equipment may also be beneficial. In other instances (or in congruence), it may be beneficial to provide electrical connections between various components disposed on, or within, electro-active frames that may also provide flexibly, adaptability, durability, and/or more reliable electrical contacts.

As detailed below, a means for making such electrical connections (e.g. in a manner that may be consistent with currently used lens processing methods and/or frame designs) is provided. The means for providing the electrical connections between components of an electro-active fame (such as the connections from the lens to the frame), as described herein, may comprise a compliant conductive element. In this manner, embodiments may allow for a robust and forgiving connection consistent with the requirements related to the regular stress experienced by eyeglasses (such as when taken on and off one's face, being dropped, worn when sleeping, struck with objects, bent by small children, etc.). In addition, embodiments comprising a compliant conductive element that provides electrical connections as described herein may be utilized for any and all uses whereby the eyeglass frames houses some, most, or all of the electronics and the lens comprises a component or components that must be activated and or deactivated by an electrical current.

As used herein, a "compliant conductive element" may refer to a physically compliant and compressible material that is electrically conductive. That is, for instance, the material typically has the properties that it is physically malleable (e.g. capable of being deformed, at least along a surface) but is still electrically conductive such that is may comprise a portion of a conductive part. The conductive compliant element may comprise, by way of example only, conductive rubber. Conductive rubber may include, but is not limited to, an elastic hydrocarbon polymer. A particular not limiting example of material that may comprise a compliant conductive element includes a metal loaded silicone elastomer. The compliant conductive element may be preferably extruded or otherwise molded into a shape that may conform to portions of either (or both) of the lens housing and lens so as to form an electrical connection (e.g. an electrically conductive bridge) between the lens and lens housing. The compliant conductive element may also be used to form electrical connections between other portions of the frame and/or other electrical components.

With some or all of the above in mind, a first device may be provided. The first device may include a lens comprising at least a first electrical contact. That is, for instance, the first lens may comprise an electro-active lens such that the lens may provide a particular functionality, feature, or property when current or voltage is supplied that it may not provide when no current or voltage is supplied (or the functionality may vary based on the amount of current or voltage supplied, etc.). Examples of such lenses were provided above. The electrical contact of the first lens may be utilized to electrically couple the lens (or a portion thereof) to other electronic components (such as, for instance, a controller or power supply) that may provide such voltage or current (e.g., in the form of a control signal or power supply).

The first device may also comprise a lens housing holding the lens. The lens housing may include at least a second electrical contact. That is, for instance, the lens housing (such as was defined above) or a component therein may comprise a part of a conductive path, and the second electrical contact may be used to electrically connect the conductive path to another conductive element (which may also be embedded in the lens housing, coupled the lens housing, or comprise any other part of the first device or component thereto, such as the lens).

The first device may further comprise a compliant conductive element disposed between the first and the second electrical contact that electrically connects the first and second electrical contacts. That is, the compliant conductive element may be disposed such as to provide current between the first electrical contact and the second electrical contact (in this exemplary case, between the lens and the lens housing). In this manner, embodiments may supply current (e.g. power or a control signal) from a component coupled to another portion of the first device (e.g. on a first temple of an electro-active frame) to the lens via the lens housing.

As noted above, the use of a compliant conductive element may, in some embodiments, provide some advantages over previously used conductors and other means of connecting components in an electro-active frame, particularly when forming connections to an electro-active lens. For instance, the use of a compliant conductive element (as described above) may form better electrical connections to the surface of an electrical contact (particularly shaped surfaces, such as beveled edges) because the compliant conductive element may conform substantially to some or all of those surfaces. In this manner, the interface between the electrical contacts (i.e. the area of the connection) may be larger, providing increased electrical conductivity between the two.

In addition, the use of a compliant conductive element may, in some embodiments, provide for a more robust electrical connection that may withstand external forces more effectively than previously used conductors. That is, in part because the electrical connections between a compliant conductive element and the electrical contacts may comprise a larger area, if a force applied to the device or a portion thereof causes a part of the electrical connection between the compliant conductive element and one of the electrical contacts to be separated (i.e. no longer directly electrically connected), there may still be sufficient contacts in other portions of the interface that may permit sufficient current to transfer between the components so as to result in little or no disruption in functionality of the device.

In addition, a compliant conductive element may, in some embodiments, conform and/or adapt to changes in the disposition of a first electrical contact in relation to a second electrical contact that it is disposed between (e.g. in the exemplary device described above, a compliant conductive element may adapt to changes in the disposition of the lens housing relative to the lens). For instance, if the separation between the lens and the lens housing increases at a location where an electrical contact is formed between the two components using a compliant conductive element, then in some embodiments, the compliant conductive element may expand in that location so as to maintain the electrical contact. Similarly, in some embodiments, if there is an increase in the force applied between the lens housing and the lens (for instance, an external force is applied to the lens housing causing it to be misshaped or displaced in the direction of the lens), the compliant conductive element may compress in the location between the components where the force is applied (this may include a temporary displacement, such as when the conductive compliant component absorbs some or all of the force applied by compressing and then expanding). By so doing, the compliant conductive element may, in some embodiments, absorb stress applied to the first device, and maintain the electrical connection between components.

Moreover, by absorbing some or all of the forces applied thereto, a compliant conductive element may, in some embodiments, prevent or limit damage to either of the components that comprise the first and second electrical contacts. For instance, if a force were applied to a typical device above that which causes the lens and the lens housing to directly contact, the lens may become chipped at the interface, which could threaten the integrity of the lens, the ability of the lens housing to hold the lens, and/or effect the electrical contacts between the two components. The use of conductive compliant material disposed between portions of these components may reduce or prevent this direct contact, and may serve to absorb such forces and limit damage.

The use of a compliant conductive element in a first device may, in some embodiments, provide advantages during the manufacture process as well. For instance, as noted above, many lenses are shaped and edged prior to being coupled to a lens housing of an electro-active frame. This may result in slight differences between each lens that is then coupled or housed within a lens housing. In embodiments where an electrical contact is formed between these components, the use of a compliant conductive element that may adapt or conform to features provided on either of the surfaces of the electrical contacts, as well as the relative disposition between the two components, may reduce manufacturing costs and defects, and provide for more reliable and suitable devices.

It should be noted that these advantages are provided as examples of the advantages that some embodiments may provide, and therefore embodiments disclosed herein need not have some or all of the advantages described above.

In some embodiments, in the first device as described above that includes a lens having a first contact, a lens housing having a second contact, and a compliant conductive element disposed between, and electrically connecting, the first and second contacts, the compliant conductive element comprises conductive rubber. That is, conductive rubber is an example of a material that may comprise the compliant conductive element. Conductive rubber may have some of the characteristics, such as physical malleability while also having sufficient conductivity, to provide some or all of the advantages noted above in some embodiments.

Figure 24:
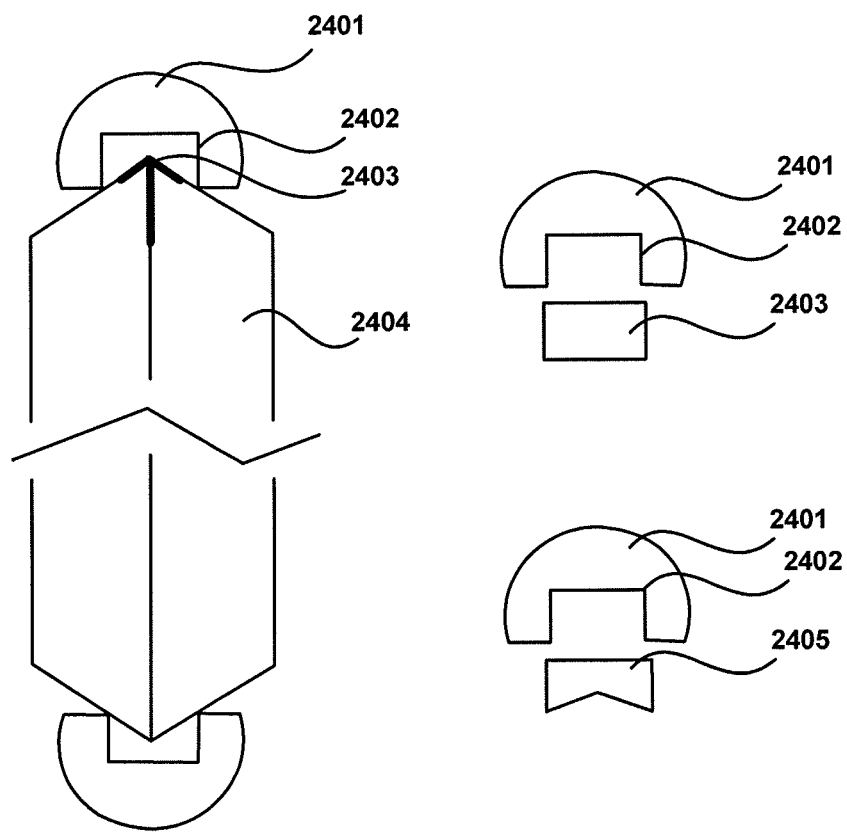
FIG. 24 shows an exemplary embodiment of a device in accordance with some embodiments.
Figure 25:
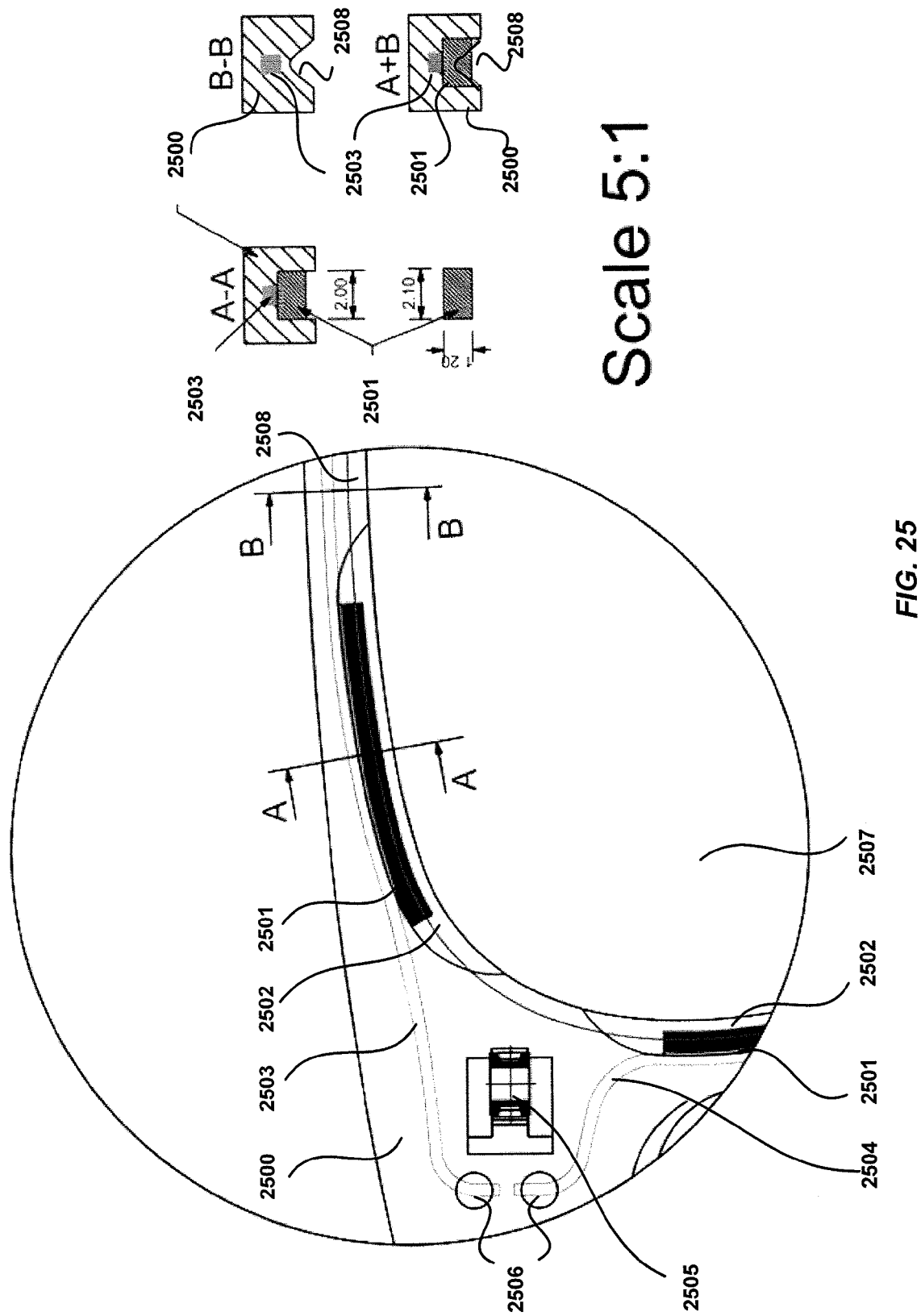
FIG. 25 shows an exemplary embodiment of a device in accordance with some embodiments.

In some embodiments, in the first device as described above that includes a lens having a first contact, a lens housing having a second contact, and a compliant conductive element disposed between, and electrically connecting, the first and second contacts, the compliant conductive element may be disposed substantially between the lens housing and the lens. That is, as noted above, in some embodiments, the compliant conductive element may be disposed between some or all of the portions of the lens and lens housing. In some embodiments, where the compliant conductive element is disposed between substantially all of the portions of the lens and lens housing, embodiments may comprise the compliant conductive element being disposed over the entire outer surface of the lens that is directly opposite to a surface of the lens housing (or only the portions of the outer surface of the lens that have a lens housing surface directly opposing the lens outer surface). In some embodiments, the compliant conductive element may be disposed between portions of the lens and lens housing where an electrical connection is not made (e.g. portions of the lens and lens housing not comprising an electrical contact). This may provide some of the benefits detailed above, including reducing damage caused by physical contact between the relatively rigid surfaces of the lens and lens housing, even in areas where no electrical connection is made. In some embodiments, the compliant conductive element is only disposed between portions of the lens and lens housing that comprises electrical contacts. The reduction in the amount of the compliant conductive element may thereby reduce manufacturing costs. An exemplary embodiment is shown in FIG. 25. In addition, in such embodiments, the lens housing may be manufactured so as to comprise different portions corresponding to sections that have the compliant conductive element disposed there between, and those that do not. In so doing, the first device may utilize a more efficient lens housing design to accommodate whether there is or is not compliant conductive material disposed between sections of the lens housing and the lens. Exemplary embodiments are disclosed in FIGS. 21-25.

In some embodiments, in the first device as described above, the compliant conductive element has a shape that comprises any one of, or some combination of: a triangle, a square, a "figure 8," an oval, a circle, or a rectangle. As used herein, the "shape" of the compliant conductive element may refer to the cross section of the compliant conductive element taken on a plane perpendicular to the longest dimension of the compliant conductive element. For example, in some embodiments where the compliant conductive element is extruded, the shape generally corresponds to the aperture through which the compliant conductive element was extruded. Examples of shapes of the compliant conductive element are shown in FIGS. 20(a)-(c).

In some embodiments, it may be preferred that the shape of the compliant conductive element comprises a "figure 8" because, for instance, the compliant conductive element may provide structural support and assist in coupling the lens and the lens housing. A "figure 8" may refer to a compliant conductive element that has a shape that comprises two end pieces and a center piece disposed between the two end pieces. The two end pieces are thicker than the center piece. The two end pieces need not have the same thickness or the same length.

In some embodiments, it may be preferred that the compliant conductive element comprise a square or rectangle shape as opposed to a triangle shape (particularly when the lens has a beveled edge), because the square or rectangle shape may provide a greater area of electrical connectivity by conforming to more of the surface of the lens. This is due, in some embodiments, to the "triangle" shape resulting in the edge of the lens compressing the compliant conductive material against an opposing surface of the lens housing without permitting the compliant conductive element to cover the lower portions of the lens surface.

It should be noted that, in some embodiments, the shape of the compliant conductive element may not conform precisely with a corresponding shape (e.g. rectangle, square, etc.) at the surface of the compliant conductive element. That is, at the surface of at least a portion of the conductive compliant element, the shape of the compliant conductive element may be slightly altered as it conforms to an opposite surface of the lens or lens housing that it is physically contacted with. Thus, the "shape" of the compliant conductive element may refer to either the shape of the compliant conductive element when disposed between the first and the second electrical contacts, or the uncompressed shape of the compliant conductive element (i.e. the shape of the compliant conductive element either before it is between the first and second electrical contacts, or before it have a force applied to its surface). In addition, it should be understood that in some embodiments, the compliant conductive element may not comprise any shape, or it may comprise other shapes than those expressly mentioned, including irregular shapes and shapes that vary along the length of the compliant conductive element (i.e. the compliant conductive element may not have a single shape, but the shape may depend on the location of that particular portion of compliant conductive element.

In some embodiments, in the first device as described above, the compliant conductive element includes a first end having a first thickness, a second end having a second thickness, and a center portion having a third thickness that is disposed between, and coupled to, the first end and the second end. The first thickness of the first end and the second thickness of the second end are each greater than the third thickness of the center portion. An exemplary embodiment of this shape is shown in FIG. 20(a). That is, embodiments so described may refer to the conductive element having a shape that corresponds to a "figure 8," which may have some or all of the advantages noted above.

In some embodiments, in the first device as described above, the compliant conductive element may comprise an extrusion. As used herein, an "extrusion" may refer to an object made by squeezing, or otherwise disposing, material through an aperture that shapes the material. It may be generally beneficial, in some embodiments, to use an extrusion for some or all of the compliant conductive element because, for instance, the use of an extrusion may be an efficient manner of disposing the compliant conductive element between the lens and the lens housing (or between any other two components). The space between the lens and the lens housing may be relatively small (on the order of a millimeter), and therefore an extrusion that may be injected into the cavity (particularly when the material may conform to the shape of the cavity) may be less complex than shaping a conductor into the correct size and shape and inserting it into the cavity. Moreover, it may be less complex to apply the compliant conductive element to portions of the lens housing that may be difficult to access based, for instance, on the design features of the first device. In addition, embodiments that utilize an extrusions may provide the advantage that compliant conductive element may be disposed between a plurality of different designs of lenses and lens housing, without having to design a specific a component or components for each combination.

In some embodiments, in the first device as described above, the lens comprises a first surface and the lens housing comprises a first surface. The compliant conductive element substantially conforms to at least a portion of the first surface of the lens and at least a portion of the first surface of the lens housing. As was described above, the compliant conductive element may have physical properties that permit it to adapt and conform to the interfaces of the components it is disposed between based on a force applied to its surface. Thus, in some embodiments, when the conductive compliant element is disposed in the lens housing or cavity thereto (or on a surface of the lens), and when the lens and lens housing are then coupled, a force may be applied to the compliant conductive element disposed between the opposing surfaces of the lens and the lens housing such that the conformation may occur. Embodiments may thereby provide some of the benefits that were described above, including the ability to provide better electrical contacts between electrical contacts, and maintaining those contacts despite changes in the relative positions of the surfaces.

In some embodiments, the first device as described further comprises a first temple coupled to the lens housing and an electronics module coupled to the first temple. The compliant conductive element is electrically connected to the electronics module. As defined above, electrically coupled does not require that the two components be in direct physical contact. Thus, embodiments may provide that the first device comprises a conductive path from the electronics module to the compliant conductive material. The conductive path could include, for example, a conductor coupled to the electronics module, a portion of the temple itself (or a conductor embedded therein), a portion of the lens housing itself (or a conductor embedded therein), and the second electrical contact. As described above, it may be beneficial both structurally and aesthetically to locate electronic components in the temple of an electro-active frame because, for instance, the additional space provided (as compared to the lens and lens housing) as well as the ability to hide or mask those electronic components relatively out of sight of an observer (or at least not as pronounced a location as the lens housing or frame).

In some embodiments, in the first device as described above that comprises a first temple coupled to the lens housing and an electronics module coupled to the first temple, the first device further includes a conductor that is substantially embedded within the temple and/or the lens housing. The conductor may electrically connect the electronic module to the compliant conductive element. The conductor may comprise any suitable material, including metal. Although the conductor in some embodiments may be embedded substantially within the lens housing and/or the first temple, the conductor may have portions exposed so as to make electrical contacts with other components. As was described above, a conductive path may comprise a number of electrically connected components, and therefore using a conductor embedded in either the temple and/or the housing may be a means for efficiently establishing a conductive path from the electronics module to the compliant conductive element. The compliant conductive element may then be electrically coupled to another electronic component (such as an electro-active lens). In this manner, embodiments may provide a conductive path to conduct current (e.g. control signals and/or power) from the temple to the compliant conductive material (and then, for instance, to the electro-active lens). As noted above, in some embodiments, a first portion of the conductor may be exposed and electrically connects the electronic module to the compliant conductive element. That is, as used herein, the first portion of the conductor may be "exposed" if it is not surrounded by a the lens housing along at least a portion of the conductor such that an electrical connection may be made to the compliant conductive element.

In some embodiments, in the first device as described above that comprises a first temple coupled to the lens housing, an electronics module coupled to the first temple, and a conductor that is substantially embedded within the temple and/or the lens housing, the lens housing comprises acetate. As noted above, acetate is a common material used in the manufacture of eyeglass frames, and is generally non-conductive. Thus, in some embodiments, so as to provide a conductive path from the electronics module coupled to the first temple, a conductor may be embedded in the lens housing comprising a non-conductive material. It may be generally preferred that a conductor is embedded within a frame element such that the frame element (or a portion thereof) may isolate a conductive path (or a portion thereof) from external forces, such as potential shorts and/or excess voltages. In contrast, in some embodiments where the lens housing comprises a conductive material, the lens housing itself (or a portion thereof) may comprise a portion of a conductive path that electrically connects the electronic module to the compliant conductive element.

In some embodiments, the first device as described above comprises semi-rimless, rimless, or fully rimmed spectacle frames. Exemplary embodiments of some of these spectacle frames are described below with reference to the figures.

In some embodiments, in the first device as described above that includes a lens having a first contact, a lens housing having a second contact, and a compliant conductive element disposed between, and electrically connecting, the first and second contacts, the lens includes a first groove, the lens housing includes a first cavity, and the compliant conductive element comprises a first and a second portion. The first portion of the compliant conductive element may be disposed substantially within the first groove of the lens. This is shown, for example in FIGS. 19 and 23-24. As used herein, "disposed within" may refer to a portion of the compliant conductive element being located such that the cavity of the lens housing or the groove of the lens surrounds approximately three sides of the portion of the compliant conductive element. The second portion of the compliant conductive element may be disposed substantially within the first cavity of the lens housing. In this manner, the compliant conductive element may support the coupling of the lens and the lens housing, while at the same time completing electrical connections with electrical contacts on the surface of each of the lens and the lens housing.

Figure 20:
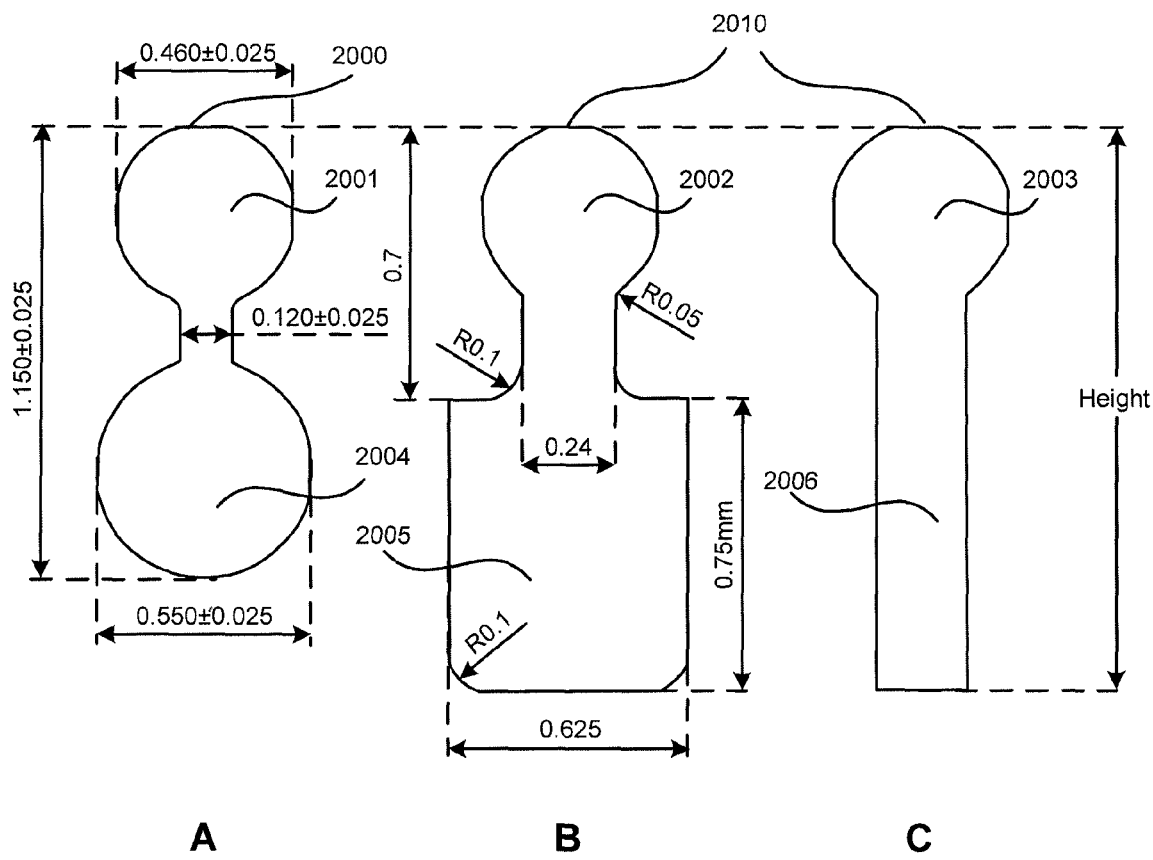
FIGS. 20 (*a*), (*b*), and (*c*) show exemplary embodiments of components of a device in accordance with some embodiments.

In some embodiments, in the first device as described above, the first portion and the second portion of the compliant conductive element are connected by a bridge. A "bridge" in this context refers to the material that is located between the first and second portions of the compliant conductive material. With reference to FIG. 20 for example, first portions 2002 and 2003 are connected, respectively, to second portions 2005 and 2006 by a "bridge." The bridge in these exemplary embodiments happens to comprise the same material as the first and second portions. However, the bridge may comprise any shape and any suitable material.

In some embodiments, in the first device as described above where the first portion of the compliant conductive element is disposed substantially within the first groove of the lens, and the second portion of the compliant conductive element is disposed substantially within the first cavity of the lens housing, the first portion of the compliant conductive element has a first shape that comprises any one of: a triangle, a square, a circle, and a rectangle. In some embodiments, the second portion of the compliant conductive element has a second shape that comprises any one of: a triangle, a square, a circle, and a rectangle. In general, it is preferred to choose the shape and dimensions of the portions of the compliant conductive element so as to maximize the electrical contacts that the material can make on the surfaces of the lens and/or the lens housing. In this regard, it may be beneficial to choose shapes that maximize the surface area interface when the conductive compliant element is compressed (usually a shape that corresponds to the shape of either the lens housing cavity or the lens groove. However, embodiments are not so limited. Examples of shapes are provided in FIGS. 20(*a*)-(*c*). In some embodiments, the lens has a first surface that is located within the first groove and at least a part of the first portion of the compliant conductive element substantially conforms to the first surface of the first groove. The "first surface" may comprise as at least a portion of the outermost surface of the groove of the lens. Again, this is typically the surface forms part of the conductive path with the compliant conductive material. In this regard, In some embodiments, the first surface of the lens is coated with a conductive paint so as to not only contacts the compliant conductive material, but may also provide of an easier and better connection to the components of the electro-active lens.

In some embodiments, in the first device as described above where the first portion of the compliant conductive element is disposed substantially within the first groove of the lens, and the second portion of the compliant conductive element is disposed substantially within the first cavity of the lens housing, the first groove of the lens has width approximately within the range of 0.4 mm and 1.0 mm and a depth approximately within the range of 0.4 mm and 1.0 mm. In some embodiments, the groove of the first lens has width of approximately 0.7 mm and a depth of approximately 0.6 mm. As described below, the specific dimensions of the components may depend on the functionality of the lens and lens housing. However, generally it is desirable to have the relative dimensions between the width and of the height cavity, the groove, and of the compliant conductive element to be relatively similar. This may permit the compliant conductive element to ser both a structural role (in coupling the lens and the lens housing, as well as serving as a protective layer of sorts between at lest a portion of the lens and the lens component. The dimensions of these components is discussed with reference to FIGS. 20 and 23

In some embodiments, in the first device as described above where the first portion of the compliant conductive element is disposed substantially within the first groove of the lens, and the second portion of the compliant conductive element is disposed substantially within the first cavity of the lens housing, the lens housing has a first surface that is located within the first cavity. The "first surface" may comprise at least a portion of the outermost surface of the cavity of the lens housing. A part of the second portion of the compliant conductive element may substantially conform to the first surface of the first cavity. Similar to the connections that the compliant conductive material forms with the surface of the lens, the compliant conductive element also forms contacts with portions of the lens housing. However, in some (but certainly not all) embodiments the contacts formed with the lens housing are to embedded conductors that have portions exposed and therefore, while beneficial, it may not be as necessary for the compliant conductive material to conform to as much of the surface of the lens housing as it is to conform with the surface of the lens.

Figure 23:
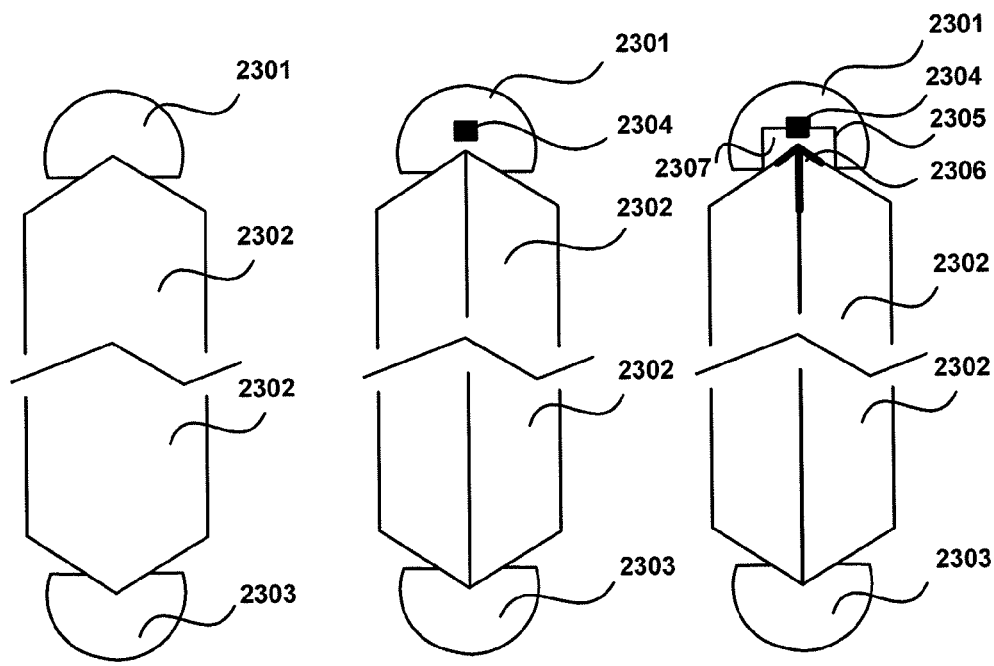
FIGS. 23(*a*)-(*e*) show exemplary embodiments of a device in accordance with some embodiments.
Figure 23:
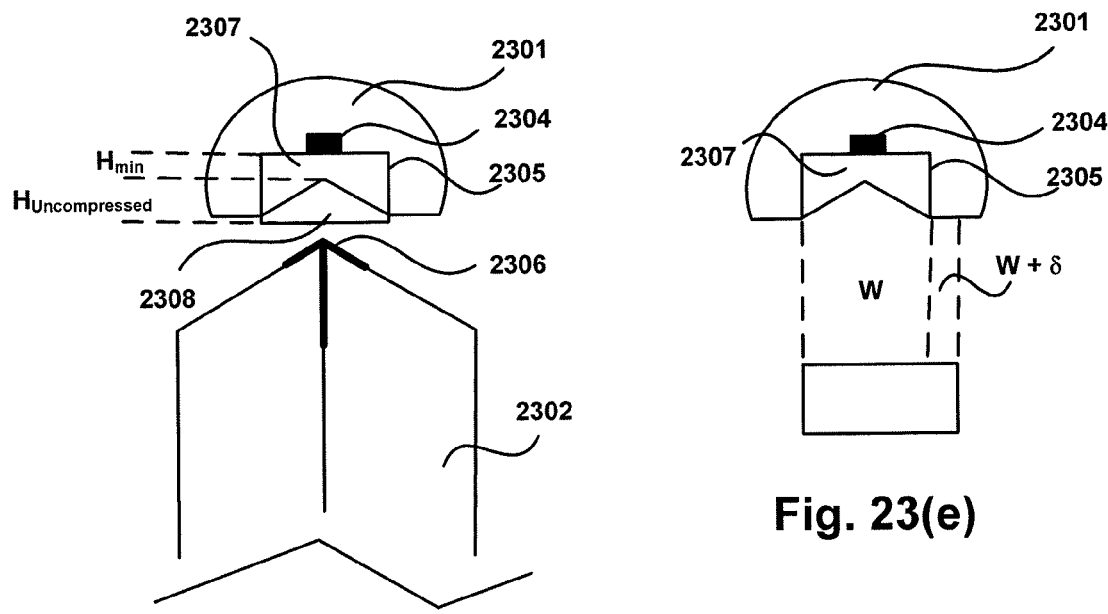

In some embodiments, in the first device as described above where the first portion of the compliant conductive element is disposed substantially within the first groove of the lens, and the second portion of the compliant conductive element is disposed substantially within the first cavity of the lens housing, the compliant conductive element has an uncompressed height of at least the distance between the first surface of the first groove of the lens and the first surface of the first cavity of the lens housing. The "uncompressed height" of the compliant conductive element is the height of the compliant conductive element when the material is not subject to an external stress. The "height" of the compliant conductive element may refer to the dimension of the element that is substantially perpendicular to the lens housing and the lens. An example illustrating the uncompressed height is shown in FIG. 23(*d*). In some embodiments, the uncompressed height of the compliant conductive element is at least 0.75 mm. In some embodiments, the uncompressed height of the compliant conductive element is at least 1.45 mm. However, as noted above, the dimensions of the element may vary based on the other dimensions of the device. Generally, the greater the uncompressed height, the more surface covered (and more electrical connections that can be made) by the compliant conductive element when it is disposed between the lens and the lens housing. In this regard, in some embodiments, the first surface of the lens housing and the first surface of the lens compress at least a portion of the compliant conductive element when the lens housing and the lens are coupled. In this manner, the compliant conductive element can form electrical connections, while also providing ancillary benefits to the device, such as protecting the rigid components from damage from directly contacting one another.

In some embodiments, in the first device as described above, the lens comprises a first surface, the lens housing comprises a first cavity, and the compliant conductive element comprises a first surface. The compliant conductive element is disposed substantially within the first cavity of the lens housing, and the first surface of the compliant conductive element substantially conforms to the first surface of the lens. In some embodiments, the first surface of the lens comprises a first and second beveled edge. A "beveled edge" may refer to an inclination that is cut into a lens that forms an angle, including an angle equal to 90 degrees. The lens usually comprises a beveled edge (rather than a groove) in embodiments comprising full rimed frames (rather than semi-rimless frames), where the lens may be coupled to the lens housing based on the portion of the lens being disposed inside a cavity of the lens housing. In some embodiments, the first cavity has a first width and the compliant conductive element has an uncompressed width that is greater than the first width of the cavity. The "uncompressed width" may refer to the width of the compliant conductive element when the rubber is not subject to external stress. This is illustrated in FIG. 23(e) and described below.

In some embodiments, in the first device as described above, where the compliant conductive element is disposed substantially within a first cavity of the lens housing, and where a first surface of the compliant conductive element substantially conforms to a first surface of the lens, the cavity of the lens housing has a top surface. A portion of the lens extends into the first cavity of the lens housing. The compliant conductive element has an uncompressed height that is approximately equal to or greater than a distance from the top surface of the cavity of the lens housing to the portion of the lens that extends into the first cavity. This concept is illustrated in FIG. 23(d). Generally, the compliant conductive element preferably has a height such that when the lens is disposed in the cavity of the lens housing, a portion of the lens contacts, and thereby compresses the compliant conductive element. As noted above, it is generally beneficial to have a height that is substantially greater than this minimum distance to provide more robust electrical connections. The "top surface" may refer to the surface of the lens housing that is opposite the lens.

In some embodiments, in the first device as described above, the compliant conductive element comprises metal loaded silicon elastomers. In some embodiments, the metal comprises silver and aluminum (AG-Al). However, any material that has the physical properties described above with reference to the compliant conductive material may be used.

In some embodiments, in the first device as described above, the compliant conductive element has a volume resistivity that is less than 10 Ω-cm. In some embodiments, in the first device as described above, the compliant conductive element has a volume resistivity that less than 1 Ω-cm. The "volume resistivity" may refer to the electrical resistivity, resistivity, or specific electrical resistance. Generally, it is preferable to have a low volume resistivity for a conductor because there will be less losses associated with the resistance. This may be particularly important in some embodiments, as the compliant conductive element may be compressed, which may thereby increase the density, and concurrently increase the resistivity of the element. Thus, it may be important in some embodiments to choose a material that has a low resistivity, even when uncompressed such that its volume is decreased.

In some embodiments, in the first device as described above, the compliant conductive element has a hardness on the shore durometer A scale that is greater than 50. In some embodiments, the compliant conductive element has a hardness on the shore durometer A scale that is greater than 65. The hardness of the element refers to its ability to conform to surfaces under pressure, as well as a materials general malleability. As noted above, in some embodiments, to form optimal connections, the compliant conductive element conforms to the shape of the lens and/or lens housing surfaces. In some embodiments, the compliant conductive element has a hardness on the shore durometer A scale that approximate equal to 70 and a volume resistivity of approximately 0.0008 Ω-cm.

Although described above with relation to a lens and a lens housing, embodiments are not so limited and may provide for the use of compliant conductive element between any two electrical contacts that may be disposed on any component or components of a first device (e.g. an electro-active frame).

It should be understood that, after reading the disclosure provided herein, a person of ordinary skill in the art may understand that various combination of the devices described above may be made such that some or all of the features described with regards to one device may be combined with some or all of the features of another device.

Description of Figures Related to a Compliant Conductive Element and Exemplary Embodiments Provided below is a more detailed description of some of the figures included herein that may relate to a compliant conductive element, as well as descriptions of the exemplary embodiments disclosed. As noted, these exemplary devices are for illustration purposes and are not intended to be limiting.

Figure 14:
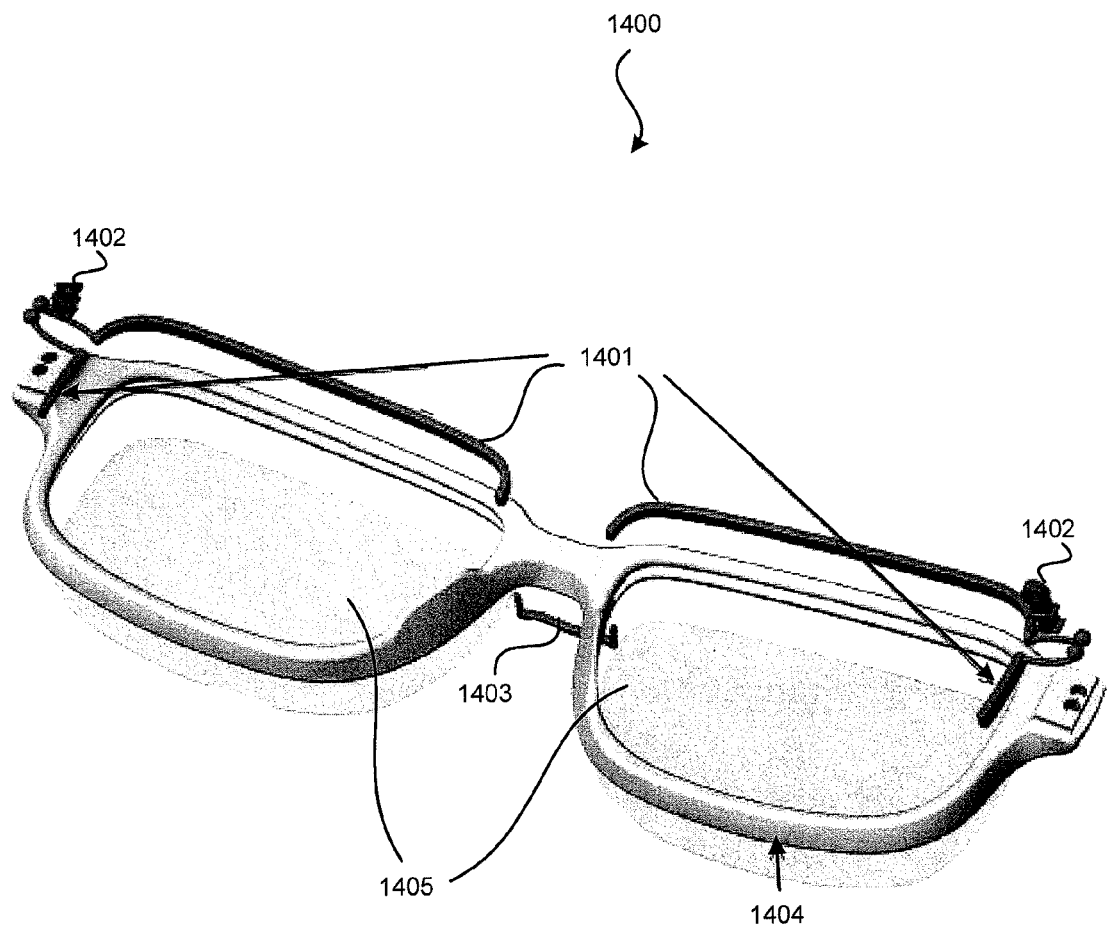
FIG. 14 shows an exemplary embodiment of a device in accordance with some embodiments.

With reference, to FIG. 14, an exemplary electro-active frame 1400 for use with electro-active lenses and/or other electronic components is shown. The exemplary electro-active frame 1400 can comprise lens housing 1404 (such as eye-wire) comprising any material such as, but not limited to, a plastic (e.g., acetate). In some embodiments, the electro-active frame 1400 can be made by a mold or other techniques, such as injection molding. Additionally, some embodiments may provide that the electro-active frame 1400 can be made from one or more separately formed or fabricated pieces that are brought together (i.e. coupled) to form a complete electro-active frame.

The compliant conductive element 1401 (such as, for example, a conductive rubber) may, in some embodiments, be used to conduct an electronic signal from one side of the electro-active frame 1400 or lens housing 1404 (or one component thereon) to another side of the electro-active frame 1400 or lens housing 1404 (or another component thereon, including a lens 1405). In some embodiments, the compliant conductive element 1401 may be encapsulated by (e.g. substantially surrounded by or embedded within) an insulator (such as the lens housing 1404 that comprises a plastic material). In some embodiments, the compliant conductive element 1401 may be positioned (e.g. disposed) inside the electro-active frame 1400 (or the lens housing 1404) as the electro-active frame 1400 is being fabricated (such as, for instance, during a molding process or an injection molding process). In some embodiments, the compliant conductive element 1401 may also be positioned inside cavities of the lens housing 1404 after the lens housing 1404 has been fabricated. This will be described in more detail below with reference to FIGS. 18-25. In some embodiments, the compliant conductive element 1401 may be positioned between two frame halves (or between a plurality of portions of the electro-active lens frame) that are subsequently brought together and sealed.

In some embodiments, the compliant conductive element 1401 may be positioned in or near the nose bridge 1403 to provide connectivity from a first side of the electro-active frame 1400 (and/or lens housing 1404) to a second side of the electro-active frame 1400 (and/or lens housing 1404). The use of such material in the bridge 1403 may permit the nose bridge in such embodiments to be relatively small, which could provide a more aesthetically pleasing frame appearance. These embodiments may also be combined, for instance, with a single electronics module located on one of the temples that provides electronic signals and/or current to both a first lens and a second lens 1405 (that is, the conductive compliant material 1401 may provide a conductive path from a first part of the lens housing 1404 comprising a first lens 1405 to a second part of the lens housing 1404 comprising a second lens 1405). In some embodiments, the compliant conductive element 1401 may be positioned on the back side of the electro-active frame 1400 (and/or lens housing 1404) (e.g. on the side facing the wearer's head) or buried within (e.g., embedded within) the electro-active frame 1400 (and/or lens housing 1404).

Continuing with reference to FIG. 14, at the hinges 1402 of the electro-active frame 1400, the compliant conductive element 1401 may form one or more electrical contacts with a temple (and/or components disposed thereon) of the electro-active frame 1400. That is, the compliant conductive material 1401 may form a portion of a conductive path by providing electrical connections at or near the hinge 1402 with conductors disposed on (or coupled to) the temple of the electro-active frame 1400. In some embodiments, the hinge 1402 itself may comprise a conductive material and may electrically connect to the compliant conductive element 1401 and a conductor coupled to the temple. In some embodiments, the hinge 1402 may comprise the same material as the compliant conductive element 1401.

Figure 15:
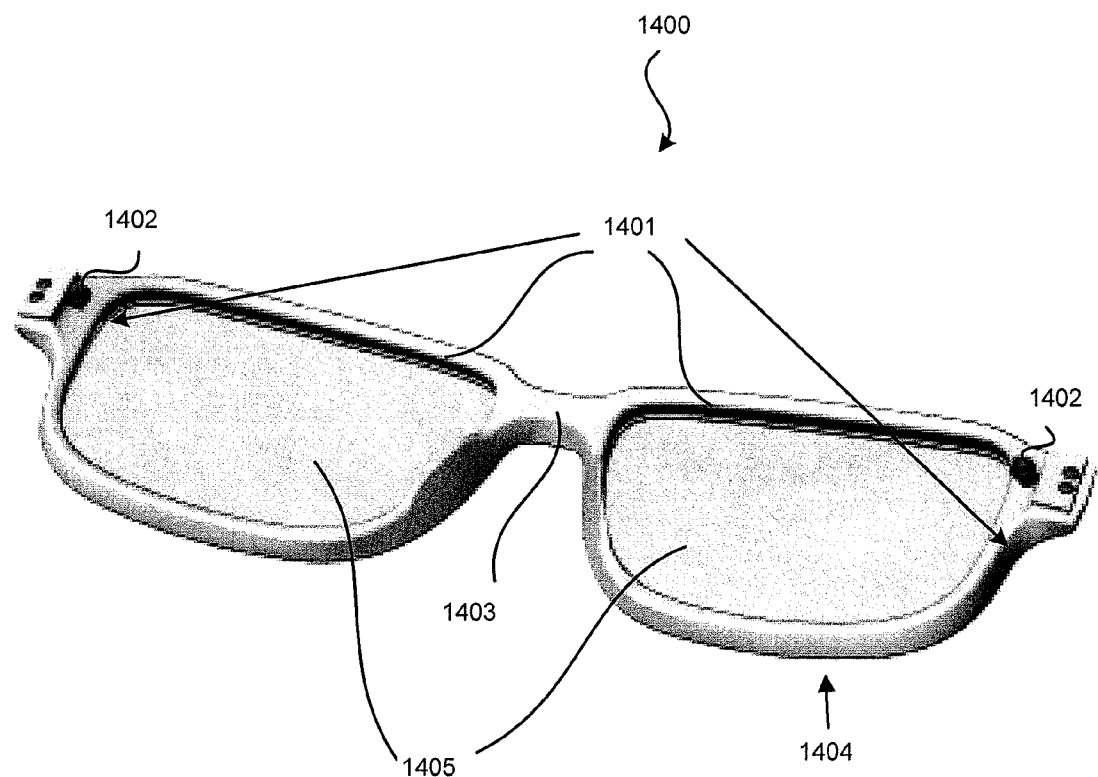
FIG. 15 shows an exemplary embodiment of a device in accordance with some embodiments.

With reference to FIG. 15, an assembled exemplary electro-active frame 1400 comprising compliant conductive element 1401 disposed within the lens housing 1404 is shown. When positioned (e.g. disposed) within the electro-active frame 1400 (and as shown, in lens housing 1404), the compliant conductive element 1401 need not be visible (e.g., at least a portion of the compliant conductive element 1401 may be disposed or positioned in the lens housing 1404 (e.g. the eye wire) of a fully rimmed or semi-rimless frame). Indeed, it may be preferred in some embodiments that the compliant conductive element 1401 is not visible for aesthetic reasons. In addition, embodiments comprising the compliant conductive element 1401 partially or completely embedded within one or more of the frame components may both provide electrical connections and also result in better protection for the conductive path created thereby from exterior forces and stresses, (for instance, the components may be less susceptible to short circuits and/or external electrical voltages and currents).

FIGS. 14 and 15 disclose an exemplary embodiment whereby the compliant conductive element 1401 comprises four separate conductive paths (i.e. two on the left side of the lens housing 1404 and two on the right side of the lens housing 1404). This may provide two separate conductive paths (and two electrical contacts) to each of the lenses 1405. In this manner, embodiments may make available the necessary electrical connections to provide power and or control signals to electro-active lenses 1405 or other components disposed on the lens housing 1404. In addition, in embodiments where the compliant conductive element 1401 (or other conductor) is also located in the bridge 1403, the lens housing 1404 may comprise two conductive paths—a first that electrically connects to a first electrical contact on each of the lenses 1405, and a second conductive path that is electrically isolated from the first conductive path and that electrically connects to a second electrical contact of each of the lenses 1405. Similar embodiments were discussed with reference to Single Electronics Module embodiments disclosed above.

Figure 16:
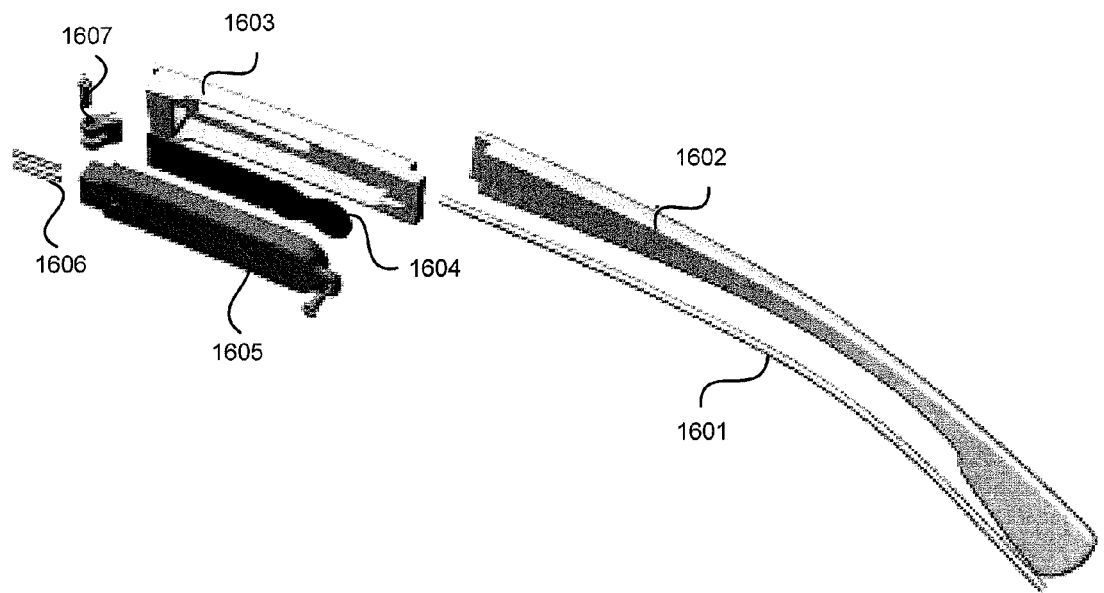
FIG. 16 shows an exploded view of components that may comprise an exemplary embodiment of a device in accordance with some embodiments.
Figure 17:
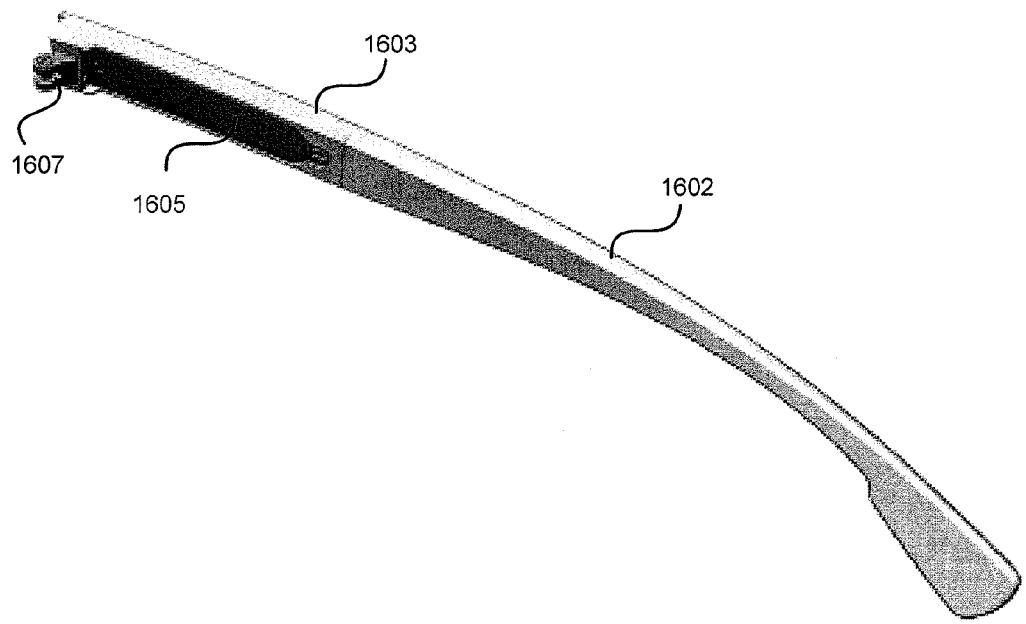
FIG. 17 shows an exemplary embodiment of a device in accordance with some embodiments.

FIGS. 16 and 17 illustrate the assembly of a portion of an electro-active frame that may comprise a compliant conductive element 1601. The exemplary components as shown are similar to those discussed with reference to FIGS. 3-10. Specifically, the components as shown for the exemplary electro-active frame include: A compliant conductive element 1601, which may be coupled to or disposed within the temple 1602 so as to provide a portion of a conductive path from one component to another. As shown, the compliant conductive element 1601 may, for instance, provide a conductive path from the temple end (which may comprise, e.g., a power source) to the electronics module 1605. An electronics module housing 1603 (which may comprise a metal box) is shown, which may house the electronics module 1605 and be coupled to the temple 1602. In some embodiments, the electronics module housing 1603 may comprise a portion of the temple 1602. A switch 1604 (such as a capacitance or "cap" switch) is shown, which may be coupled to the electronics module 1605 and/or the electronics module housing 1603 to provide a switch or control for the electronics module 1605. For instance, and as shown in FIG. 16, the electronics module housing 1603 may have an opening that may allow a wearer to interact with switch 1604 so as to turn a function on or off, or to otherwise vary the functions provided by an electro-active spectacle. The electronics module 1605, the switch 1604, and the electronics module housing 1603 may be coupled using any suitable manner, including one or more screws as shown in FIG. 16. One or more conductors 1606 may also be included to provide one or more electrical contacts (e.g. conductive paths) from the electronics module 1605 to the lens housing. The conductors 1606 could, for instance, electrically connect to the one or more conductive paths provided by compliant conductive element 1401 shown in FIGS. 14 and 15. A hinge 1607 is also shown, which may be coupled to the temple 1602 or a component thereof (such as the electronics module housing 1603) and also to the lens housing. The hinge 1607 may provide the capability for each of these components to move relative to the other while remaining coupled. In some embodiments, the hinge 1607 may comprise one or more conductors, or may itself comprise conductive material so as to form a conductive path or portion thereof.

FIG. 17 illustrates the components shown in FIG. 16 coupled together in an exemplary embodiment. As can be seen, the conductive compliant element 1601 is no longer visible as it is embedded within the temple 1602. Similarly, the electronics module 1605 is housed within the electronics module housing 1603 and covered (and likely coupled to) on one side by the switch 1604. The hinge 1607 is coupled to the electronics module housing 1603. The conductors 1606 may be embedded substantially within portions of the hinge 1607 and/or electronics module housing 1603 so as to form a portion of a conductive path between the electronics module 1604 and the lens housing.

Figure 18:
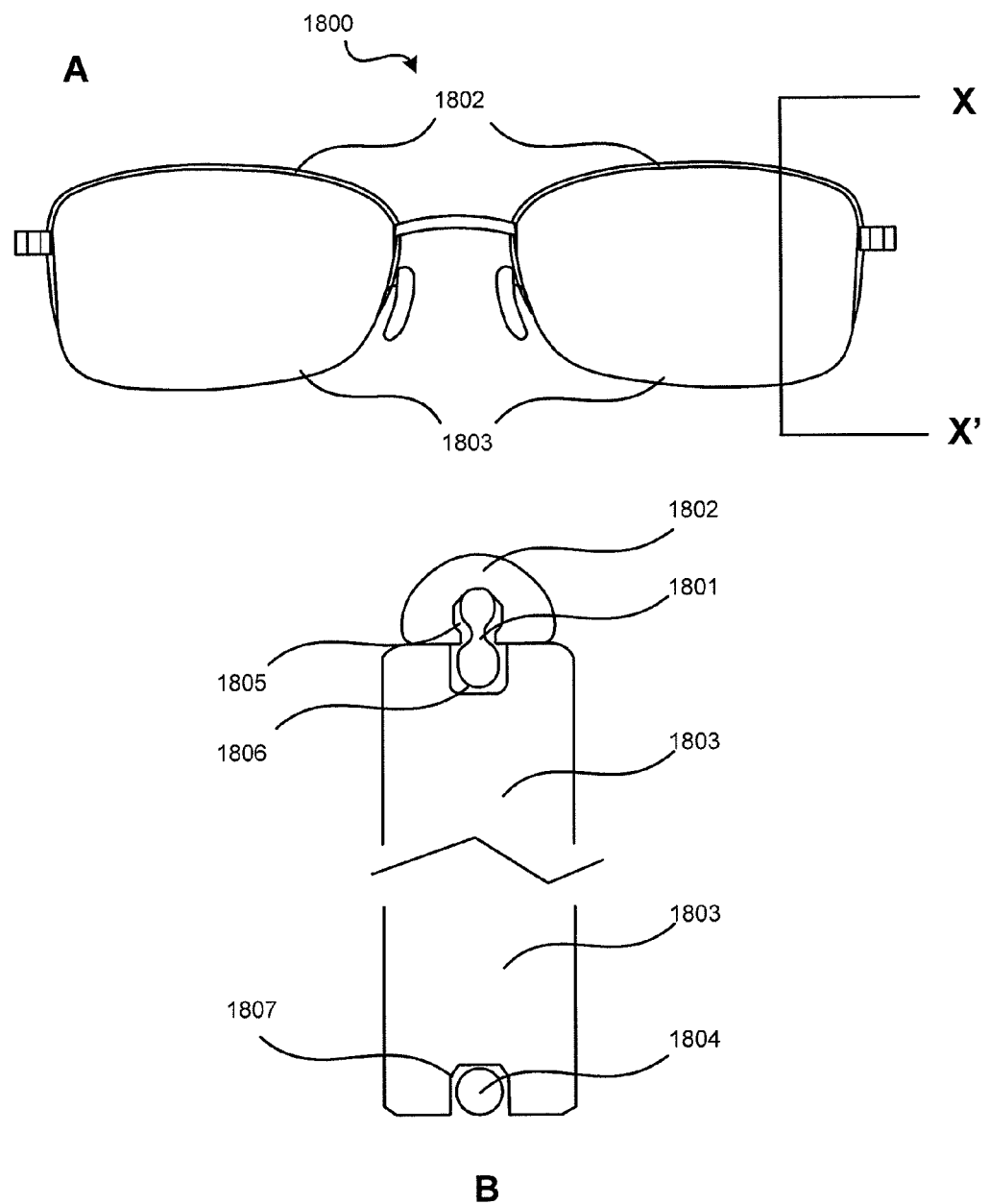
FIGS. 18(a) and (b) show an exemplary embodiment of a device in accordance with some embodiments.
Figure 19:
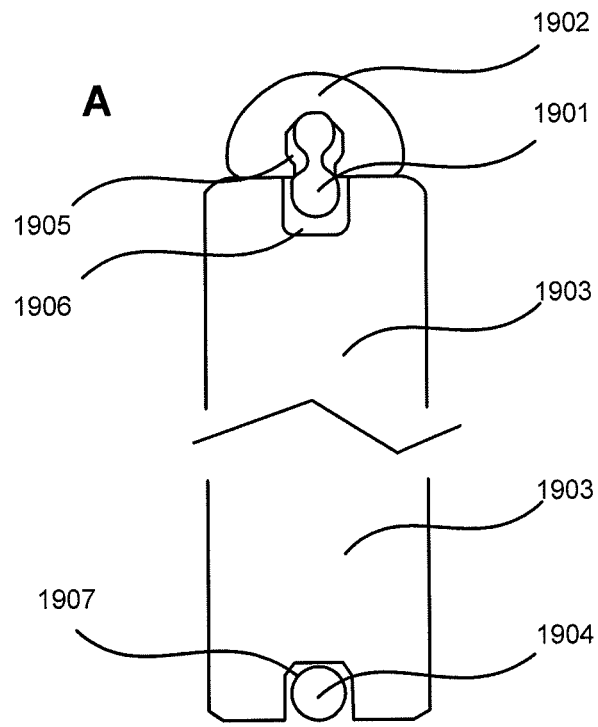
FIGS. 19 (*a*) and (*b*) show an exemplary embodiment of a device in accordance with some embodiments.
Figure 19:
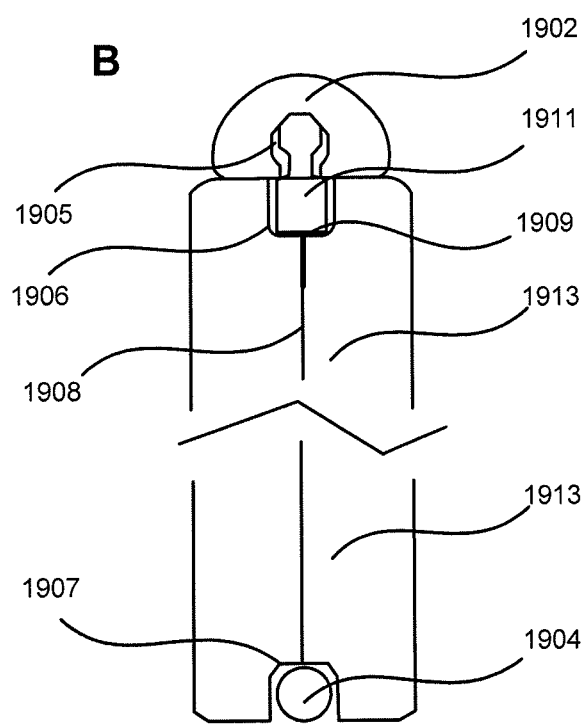

With reference to FIGS. 18 and 19, exemplary embodiments of semi-rimless spectacle frame designs will be described. It should be noted that although many of these concepts will be described therefore in the context of semi-rimless frames, many of the features and principles may also be used with (or applicable to) other frames, such as full rimmed and rimless. Moreover, these embodiments are for illustration purposes, and are thereby not intended to be limiting.

FIGS. 18 (a) and (b) illustrate a typical exemplary semi-rimless frame 1800. FIG. 18(a) shows a frontal view of the semi-rimless lenses, and FIG. 18(b) shows the cross-section from the points X to X' of the electro-active frames 1800. As shown, the lenses 1803 are supported along their upper edge by a rigid portion of the frame 1802 (e.g. eye-wire, which may comprise a material such as metal) and supported along their lower edge by a section of clear plastic monofilament 1804 (typically nylon) that is connected to the rigid upper portion 1802 of the lens housing. The monofilament 1804 is shown as being disposed within a groove 1807 in the edge of the lens 1803. The length of the monofilament 1804 may be such that it is under tension when the lens 1803 is mounted in the frame and may thereby hold the lens in place.

With reference to FIG. 18(b), a close-up of the cross section X-X' of FIG. 18(a) is shown so as to better illustrate an exemplary means by which the lens may be secured in a semi-rimless frame. As shown in this exemplary embodiment, the eye-wire 1802 may contain a cavity 1805 that secures a portion of an extrusion of a semi-rigid plastic 1801 (typically nylon) with a "figure-8" cross section. The remaining portion of the extrusion 1801 is disposed in the groove of the lens 1806 and keeps the lens 1803 from moving back and forth. In those portions of the outer surface of the lens 1803 that do not come into contact with the "figure-8" extrusion 1801 (e.g. along groove 1807), the nylon monofilament 1804 may essentially take the place of the extrusion 1801 as shown in this exemplary embodiment. As the monofilament 1804 may be colorless and may be disposed completely (or substantially) within the lens groove 1807, it may be nearly invisible except under close inspection.

It should be noted that construction of an electro-active capable semi-rimless frame design has been disclosed by the inventors in U.S. Pat. Pub. No. 2010/0177277 A1. Embodiments of frames disclosed therein may be similar in appearance to the exemplary embodiment of a frame shown in FIG. 18(b). Some of the differences that may enable the electro-active functionality of the frames disclosed therein may be related to the particular details of how the frame is constructed and the use of other novel conductive structures, which are described in detail in U.S. Pat. Pub. No. 2010/0177277 A1, which is hereby incorporated by reference in its entirety.

FIGS. 19(a) and (b) illustrate a comparison between an exemplary semi-rimless frame that is not electro-active, and an exemplary embodiment of an electro-active frame comprising electro-active lenses 1913. That is, FIG. 19(a) shows a cross-section of a conventional semi-rimless frame, while FIG. 19(b) illustrates a cross section of a frame that is essentially the electro-active counterpart of the frame shown in FIG. 19(a). In both FIGS. 19(a) and 19(b), a monofilament 1904 is used along the lower portion of the lens (1903 or 1913) disposed within groove 1907 so as to keep the lens (1903 or 1913) secure within the frame. In some embodiments of the electro-active frame shown in FIG. 19(b), the eye-wire 1902 may be made of an electrically conductive material. However, this need not be the case, as a conductive path may be established within the eye-wire 1902 (and/or other components of the lens housing) using any suitable method, such as by, for instance, embedding a conductor within a non-conductive material. During the manufacturing process, in embodiments where the eye-wire 1902 comprises a conductive material, care may be taken to ensure that no coatings or finishes are applied to the inside of the eye-wire 1902 such that an electrically conductive surface is maintained (e.g. within the cavity 1905).

With reference to FIG. 19(b), in some embodiments (and for the purposes of illustration only), an electro-active lens may comprise an interface 1908 between two substrates that contains internal electrodes for activating the lens 1913. This has been previously described by the inventors, such as in U.S. Pat. Pub. No. 2010/0177277 A1, which is hereby incorporated by reference. However, as noted above, embodiments are not so limited and the methods, devices, and means disclosed herein may have applicability to any electro-active frame and/or components therein (e.g. any type of electro-active lens). During an exemplary manufacturing process comprising edging the exemplary electro-active lens 1913, the groove 1906 may be placed such that it straddles this interface 1908 (which may, for example, comprise a liquid crystal layer between two electrodes).

Continuing with the exemplary manufacturing process, the lens 1913 may be edged and grooved, and one or more electrically conductive inks or paints 1909 may be applied to the locations where the electrodes are exposed within the groove 1906. The inks and paints may be used so as to provide a conductive path to the electrodes of the lens 1913 without substantially impairing the visual properties of the lens 1913, or being visible by an observer. In some embodiments, the groove 1906 may be between 0.4 mm and 1.0 mm wide (i.e. the horizontal distance shown in FIG. 19(b)) and between 0.4 mm and 1.0 mm deep (i.e. the vertical distance in FIG. 19(b)). The inventors have found that, in some embodiments, it may be preferred that the groove 1906 may be approximately 0.7 mm wide and 0.6 mm deep. Generally, the groove should be such that the extrusion or other material 1911 (or a portion thereof) may be disposed within the groove and assist in coupling the lens to the lens housing. However, it is generally not preferred that the groove be too large, as it may become visible and affect the aesthetics of the device.

In some embodiments comprising an electro-active lens, to provide a lens 1913 that functions properly, a conductive pathway is made between the inner surface of the eye-wire 1902 and the conductive paint 1909 applied to the groove 1906 of the lens 1913 (i.e. the surface of the lens 1913 that comprises the groove 1906). This may be accomplished with the use of a compliant conductive element 1911. The compliant conductive element may be a physically compliant yet electrically conductive material that may, in some embodiments, be extruded in a shape that fits substantially within the eye-wire 1902 and the groove 1906 of the lens 1913. Such a design may provide some or all of the advantages that were detailed above, including providing a conductive path between the lens housing and the lens, providing structural support for the device, preventing or minimizing damage to the rigid surfaces of the lens 1913 and lens housing 1902, etc.

As was described above, the compliant conductive element may take any shape and have any suitable dimensions. In this regard, FIG. 20 (a) shows a cross section of an exemplary conventional extrusion (i.e. non-conductive) 2000 and its exemplary dimensions (in mm), while Figs. (b) and (c) show a cross section and dimensions (in mm) of two exemplary compliant conductive elements 2010 that may be used, for instance, in semi-rimless electro-active frames. FIG. 20(a) discloses a typical "figure 8" shape of a non-conducive element 2000, while FIGS. 20(b) and (c) disclose shapes that vary slightly from the non-conductive component. The upper portions (i.e. first portions) 2001, 2002, and 2003 of each of these elements are similar, as they may each, for example, be designed to fit within the same lens frame component (e.g. an eye-wire). As depicted, each of the compliant conductive elements 2010 have a different shaped lower portion (i.e. second portion) 2005 and 2006 from that of the non-conductive extrusion lower portion 2004. This may be due to the fact that the compliant conductive elements 2010 may be designed to come into contact with the conductive painted regions within the lens groove, and form electrical connections thereto.

As can also be seen in FIGS. 20 (*a*), (*b*), and (*c*), as depicted, the overall vertical dimensions of the conductive compliant elements 2010 are larger than the traditional non-conductive "figure 8" extrusion 2000. This may be done in some embodiments to ensure that when the lens is mounted in the frame (i.e. within the cavity of the frame) the bottom of the lens groove comes into contact with the bottom (i.e. second portion) 2005 and 2006 of the compliant conductive elements, such that the lens may compress it slightly. With the compliant conductive element 2010 under compression, it will likely maintain the physical (and hence electrical) connection between the lens, the compliant conductive element 2010, and eye-wire at substantially all times, particularly as the frame flexes during donning and doffing the eye wear.

One of the important dimensions to ensure compression of the conductive compliant element is the "height," of the second portion of the conductive compliant element, which is shown as 0.75 mm for one of the compliant conductive elements 2010 by way of example only. The total height of this exemplary compliant conductive element is shown as 1.45 mm (0.75 mm+0.7 mm). As noted, the compliant conductive element 2010 could be made available in different heights to, for example, accommodate variations in lens processing (lens size and groove depth). While the design of the compliant conductive elements 2010 in FIG. 20(*c*) will likely function to form an electrical contact with portions of the surface of the lens (based on the height as shown), the width (horizontal dimension) is shown as not being optimized for the exemplary width of the groove of the lens and therefore its performance in conducting electricity may not be ideal. That is, the width of the bottom portion 2006 shown in FIG. 20(*c*) is not as wide as the groove in the lens. In contrast, the compliant conductive element 2010 in FIG. 20(*b*) is depicted as having a width that has been optimized—i.e. the width is larger, making it more likely that this configuration will make more robust electrical contacts. It should be noted that compliant conductive element 2010 made to the exact (or similar) shape as the "figure 8" design used for the non-conductive extrusion 2000 are, in some embodiments, the least preferred design as there may be no means to guarantee that the conductive compliant element 2010 will be compressed against the edge of the lens and hence provide a robust electrical connection.

It should be understood that the dimensions provided on FIGS. 20(*a*)-(*c*) are provided for illustration only, and are by no means limiting. Indeed, the dimensions of these components may vary based on the dimensions of the lens (and the lens groove) and the lens housing (and any cavity provided therein).

In general, from the standpoint of aesthetics, the electro-active semi-rimless frame design is may be particularly useful. For instance, through the use of appliques, facades and various lens shapes the basic semi-rimless frame shown, for example, in U.S. Pat. Pub. No. 2010/0177277 A1 can take on the look of many different styles while retaining its electro-active functionality.

Exemplary Embodiments Related to Full Rim Spectacle Frame Deigns

Figure 21:
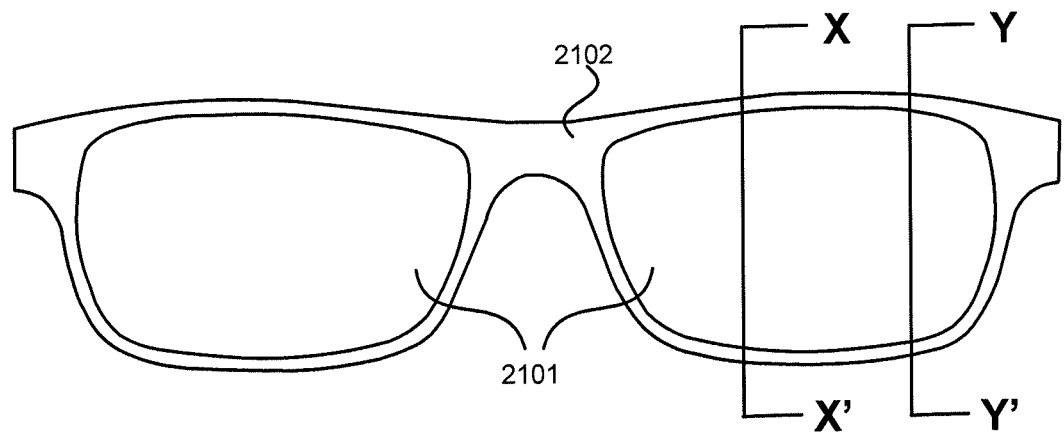
FIG. 21 shows an exemplary embodiment of a device in accordance with some embodiments.
Figure 22:
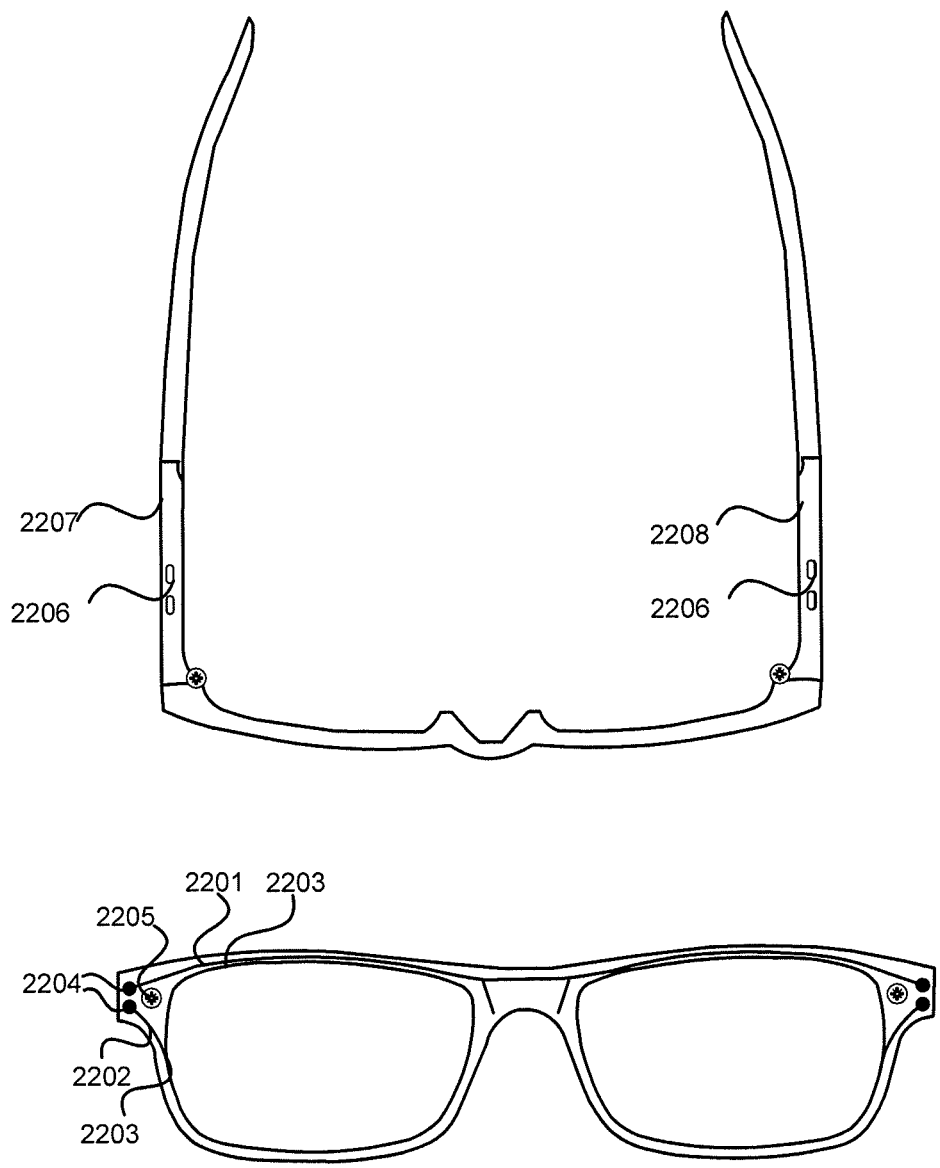
FIG. 22 shows an exemplary embodiment of a device in accordance with some embodiments.

A typical full rim plastic frame (also referred to as zyl or acetate) known to those skilled in the art is shown in FIG. 21, where the lenses 2101 are supported along their entire circumference by a rigid plastic frame 2102. While an electro-active capable plastic frame was discussed with reference to FIGS. 14-17, additional embodiments are shown with reference to FIG. 22. As shown in FIG. 22, a physically continuous conductive pathway (e.g. an embedded conductor, such as a wire) is used to apply the driving voltage (e.g. the waveform) to the lenses and route synchronization signals from the master 2207 to the slave module 2208. That is, for instance as shown in FIG. 22, the embedded conductor 2201 may provide a conductive path across the lens housing from the master electronics module 2207 to the slave electronics module 2208. As noted above, embodiments that utilize a single electronics may also be used. Furthermore, FIG. 22 also shows openings in the metal casings 2206 that may hold modules or other components that allow the electronics modules 2207 and 2208 to be charged inductively. This may be beneficial in that such embodiments may provide power without the use of batteries (or may supplement the use of batteries to provide longer lifetime).

Continuing with reference to the embodiments shown in FIG. 22, a top conductor 2201 is shown embedded within the lens housing (that may comprise, e.g. acetate) and may carry a driving electronic signal from the right lens to the left lens. In addition, in some embodiments, the embedded conductor 2201 may also carry the power signal between the two lenses so as to synchronize the functionality between both lenses. Embedded conductor 2202 may carry the reference electronic signal to the lenses (e.g. ground). FIG. 22 also designates locations 2203 where special square (or any other appropriate shape) beveling into the lens housing (e.g. into the acetate frame front) may occur so as to (1) expose portions of the embedded conductors 2201 and 2202; (2) embed compliant conductive material; and/or (3) allow for an electrical connection between the exposed portions of the embedded conductors 2201 and 2202 to the compliant conductive element. That is, in the exemplary embodiment, the portions designated by 2203 may be the locations in which the conductive compliant material may be disposed within the lens housing, and where the conductive path from the lens housing to the lens may be created. FIG. 22 also indicates where the use of conductors 2204 (such as pogo pins) may be located so as to provide a conductive path from the temple to the lens housing (e.g. to the embedded conductors 2201 and 2202). FIG. 22 also shows an exemplary location of a hinge 2205 to couple the temple to the lens housing.

With initial reference to FIG. 21, FIG. 23 shows a cross section view of the sections X-X' and Y-Y' for a conventional full rim design (FIG. 23(*a*)) and of an exemplary electro-active full rim design comprising a compliant conductive element (FIGS. 23(*b*)-(*e*)).

As noted, FIG. 23(*a*) shows the cross-section X-X' of a conventional full rim (i.e. non-conductive) plastic frame with a lens 2302 possessing a beveled edge that sits (i.e. is disposed) within a similarly beveled region of an eye wire 2301. That is, the lens 2302 is designed to have a top surface that substantially matches a bottom surface of the lens housing (i.e. the eye rim). This is one way in which traditional lens design coupled the lens to the lens housing.

FIG. 23(*b*) shows the section X-X' of an electro-active capable plastic frame in a region where no electrical contact is required. The basic construction is similar to that of the conventional frame design except that there is an embedded conductive pathway 2304 (e.g. metal wire or similar). As the conductive pathway 2304 is completely encased within the insulating material of the eye wire 2301 at this location, there is no electrical contact between the lens 2302 and lens housing 2301 (or a conductive path 2304 embedded therein).

FIG. 23(c) shows the section Y-Y' of an electro-active capable plastic frame in a region where electrical contact between lens housing 2301 and lens 2302 is required. In this region a square cavity 2305 is machined into the eye-wire 2301 that exposes the embedded conductive pathway 2304 (e.g. metal wire or similar). The cavity 2305 may also accept a compliant conductive element 2307 that may, in some embodiments, be extruded or otherwise configured into a rectangular shape. As also shown in FIG. 23(c), the top surface of the lens 2302 may be configured to be disposed within a portion of the cavity 2305 as well.

FIG. 23(d) shows the cavity 2305 and the compliant conductive element 2307 in detail. As with the semi-rimless electro-active frame, it may be desirable to have the edge of the lens 2302 that is coated with the conductive paint 2306 come into physical contact with the compliant conductive element 2307 and compress it (as shown by compression region 2308) before the remainder of the circumference (i.e. the top surface) of the lens 2302 comes into contact with the conventionally beveled sections of the eye-wire 2301 (e.g. in the section defined by X-X' in FIG. 21, where no electrical contacts are made). As described above, with the compliant conductive element 2307 under compression (i.e. based on the force applied by the surface in the cavity 2305 of the lens housing 2301 and the top surface of the lens 2302), it will maintain the physical (and hence electrical) connection between the lens 2302, complaint conductive element 2307, and conductive pathway 2304, even as the frame flexes during donning and doffing the eye wear.

The dimensions of the compliant conductive element 2307 are generally determined by the dimensions of the cavity 2305 and the position of the cavity 2305 relative to the conventional lens bevel. The minimum height ($H_{min}$) of compliant conductive element 2307 may be the distance between the apex of the conventional lens bevel 2306 and the bottom of the cavity 2305 as shown in FIG. 23(d). Generally, as values of the uncompressed height ($H_{uncompressed}$) increase above $H_{min}$, the more robust the electrical connection between the compliant conductive element 2307, the lens 2302, and the lens housing 2301 (and/or the embedded conductive pathway 2304). Maximum values of the height H may be determined empirically based on how compressible the compliant conductive element material is such that lens 2302 (or a portion thereof) can still be mounted into the lens housing 2301 using methods known in the art. That is, the maximum height may be the height at which the compliant conductive element 2307 will still compress sufficiently that the lens 2302 is adequately disposed within the cavity 2305 and thereby coupled to the lens housing 2301.

With reference to FIG. 23(e), the width of the conductive compliant element 2307 is preferably a small amount ($\delta$) larger than the width of the groove W such that the compliant conductive element 2307, once inserted into the cavity 2305, remains in place without the need for adhesives while the lens 2302 is mounted. The inventors have found that a $\delta$ value within the range of approximately 1 mm to 0.5 mm was preferred and functioned well for this purpose. In an exemplary embodiment, a rectangular compliant conductive element approximately 2.1 mm wide (for a 2.0 mm wide cavity) and 1.2 mm tall enabled a robust electrical connection between lens 2302 and a lens housing with a $\delta$ value of approximately 0.1 mm (100 μm).

Exemplary Embodiments Comprising Full Rim Metal Spectacle Frame Designs

As noted above, the specific embodiments discussed herein are exemplary only, and other embodiments may exist that utilize the same or similar principles. For instance, in some embodiments, it may be desirable to have an electro-active capable frame with a full metal rim manufactured from a conductive material. A cross section for such a frame is shown in FIG. 24. In this exemplary embodiment, the eye-wire 2401 contains a square cavity 2402 to which preferably no coatings or finishes have been applied such that the conductive surface of the eye-wire 2402 material is easily contacted. Into the cavity 2402 another conductive compliant material 2403 may be mounted (e.g. disposed within) that may make the electrical connection between the lens 2404 and frame (e.g. the lens housing 2401). In areas where the electrical connection need not be made, then the compliant conductive element 2403 may be omitted and the edges of the square cavity 2402 in the eye-wire 2401 support the bevel of the electro-active lens 2404. In other embodiments the conductive compliant element 2403 may be mounted (i.e. disposed within) in all parts of the eye-wire cavity 2402 and only those areas of the lens 2404 to which conductive paint is applied make electrical contact. The shape of the conductive compliant element may be any shape, including rectangular (similar to the exemplary embodiments described above with respect to the exemplary full-rim plastic rim) or embodiments may have a slight bevel. The conductive compliant element 2405 shown with the slight bevel in FIG. 24 may also be suitable for full rim plastic frames in other embodiments.

As with the previously described frame designs, it is preferred to have the edge of the lens that is coated with the conductive paint come into physical contact with the compliant conductive material and compress it before the remainder of the circumference of the lens comes into contact with the remainder of the eye-wire. As described above, with the compliant conductive element under compression, it will maintain the physical and hence electrical connection between lens, compliant conductive element, and lens housing (e.g. conductive pathway), particularly as the frame flexes during donning and doffing the eye wear.

FIG. 25 illustrates an exemplary embodiment comprising a conductive compliant element 2501 providing a conductive path from the lens housing 2500 to an electro-active lens 2507. The illustration on the left of FIG. 25 shows a close up of an exemplary electro-active frame. The frame comprises a lens housing 2500 that could, for instance comprise a non-conductive material such as a plastic (e.g. acetate). Embedded within the lens housing 2500 is a conductor 2503. As shown in this exemplary embodiment, conductor 2503 is electrically connected to the temple at 2506, which could for instance comprise another conductor, such as a pogo pin. Conductor 2503 is also connected to compliant conductive element 2501 in cavity 2502 (for instance, the conductor 2503 may be exposed at some portions along the cavity 2502. As shown, conductive compliant material 2501 is located within a portion of cavity 2502. A second conductive path is also shown, comprising a second embedded conductor 2504, which also connects to a compliant conductive element 2501 disposed within a cavity 2502 in the lens housing 2500. The second embedded conductors 2504 electrically connects to a temple at a point 2506. Thus, as shown, FIG. 25 illustrates an electro-active frame that comprises two separate conductive paths from a temple to the lens 2507 via compliant conductive elements 2501. In portions of the lens housing 2500 where the conductive compliant element 2501 is not located, the lens housing 2500 comprises a cavity 2508 that may be of a traditional shape (e.g. not square) in which a portion of the lens 2507 (e.g. a beveled edge) may be disposed within. A hinge 2505 that couples a temple to the lens housing 2500 is shown as well.

On the right of FIG. 25 are shown closes up of the cross sections shown as A-A and B-B on the illustration on the left of FIG. 25. As shown, in section A-A, an electrical connection is formed between conductor 2503, compliant conductive element 2501, and lens 2507. The cavity 2502 is shown as comprising a rectangular shape, and the compliant conductive element 2501 is shown as having dimensions such that it is substantially disposed within the cavity 2501 (dimensions in mm). At location B-B, there is no electrical contact made as the electro-active frame does not comprise a compliant conductive element 2501 in this location. The cavity 2508 is shown in this section, and the lens housing 2500 is shown as encapsulating the conductor 2503 such that no contact is made with the lens at this location. The last illustration is a cross section showing an overlap of the sections A-A and B-B, where the different between cavity 2508 and 2502 (comprising conductive element 2501) can be seen.

Material Composition of the Conductive Complaint Element and Inks

As discussed above, the conductive compliant element, regardless of the frame design, may, for example, comprise a physically compliant yet electrically conductive material that is extruded or otherwise molded into a shape that conforms to both the frame and lens for the purpose of forming an electrically conductive path (i.e. bridge) between lens and frame. While many different classes of material are suitable, good results have been obtained by the inventors when metal loaded silicone elastomers are used with volume resistivities of less than 10 Ω-cm and preferred results are obtained with volume resistivities of less than 1 Ω-cm. It has also been found that a material having values greater than 50 on the shore durometer A scale are suitable, but that values greater than 65 are preferred. The inventors have achieved good results with extruded silver and aluminum (Ag—Al) loaded silicone elastomer with a volume resistivity of 0.008 Ω-cm and a Shore A hardness of 70. However, embodiments are not so limited.

While such materials are typically manufactured to final shape prior to assembly into the electro-active frames, in certain embodiments, it may also be possible to apply uncured material in liquid or gel form immediately prior to assembling the eye wear such that upon cure the material conforms to both the lens and frame (e.g. the lens housing) simultaneously and thus forms an electrically conductive path (e.g. bridge) in that manner. This may be preferred in some embodiments, as the compliant conductive material may thereby contact the greatest amount of the surface of both the lens and the lens housing, and may thereby maximize the electrical connections thereon.

In some embodiments comprising an electro-active lens, the conductive paint(s) or ink(s) applied to the edge of the lens to establish an electrical connection may be dependent upon the conductive materials used to make the internal electrodes of the lens itself. As these electrodes will typically be in the line of sight to both the wearer and viewer of the lenses, it is preferred to have a transparent conductive material such as ITO ink mixture X-806CN27S which is commercially available from Sumitomo Metal Mining of Japan, by way of example only. For lenses manufactured with this ink formulation, once edged and grooved, an additional amount of the X-806CN27S may be applied to the edge of the lens and cured. To establish a more robust electrical connection, a second conductive ink or paint may be applied over the cured X-806CN27S. While many conductive metal inks (silver and/or nickel based) are available, conductive carbon based inks are preferred for cosmetic reasons. Carbon based conductive inks are preferred as they do not oxidize (i.e. change color) with age and are not as bright in appearance as metal based inks. By way of example only, a conductive carbon ink such as mixture 122-49, commercially available from Creative Materials Incorporated may be preferred.

Spectacle Lens Frame Electronics

As noted above, electro-active spectacles and frames may comprise any suitable electronic components. That is, for instance, exemplary spectacle frames such those describe above, or any other electro-active spectacles such as, for instance, those described in U.S. patent application Ser. No. 12/684,490, filed Jan. 8, 2010 and entitled "ELECTRO-ACTIVE SPECTACLES AND ASSOCIATED ELECTRONICS" (incorporated by reference herein in its entirety) can comprise electronic components to provide a variety of functions, such as, for example, control of electro-active lenses. Additional exemplary functions (and components to accomplish the functions) are described below.

These components, whether alone or in some combination, can be built into or otherwise coupled to the spectacle lens frame or lenses and/or be located remotely and be in communication with components on the electro-active spectacle frame or lens. Some of the components may be controlled by the wearer. Moreover, each of the components described below may be located on electro-active frames that comprise some or all of the features described above. Furthermore, the components (including the electrical components referenced) and descriptions provided herein are exemplary, and many variations and combinations of these features may be included.

Fall Detector Module:

A fall detector module may be used by seniors or other individuals to determine if a fall has occurred. This may comprise an accelerometer or other motion sensor coupled to the electro-active spectacles worn by user. If a fall is detected, it can trigger an alarm system in a house, an alarm can be sent to preset phone numbers (e.g., 911) or e-mail addresses. Electrical components located on the electro-active spectacles can also enable a manual call to a preset phone or e-mail address with, for example, a finger touch to the temple or press button located somewhere on the electro-active spectacles (e.g., alarm trigger).

A fall detector module may comprise a small electronic module coupled to or disposed within the frame that can contain a fall sensor (e.g., an accelerometer) and may also comprise a small transmitter. In some embodiments, a modified cell phone or a number of signal relay devices preset in the house can detect the alarm signal from the module, and send a series of emergency information (e.g. test message, e-mail, phone call, etc) via an existing network (e.g. internet, cell phone, or custom network) to individuals or health care institutes. In some embodiments, the device can use an ITO patterned layer (or other transparent or translucent materials) of electro-active lenses as an antenna.

Step Counter and Timer Module:

A step counter and timer module may, in some embodiments, count the number of steps by a wearer (e.g. for jogger). This can be used to determine distance traveled, time, pace, or any other relevant information. In some embodiments, this may be displayed to a user via a heads-up display in the lenses of the electro-active lenses. The module may also comprise one button (or touch) to reset or display the result on a small LCD housed on the frame. In some embodiments, the components of the module may include motion detection/distance detection system and display system.

Drowsiness Detector and Alarm Module:

A drowsiness detector and alarm module may, for instance, be used for long distance drivers to determine their level of alertness and their ability to operate a motor vehicle or other heavy machinery safely. The module may, for example, detect sudden head motion and trigger an alarm when a pre-defined sudden motion is detected.

Some exemplary components of such a module may include a motion sensor that can trigger an audible or visible alarm. The alarm may, in some embodiments, be included in the electro-active spectacle frame. For example, in some embodiments, the motion sensor may, similar to the fall detector module discussed above, relay an alarm signal to a remote alarm as well.

Timer as Taking Pill Reminder Module:

A timer as taking pill reminder module may, for example, using audio (for user to hear) or an LED (for others to see), remind user or other individuals to take medication. However, it should be understood that a module comprising a timer and an alarm (that may be set by a user for any purpose) may also be included. The module may, for example, comprise components that can include a timer and a visible or audible alarm.

UV Light Monitor Module:

A UV light monitor module may, for example, be utilized for outdoor activities to determine the risk associated with harmful UV rays and alert the user to this risk. For example, a sensor may be provided on the frame that can detector the UV intensity of light. The module may further comprise a display to show the result using an LED indicator or other display (e.g., LCD) or a heads up display in the lenses of the electro-active spectacles. When UV intensity passes a certain predetermined limit, for example, a visible or audio indicator (e.g., an LED or audible beeper) may provide a warning signal. The module may comprise any suitable electronic components can include a UV sensor and display system.

Emergency Wireless Call Module:

An emergency wireless call module may, for example, be used by seniors or other individuals to alert authorities as to an emergency. The module may utilize a preset a phone number, e-mail address, or other device or communication medium to send out to signal related to an emergency. The module may be activated, for instance, with a finger touch to the temple or press button. The module may be combined for instance, with a GPS or other position locator to identify the location of the individual and/or the emergency. The module may comprise a signal processing path and components similar for connecting to outside network as those described with reference to the fall detector module, or any other suitable components.

Directional Hearing Aids Module:

The electro-active spectacles may comprise hearing aids or other auditory assistance devices coupled to the frame. For instance, a single power source may power both devices, however this need not be the case.

Pulse and Partial Oxygen Concentration (PO2) Monitor Module:

A pulse and partial oxygen concentration (PO2) monitor module may, for example, comprise a small electro-optical sensor or acoustic sensor that can be placed at the area near the ear of the user, or other suitable location to detect hear rate and other vital signs. The electro-optical sensor (or other similar device) may also be capable of measuring the blood oxygen level. The module may also comprise components for displaying the results of the vital statistics that were measured, such an LCD display or in a head-up display in the lenses. The module may programmed or configured to trigger alarm if abnormal readings are found. Other components may be similar to the fall detector described above for alerting emergency services or other individuals.

RFID Monitor Module:

A RFID monitor module (or other near field communication device such as Bluetooth®, etc.) may comprise, for example, an antenna that can embedded in the lenses or elsewhere in the frame. The module may be coupled to the frame, such as be inserting the module into a portion of the frame can contain other electronics (such as the electronics module). In some embodiments, the "working mode" can be passive or active. The module may be sued for any suitable purpose, such as for security, to make payments, to identify individuals etc. The module may be used by a locator.

Flash Memory Card Module:

A flash memory module may be included with the electrical components of the electro active spectacles. For example, a personal computer or other communication device may read or write to the module contained, for instance in the temple containing the flash memory. This may be done, in some embodiments, wirelessly by a device (which may be custom), or through an USB port.

Digital Watch and Alarm:

The electro-active spectacles may comprise a digital watch and or alarm to maintain the current time and alert an individual of a pre set time. This module may comprise, for example, a press button to display the time and or a press button to set alarm.

Electronic Eyewear Repairing Kits:

In some embodiments, the electro-active spectacles may comprise a tool box for immediate eyeglass maintenance. This may, for instance, store such components as conductive rubber strips, conductive glue dispenser, screws, screw driver, etc.

Voice Recorder Module:

A voice recorder module may also be included in some embodiments of electro-active spectacles. This may comprise, for instance, a push button to activate voice recording function. A recorded voice may be read by a wireless reader and played on a speaker, or any other suitable playback mode.

Battery Pack:

In some embodiments, an extra battery pack may be included in the electro-active spectacles. The extra power can be stored, for instance, as a backup power for the lens drive module.

Spy Video or Still Picture Recorder:

In some embodiments, the electro-active spectacles may comprise a miniature video camera (e.g., a pin hole camera) or other recording devices and associate equipment.

Thermometer

In some embodiments, the electro-active spectacles may comprise a digital thermometer to measure and display the temperature of the environment.

Remote Controller

In some embodiments, the electro-active spectacles may include a controller for other devices (e.g. a garage door, a car, etc), by touch or pressing the side of the temple in certain predefined finger moves, very convenient for seniors. A similar to the signal path and components described in fall monitor above may be utilized for this component.

Data Collection Unit

A data collection unit may be used by a user and located on the electro-active spectacles. Data that can be collected can include the on and off angles when the eyeglass are controlled manually, the time interval between two sequential battery charges, the wearer's behavior or physical date, such as daily calorie burning rate, real time pulse, skin moisture, daily UV exposure, etc. Data can be wirelessly transferred to a device with high computation power in-real time, or stored in the memory residing in the module and transferred after data collection. The receiving device can use artificial intelligence to analyze the data for specific applications, such as to train the software to reset the personalized control parameter, or provides some recommendations for wearer's daily activity.

In some embodiments, the data collection unit can be a unit separate from the frame/lens electronics that can be used to capture data stored in the electronic frames. For example, data stored in RAM included in the lens electronics can be relayed to the remote unit. Data can be relayed via a wireless or wired link including infrared. Data can be stored in local storage of the frame electronics for long periods of time and collected periodically or instantaneous data collection can be provided.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

What is claimed is:

1. A first device, comprising:
   a lens comprising at least a first electrical contact;
   a lens housing holding the lens, wherein the lens housing comprises at least a second electrical contact; and
   a physically compliant and compressible conductive element disposed between the first and the second electrical contact, wherein the physically compliant and compressible conductive element electrically connects the first and second electrical contacts.

2. The first device of claim 1, wherein the physically compliant and compressible conductive element comprises conductive rubber.

3. The first device of claim 1, wherein the physically compliant and compressible conductive element is disposed between the lens housing and the lens.

4. The first device of claim 1, wherein the physically compliant and compressible conductive element has a shape that comprises any one of, or some combination of, a triangle, a square, a "figure 8," an oval, a circle, and a rectangle.

5. The first device of claim 1, wherein the physically compliant and compressible conductive element comprises:
   a first end having a first thickness;
   a second end having a second thickness; and
   a center portion having a third thickness;
   wherein the center portion is disposed between and coupled to the first end and the second end; and
   wherein the first thickness of the first end and the second thickness of the second end are each greater than the third thickness of the center portion.

6. The first device of claim 1, wherein the physically compliant and compressible conductive element is an extrusion.

7. The first device of claim 1,
   wherein the lens comprises a first surface;
   wherein the lens housing comprises a first surface; and
   wherein the physically compliant and compressible conductive element substantially conforms to at least a portion of the first surface of the lens and at least a portion of the first surface of the lens housing.

8. The first device of claim 1, further comprising:
   a first temple coupled to the lens housing; and
   an electronic module coupled to the first temple;
   wherein the physically compliant and compressible conductive element is electrically connected to the electronic module.

9. The first device of claim 8, further comprising:
   a conductor substantially embedded within the temple and/or the lens housing;
   wherein the conductor electrically connects the electronic module to the physically compliant and compressible conductive element.

10. The first device of claim 9, wherein a first portion of the conductor is exposed; and
    wherein the first portion of the conductor electrically connects the electronic module to the physically compliant and compressible conductive element.

11. The first device of claim 9, wherein the lens housing comprises acetate.

12. The first device of claim 8, wherein the lens housing comprises a conductive material; and
    wherein the lens housing electrically connects the electronic module to the physically compliant and compressible conductive element.

13. The first device of claim 1, wherein the first device comprises semi-rimless spectacle frames.

14. The first device of claim 1,
    wherein the lens comprises a first groove;
    wherein the lens housing comprises a first cavity;
    wherein the physically compliant and compressible conductive element comprises a first and a second portion; and
    wherein the first portion of the physically compliant and compressible conductive element is disposed substantially within the first groove of the lens and the second portion of the physically compliant and compressible conductive element is disposed substantially within the first cavity of the lens housing.

15. The first device of claim 14, wherein the first portion and the second portion of the physically compliant and compressible conductive element are connected by a bridge.

16. The first device of claim 14,
    wherein the first portion of the physically compliant and compressible conductive element has a first shape that comprises any one of a triangle, a square, a circle, and a rectangle; and
    wherein the second portion of the physically compliant and compressible conductive element has a second shape that comprises any one of a triangle, a square, a circle, and a rectangle.

17. The first device of claim 14,
    wherein the lens has a first surface that is located within the first groove; and
    wherein at least a part of the first portion of the physically compliant and compressible conductive element substantially conforms to the first surface of the first groove.

18. The first device of claim 14, wherein the first surface of the lens is coated with a conductive paint.

19. The first device of claim 14, wherein the first groove of the lens has width approximately within the range of 0.4 mm and 1.0 mm and a depth approximately within the range of 0.4 mm and 1.0 mm.

20. The first device of claim 14, wherein the groove of the first lens has width of approximately 0.7 mm and a depth of approximately 0.6 mm.

21. The first device of claim 14,
    wherein the lens housing has a first surface that is located within the first cavity; and wherein a part of the second portion of the physically compliant and compressible conductive element substantially conforms to the first surface of the first cavity.

22. The first device of claim 14, wherein the physically compliant and compressible conductive element has an uncompressed height of at least the distance between the first surface of the first groove of the lens and the first surface of the first cavity of the lens housing.

23. The first device of claim 22, wherein first surface of the lens housing and the first surface of the lens compress at least a portion of the physically compliant and compressible conductive element when the lens housing and the lens are coupled.

24. The first device of claim 1, wherein the first device comprises full rimmed spectacle frames.

25. The first device of claim 1,
wherein the lens comprises a first surface;
wherein the lens housing comprises a first cavity;
wherein the physically compliant and compressible conductive element comprises a first surface;
wherein the physically compliant and compressible conductive element is disposed substantially within the first cavity of the lens housing; and
wherein the first surface of the physically compliant and compressible conductive element substantially conforms to the first surface of the lens.

26. The first device of claim 25, wherein the first surface of the lens comprises a first and second beveled edge.

27. The first device of claim 25,
wherein the first cavity has a width; and
wherein the physically compliant and compressible conductive element has an uncompressed width that is greater than the width of the cavity.

28. The first device of claim 25,
wherein the cavity of the lens housing has a top surface;
wherein a portion of the lens extends into the first cavity of the lens housing; and
wherein the physically and compressible conductive element has an uncompressed height that is approximately equal to or greater than a distance from the top surface of the cavity of the lens housing to the portion of the lens that extends into the first cavity.

29. The first device of claim 1, wherein the physically compliant and compressible conductive element comprises metal loaded silicon elastomers.

30. The first device of claim 29, wherein the metal comprises silver and aluminum (AG-Al).

31. The first device of claim 1, wherein the physically compliant and compressible conductive element has a volume resistivity that is less than 10 Ω-cm.

32. The first device of claim 1, wherein the physically compliant and compressible conductive element has a volume resistivity that is less than 1 Ω-cm.

33. The first device of claim 1, wherein the physically compliant and compressible conductive element has a hardness on the shore durometer A scale that is greater than 50.

34. The first device of claim 1, wherein the physically compliant and compressible conductive element has a hardness on the shore durometer A scale that is greater than 65.

35. The first device of claim 1, wherein the physically compliant and compressible conductive element has a hardness on the shore durometer A scale that approximate equal to 70 and a volume resistivity of approximately 0.0008 Ω-cm.

36. The first device of claim 1, wherein the physically compliant and compressible conductive element is elastic.

37. A first device comprising:
a lens comprising at least a first electrical contact;
a lens housing holding the lens, wherein the lens housing comprises at least a second electrical contact; and
a compliant conductive element disposed between the first and the second electrical contact, wherein the compliant conductive element electrically connects the first and second electrical contacts
wherein the lens comprises a first groove;
wherein the lens housing comprises a first cavity;
wherein the compliant conductive element comprises a first and a second portion; and
wherein the first portion of the compliant conductive element is disposed substantially within the first groove of the lens and the second portion of the compliant conductive element is disposed substantially within the first cavity of the lens housing;
wherein the compliant conductive element has an uncompressed height of at least the distance between the first surface of the first groove of the lens and the first surface of the first cavity of the lens housing;
wherein the uncompressed height of the compliant conductive element is at least 0.75 mm.

* * * * *